US011836600B2

(12) United States Patent
Baker et al.

(10) Patent No.: US 11,836,600 B2
(45) Date of Patent: Dec. 5, 2023

(54) TARGETED INCREMENTAL GROWTH WITH CONTINUAL LEARNING IN DEEP NEURAL NETWORKS

(71) Applicant: D5AI LLC, Maitland, FL (US)

(72) Inventors: James K. Baker, Maitland, FL (US); Bradley J. Baker, Berwyn, PA (US)

(73) Assignee: D5AI LLC, Maitland, FL (US)

( * ) Notice: Subject to any disclaimer, the term of this patent is extended or adjusted under 35 U.S.C. 154(b) by 0 days.

(21) Appl. No.: 17/387,211

(22) Filed: Jul. 28, 2021

(65) Prior Publication Data

US 2022/0058467 A1 Feb. 24, 2022

Related U.S. Application Data

(60) Provisional application No. 63/068,080, filed on Aug. 20, 2020.

(51) Int. Cl.
*G06N 3/04* (2023.01)
*G06N 3/045* (2023.01)

(52) U.S. Cl.
CPC .................................. *G06N 3/045* (2023.01)

(58) Field of Classification Search
CPC .................................................... G06N 3/0454
See application file for complete search history.

(56) References Cited

U.S. PATENT DOCUMENTS

| | | | |
|---|---|---|---|
| 5,793,655 A * | 8/1998 | Harlap | G06F 7/544 708/201 |
| 10,679,129 B2 | 6/2020 | Baker | |
| 10,832,137 B2 | 11/2020 | Baker et al. | |
| 10,839,294 B2 | 11/2020 | Baker | |
| 10,885,470 B2 | 1/2021 | Baker | |

(Continued)

FOREIGN PATENT DOCUMENTS

| | | |
|---|---|---|
| WO | 2018/175098 A1 | 9/2018 |
| WO | 2018/194960 A1 | 10/2018 |

(Continued)

OTHER PUBLICATIONS

Azimi-Sadjadi et. al., "Recursive Dynamic Node Creation in Multilayer Neural Networks", Feb. 1993 (Year: 1993).*

(Continued)

*Primary Examiner* — Selene A. Haedi
(74) *Attorney, Agent, or Firm* — K&L Gates LLP

(57) ABSTRACT

Computer systems and computer-implemented methods train a neural network, by:
(a) computing for each datum in a set of training data, activation values for nodes in the neural network and estimates of partial derivatives of an objective function for the neural network for the nodes in the neural network; (b) selecting a target node of the neural network and/or a target datum in the set of training data; (c) selecting a target-specific improvement model for the neural network, wherein the target-specific improvement model, when added to the neural network, improves performance of the neural network for the target node and/or the target datum, as the case may be; (d) training the target-specific improvement model; (e) merging the target-specific improvement model with the neural network to form an expanded neural network; and (f) training the expanded neural network.

57 Claims, 38 Drawing Sheets

(56) References Cited

U.S. PATENT DOCUMENTS

| | | |
|---|---|---|
| 10,922,587 B2 | 2/2021 | Baker |
| 10,929,757 B2 | 2/2021 | Baker et al. |
| 10,956,818 B2 | 2/2021 | Baker |
| 11,003,982 B2 | 5/2021 | Baker |
| 11,010,670 B2 | 5/2021 | Baker |
| 11,010,671 B2 | 5/2021 | Baker et al. |
| 11,037,059 B2 | 6/2021 | Baker |
| 2016/0155049 A1* | 6/2016 | Choi ............... G06N 3/082 706/16 |
| 2018/0032866 A1* | 2/2018 | Son ............... G06N 3/04 |
| 2018/0144246 A1* | 5/2018 | Jayadeva ............... G06N 3/084 |
| 2019/0095798 A1 | 3/2019 | Baker |
| 2020/0051550 A1 | 2/2020 | Baker |
| 2020/0090045 A1 | 3/2020 | Baker |
| 2020/0134451 A1 | 4/2020 | Baker |
| 2020/0143240 A1 | 5/2020 | Baker |
| 2020/0184337 A1 | 6/2020 | Baker |
| 2020/0210812 A1 | 7/2020 | Baker |
| 2020/0210835 A1* | 7/2020 | Krishnapura Subbaraya ............... G06N 3/04 |
| 2020/0210842 A1 | 7/2020 | Baker |
| 2020/0265320 A1 | 8/2020 | Baker |
| 2020/0279165 A1 | 9/2020 | Baker |
| 2020/0279188 A1 | 9/2020 | Baker et al. |
| 2020/0285939 A1 | 9/2020 | Baker |
| 2020/0285948 A1 | 9/2020 | Baker |
| 2020/0293890 A1 | 9/2020 | Baker |
| 2020/0293897 A1 | 9/2020 | Baker |
| 2020/0311572 A1 | 10/2020 | Baker |
| 2020/0320371 A1 | 10/2020 | Baker |
| 2020/0327414 A1 | 10/2020 | Baker et al. |
| 2020/0327416 A1 | 10/2020 | Baker et al. |
| 2020/0327455 A1 | 10/2020 | Baker |
| 2020/0334541 A1 | 10/2020 | Baker et al. |
| 2020/0342317 A1 | 10/2020 | Baker et al. |
| 2020/0342318 A1 | 10/2020 | Baker et al. |
| 2020/0349446 A1 | 11/2020 | Baker et al. |
| 2020/0356859 A1 | 11/2020 | Baker et al. |
| 2020/0356861 A1 | 11/2020 | Baker et al. |
| 2020/0364625 A1 | 11/2020 | Baker et al. |
| 2020/0387794 A1 | 12/2020 | Baker |
| 2020/0394521 A1 | 12/2020 | Baker |
| 2020/0401869 A1 | 12/2020 | Baker et al. |
| 2020/0410090 A1 | 12/2020 | Baker |
| 2020/0410295 A1 | 12/2020 | Baker |
| 2021/0004688 A1 | 1/2021 | Baker |
| 2021/0027147 A1 | 1/2021 | Baker |
| 2021/0027163 A1 | 1/2021 | Baker et al. |
| 2021/0049470 A1 | 2/2021 | Baker |
| 2021/0056380 A1 | 2/2021 | Baker et al. |
| 2021/0056381 A1 | 2/2021 | Baker et al. |
| 2021/0081761 A1 | 3/2021 | Baker |
| 2021/0174265 A1 | 6/2021 | Baker |

FOREIGN PATENT DOCUMENTS

| | | |
|---|---|---|
| WO | 2018/226492 A1 | 12/2018 |
| WO | 2018/226527 A1 | 12/2018 |
| WO | 2018/231708 A2 | 12/2018 |
| WO | 2018/231708 A3 | 1/2019 |
| WO | 2019/005507 A1 | 1/2019 |
| WO | 2019/005611 A1 | 1/2019 |
| WO | 2019/067236 A1 | 4/2019 |
| WO | 2019/067248 A1 | 4/2019 |
| WO | 2019/067281 A1 | 4/2019 |
| WO | 2019/067542 A1 | 4/2019 |
| WO | 2019/067831 A1 | 4/2019 |
| WO | 2019/067960 A1 | 4/2019 |
| WO | 2019/152308 A1 | 8/2019 |
| WO | 2020/005471 A1 | 1/2020 |
| WO | 2020/009881 A1 | 1/2020 |
| WO | 2020/009912 A1 | 1/2020 |
| WO | 2020/018279 A1 | 1/2020 |
| WO | 2020/028036 A1 | 2/2020 |
| WO | 2020/033645 A1 | 2/2020 |
| WO | 2020/036847 A1 | 2/2020 |
| WO | 2020/041026 A1 | 2/2020 |
| WO | 2020/046719 A1 | 3/2020 |
| WO | 2020/046721 A1 | 3/2020 |
| WO | 2020/046721 A8 | 10/2020 |
| WO | 2021/040944 A1 | 3/2021 |
| WO | 2021/061401 A1 | 4/2021 |

OTHER PUBLICATIONS

Hackbarth et. al., "Modular Connectionist Structure for 100-Word Recognition", 1991 (Year: 1991).*

* cited by examiner

FIGURE 12

1201
GUIDELINES FOR PICKING INCOMING CONNECTIONS TO A NEW NODE OR NODE SET TO BE MERGED INTO AN EXISTING NETWORK

1202
ANY INPUT OR ANY NODE LOWER IN RANK THAN NEW POSITION MAY BE A SOURCE FOR A CONNECTION

1203
LIMIT INPUTS TO A SUBSET OF THE ACTIVATIONS ON WHICH D1 AND D2 DIFFER, PREFERABLY A SMALL SUBSET

1204
PREFER CONNECTIONS FROM INPUT NODES OR FROZEN NODES

1205
SELECT THE INCOMING CONNECTIONS, PREFERABLY CONSISTENT WITH THE ABOVE GUIDELINES

1206
INITIALIZE WEIGHTS BY DISCRIMINATING D1 FROM THE AVERAGE OF THE DATA IN D2, WITH THE AVERAGE WEIGHTED EQUALLY TO D1

TARGETED INCREMENTAL GROWTH WITH CONTINUAL LEARNING IN DEEP NEURAL NETWORKS

PRIORITY CLAIM

The present application claims priority to provisional patent application Ser. No. 63/068,080, filed Aug. 20, 2020, which is incorporated herein by reference in its entirety.

BACKGROUND

Machine learning systems, especially deep neural networks, have been very successful in recent years. However, many problems remain. For example, current machine learning systems fail to meet the criteria for continual or lifelong learning, which is the ability to learn new tasks: without forgetting how to perform useful previously learned tasks; at a faster rate than was needed to learn earlier related tasks; with increasing ability to generalize across tasks; with parsimonious memory requirements as knowledge accumulates; with selective forgetting or suppression of no-longer accurate knowledge; and with the ability to reflect upon what it can do and what it does not yet know. Current machine learning systems also need improvement on the following goals: ease of interpretation; robustness against random perturbations and adversarial attacks; sensible decision boundaries; and improving the ability to generalize to new unseen data.

SUMMARY

In one general aspect, the present invention is directed to computer systems and computer-implemented methods that provide what is referred to herein as "targeted incremental growth" for neural networks. Targeted incremental growth enables more efficient training and continual learning for deep neural networks. Various embodiments of the present invention may target an individual node in the network or an individual datum to correct an error or to accelerate training of the neural network. The improvement may be achieved by adding nodes and arcs to the network while using node-to-node relationship regularization to help guide the expanded network to maintain the previous level of performance that has already been learned. Targeting an individual node is facilitated by determining an implicit target objective for a node in an inner layer of the network. The technique of node-to-node relationship regularization may also be used to enhance interpretability. In another aspect of the invention, incremental growth may enable quick training from a single example or a small number of examples based on various embodiments of one-shot learning.

These and other benefits and innovative aspects of the present invention will be apparent from the description to follow.

FIGURES

Various embodiments of the present invention are described herein by way of example in connection with the following figures.

FIG. 12 is an illustrative embodiment of a set of guidelines for selecting the incoming connections for a new node or node set to be added to a network.

DETAILED DESCRIPTION

Figure 1:
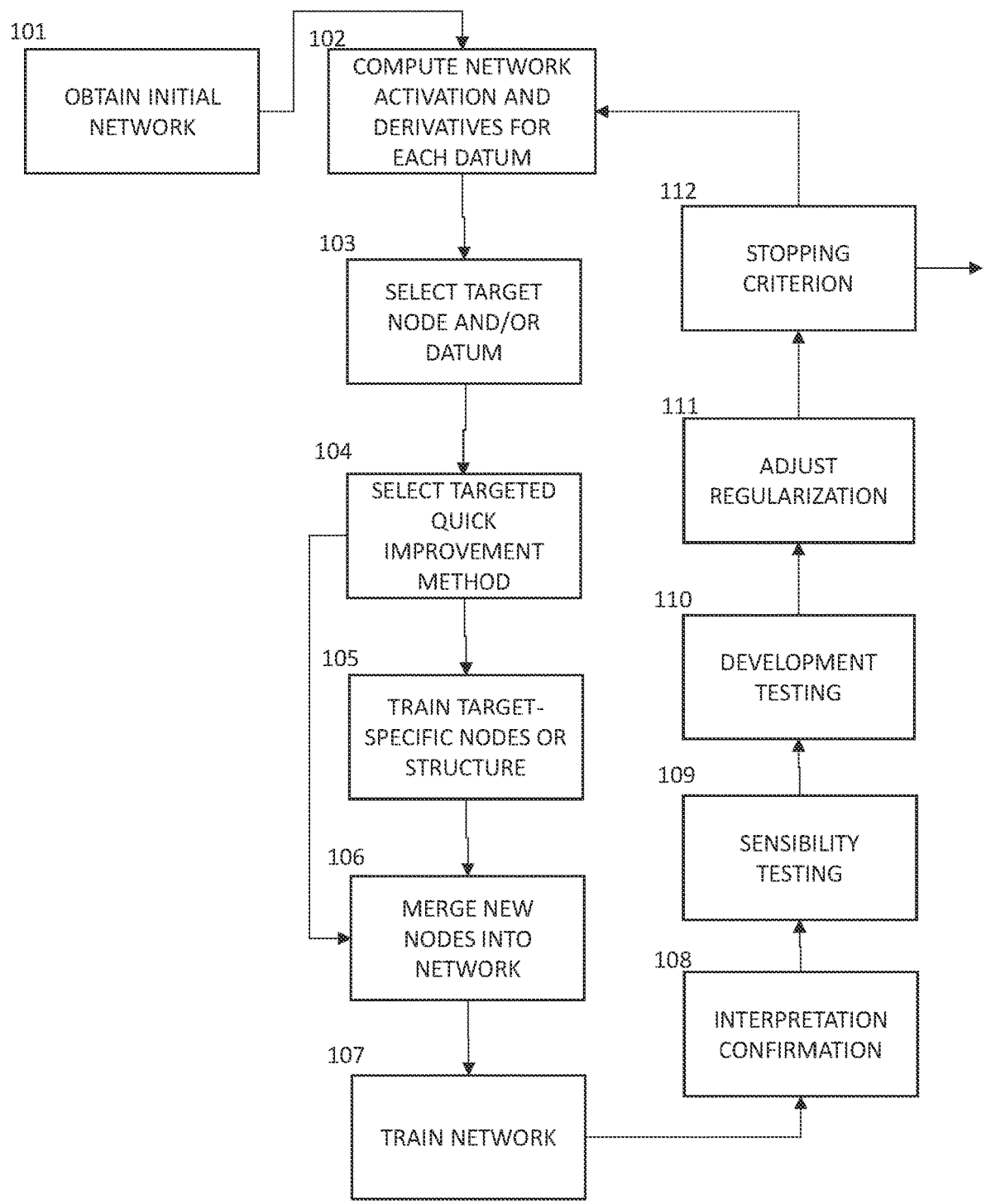
FIG. 1 is a flow chart of an illustrative embodiment of an aspect of the invention.

FIG. 1 is a flow chart of an illustrative embodiment of an aspect of the invention. The blocks in FIG. 1 represent steps in a process that may be implemented by a computer system, such as the computer system 3600 illustrated in FIG. 36. In some steps, the training and learning process may be controlled by an intelligent learning management system (ILMS). The ILMS may be implemented by a cooperative effort of a team of one or more humans and one or more artificial intelligence systems that together make decisions about changes in the network being trained and settings of hyperparameters that help control the training process. In addition, one or more humans may confirm interpretations that are proposed by an AI system in the ILMS or may help confirm the sensibility of a decision boundary in the machine learning system being trained. More details about an ILMS may be found in PCT Application No. PCT/US20/27912, filed Apr. 13, 2020 by the present Applicant and entitled "Data-Dependent Node-to-Node Knowledge Sharing by Regularization in Deep Learning," which is incorporated herein by reference in its entirety.

The illustrative embodiment shown in FIG. 1 embodies targeted incremental learning that applies both to continual or lifelong learning and to error correction and continued learning for performance improvement in any neural network.

In block 101, the computer system 3600 obtains an initial machine learning network. This network comprises a set of nodes and a set of directed arcs or connections. Each directed arc connects a source node S to a destination node D. Each connection may be associated with a connection weight w. Each node may be associated with a function, called the "activation function," which determines the output of the node, given its input. In many embodiments, the value of the input to a typical node $D_k$ may take the form of a weighted sum with one term for each source node $S_j$ that has a connection to $D_k$ as a destination node, plus a node bias: $act_k(d)=f_k(\Sigma_j\ act_j(d)*w_{j,k}+bias_k)$, where $f_k(x)$ is the activation function of node k and $act_k(d)$ is its activation value for a network input datum d. The weight of the connection from source node j to destination node k is $w_{j,k}$ and $bias_k$ is a node bias for node k, which is independent of the input datum d. The weights $w_{j,k}$ and the biases $bias_k$ are "learned parameters," whose optimum values are to be learned by the machine learning network. A node with this form of weighted sum input and activation function is herein called a "standard node." In the following discussions, the phrases "weighted sum" or "weighted summation" refer to the expression $\Sigma_j\ act_j(d)*w_{j,k}+bias_k$, computed as the input to the activation function of a standard node.

Figure 37:
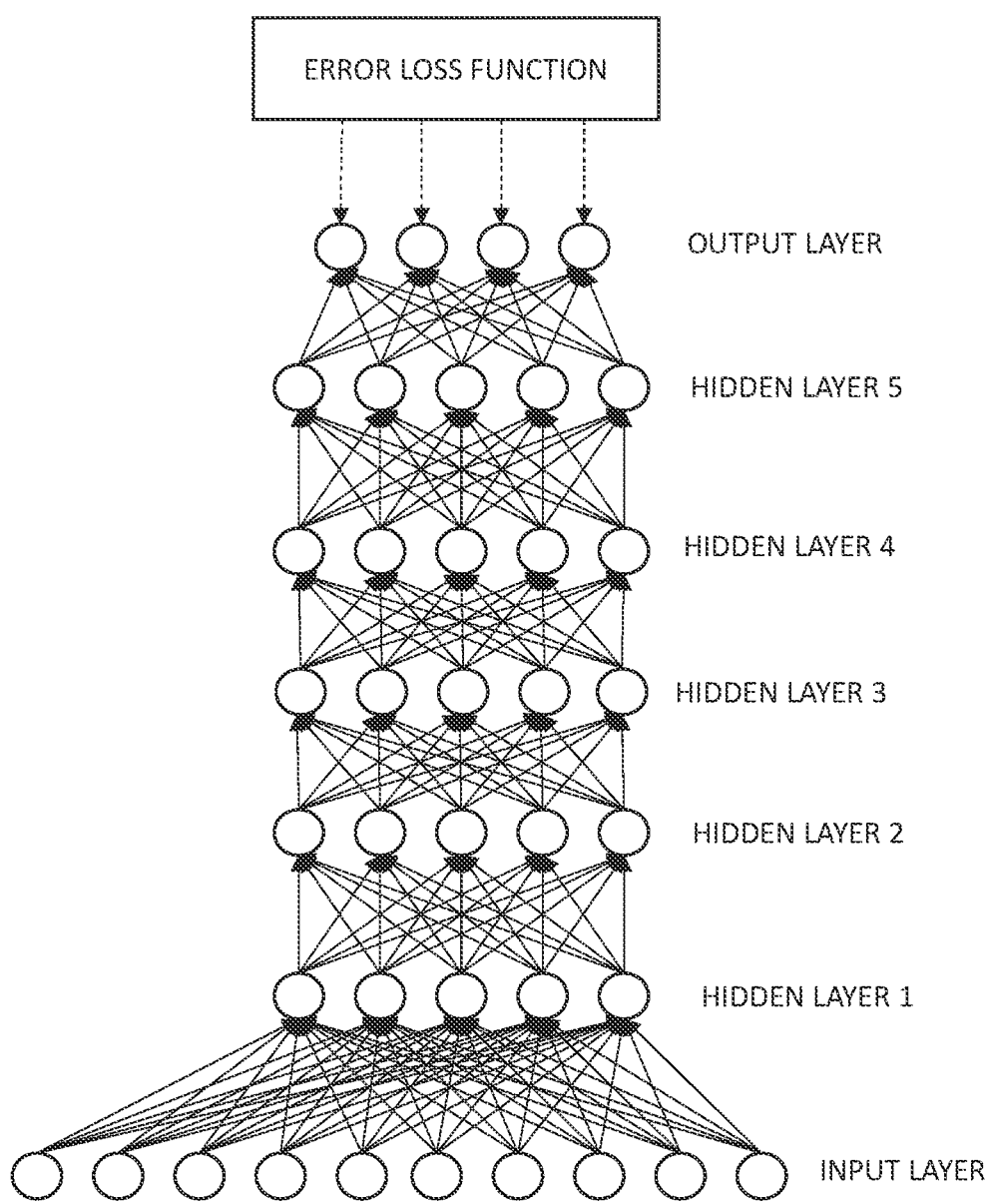
FIG. 37 is a diagram of an example layered feed forward neural network.
Figure 38:
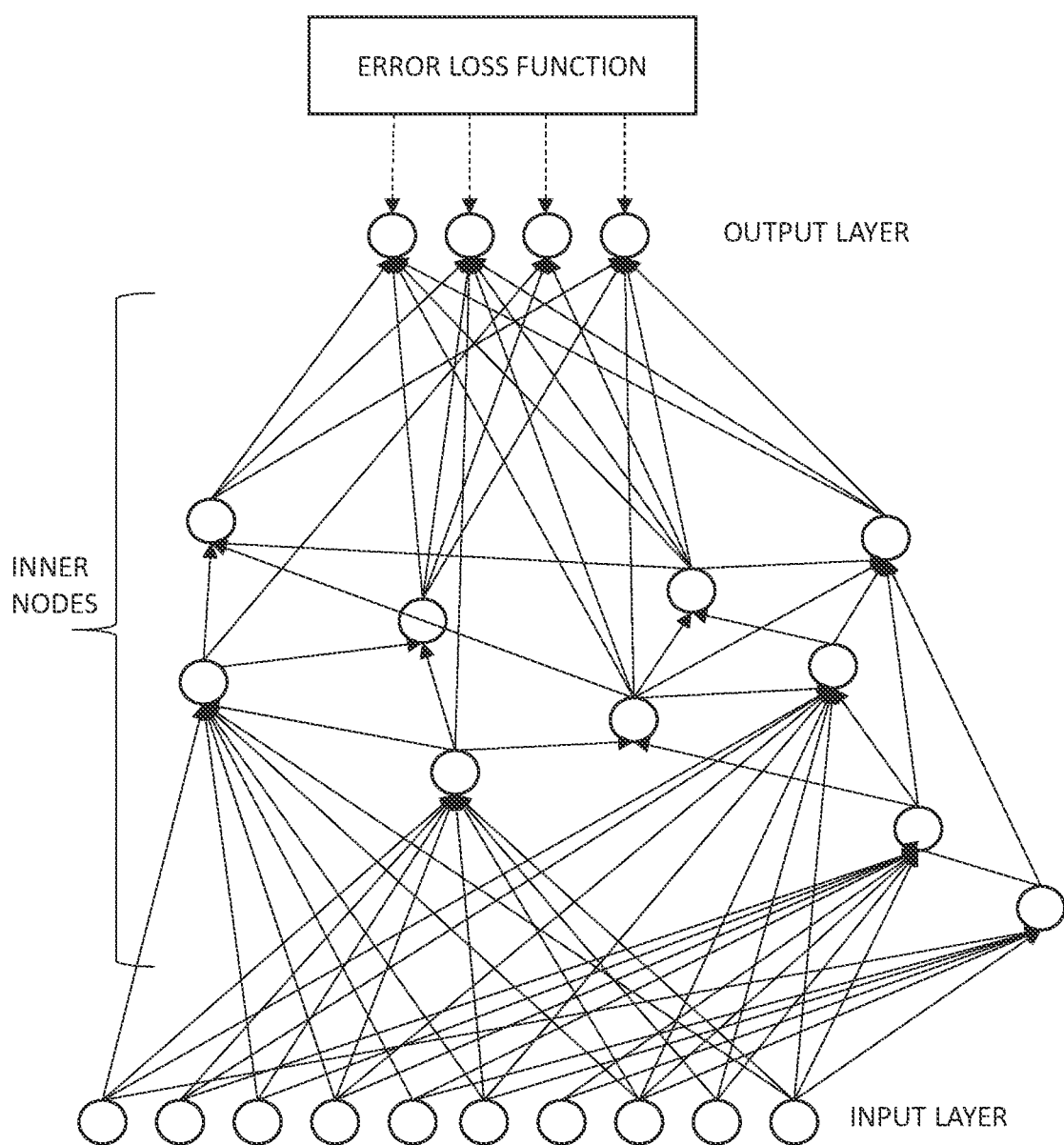
FIG. 38 is a diagram of a neural network represented as a directed acyclic graph (DAG).

The machine learning network obtained in block 101 may be a layered, feed forward neural network such as the network illustrated in FIG. 37, with an input layer, an output layer and zero or more hidden layers between the input and output layers. The network may also be represented as a directed acyclic graph, as illustrated in FIG. 38. If the network has more than one hidden layer, it is called a "deep" neural network. In this disclosure, the network is typically drawn with the input layer at the bottom and successive layers above that, like the layers of a layered cake.

In this representation, higher numbered layers are also higher in the diagram than lower numbered layers. The output layer of the network is the highest layer and the input layer is the lowest layer. However, without loss of generality, all aspects of the invention apply to neural networks regardless of whether they are drawn going from bottom to top, from top to bottom, from left to right, or from right to left. In this disclosure, a node D is "higher" than a node S if D is higher in the numbering of the layers of a neural network or is higher in the rank ordering of the nodes in an associated total order as explained below.

The network may also be any of a number of other forms of neural network, such as a convolutional neural network (CNN) or a recurrent neural network (RNN). For computations, such as feed forward activation or back propagation of derivatives, a recurrent neural network may be represented as a sequence of feed forward neural networks, with each recurrent connection in the recurrent neural network being represented in the sequence of feed forward neural networks as a connection from one feed forward neural network in the sequence to the next feed forward neural network in the sequence. The initial machine learning network obtained in block 101 may also be a neural network without layers or may be an arbitrary directed acyclic graph (DAG).

In some embodiments, the nodes in the initial network may be associated with a total order that is consistent with the layers in a neural network or with the strict partial order representing the transitive closure of the relation corresponding to a directed acyclic graph. In these embodiments, the position of a node in the network in the associated total order is herein called the "rank" of the node.

In general, a new connection from a source node S to a destination node D may be added to a directed acyclic graph or a feed forward neural network if the rank of node S in the associated total order is less than the rank of node D. One way to associate a layered neural network with a total order is to count the nodes layer-by-layer, starting with the lowest layer (e.g. the input layer). There are multiple total orders associated with a layered neural network, differing in the order in which the nodes are counted in each layer.

In some embodiments, incremental growth adds connections that change the layers. Some embodiments of the invention use a directed acyclic graph representation and ignore the layers or the changes in the layers. Such an embodiment may keep track of which node pairs may be connected without creating a cycle by updating an associated total order rather than the more complicated process of updating the layers in a layered representation. However, every layered neural network is also a directed acyclic graph, and every directed acyclic graph can easily be converted to a layered network, so the choice of representation is somewhat a matter of convenience.

The initial network obtained by computer system 3600 in block 101 may be initialized with random connection weights in an initialization process that is well known to those skilled in the art of training neural networks. Alternately, the initial neural network may be pre-trained (e.g., an initial training that takes place prior to the training process shown in FIG. 1). In the pre-training, the initial neural network may be partially trained or may have been trained to convergence by a learning process such as gradient descent or stochastic gradient descent. In this disclosure, the terms "gradient descent" and "stochastic gradient descent" are used interchangeably and each may refer to either minibatch based updates of the learned parameters or to full epoch updates.

In some embodiments, the initial network may even be empty or equivalently may be a set of input nodes corresponding to the input variables and a set of output nodes corresponding to the output variables or to the output categories in a classification problem in which the initial network has no connections or arcs between the nodes. In any case, various embodiments of the invention may add nodes and connections to the initial network.

In block 102, computer system 3600 computes, for each datum d in a specified set of training data, the activations of the network obtained in block 101 using a feed forward activation computation and computes estimates of the partial derivatives of an error loss or objective function using a computation called back propagation. Typically, the error loss function is an objective function, such as the cross entropy or the K-L divergence, to be minimized. Error loss functions are well known to those skilled in the art of machine learning and the training of neural networks.

The back-propagation computation proceeds backwards through the network relative to the directions of the directed arcs. Feed forward activation and back propagation of estimated partial derivatives are well known to those skilled in the art of training neural networks. The estimates of the partial derivatives may be averaged across batches of data called "minibatches." In some embodiments of the invention, the estimated partial derivatives may be averaged across larger batches or across the entire set of training data, which is called an "epoch" to indicate the processing done in an interval of iterative training that has processed the full set of training data.

Figure 3:
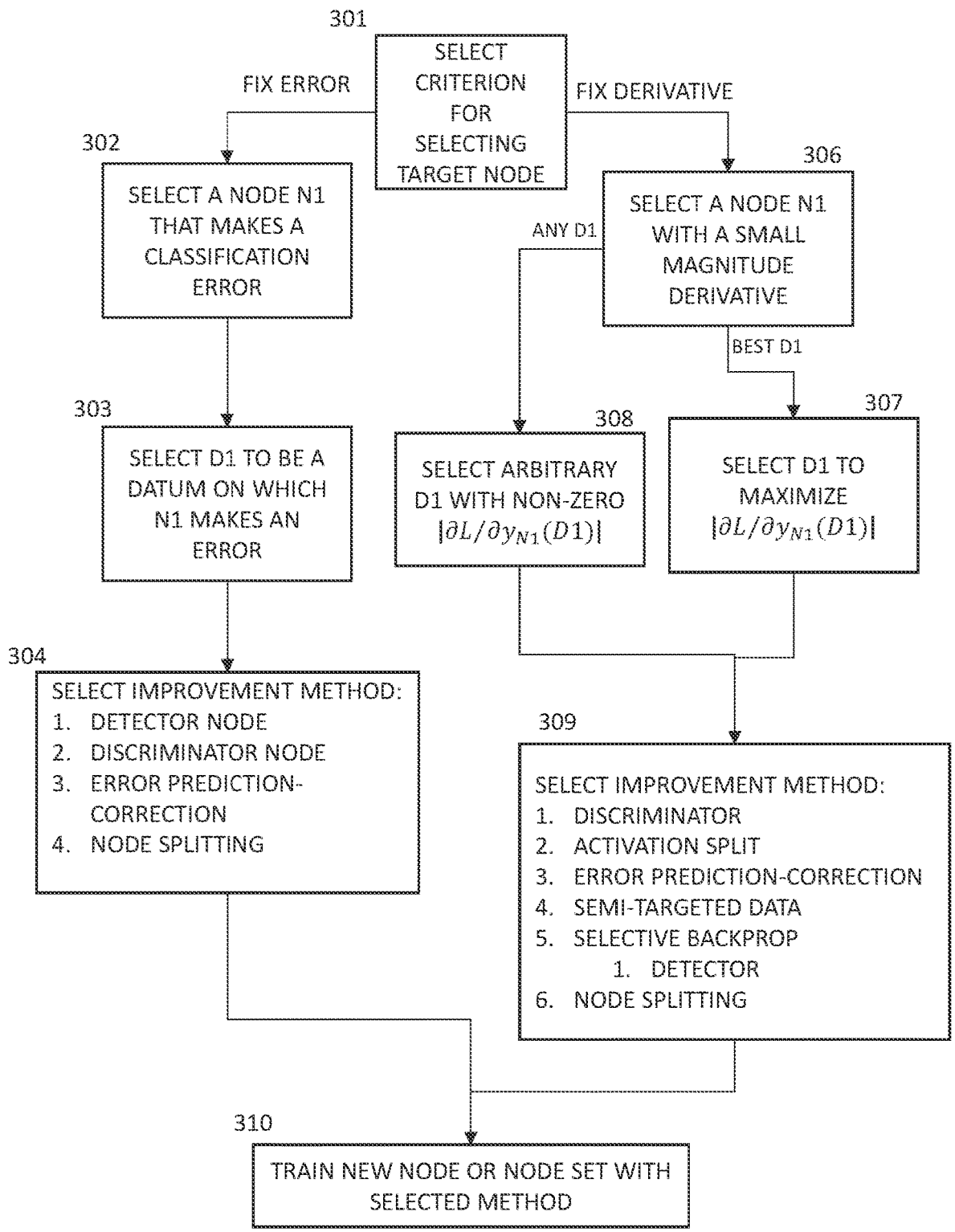
FIG. 3 is a flowchart of an illustrative embodiment of an aspect of the invention.
Figure 4:
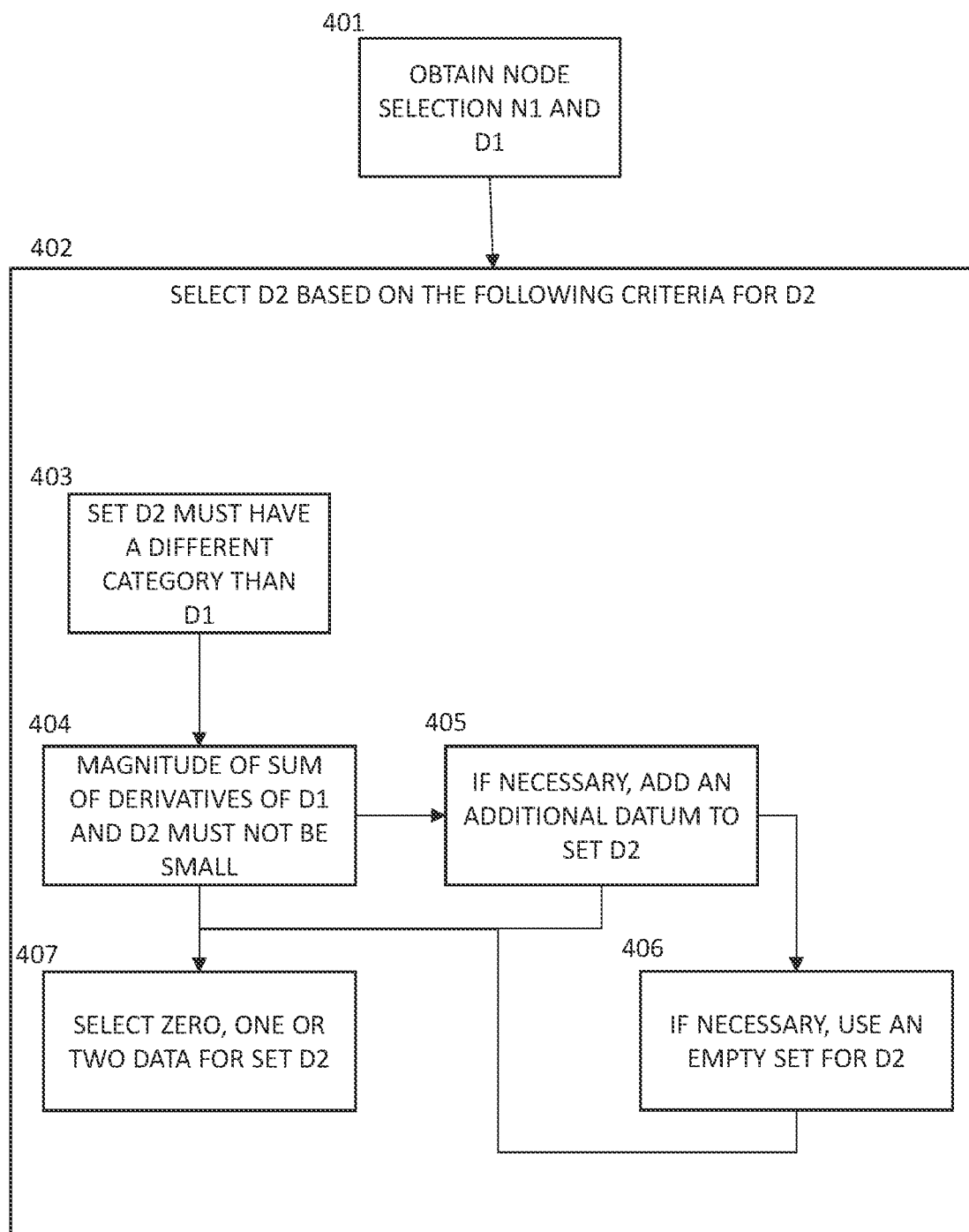
FIG. 4 is a flow chart of an illustrative embodiment of an aspect of the invention for selecting a set D2 to be discriminated from a target datum D1.

In block 103, computer system 3600 selects a target node and/or a target datum by one or more of various methods that are discussed in more detail in blocks 104 to 111 and in association with other figures, such as FIGS. 3 and 4. The selected node and/or datum is a "target" for procedures in various embodiments by which computer system 3600 makes changes in the network and in learned parameters and hyperparameters in order to achieve improved performance on some goal with various methods in various aspects of the invention that are discussed in association with other figures. In targeted incremental growth an illustrative embodiment may add a node or a small set of nodes to the network and train the connections to the new nodes in a way that improves the performance of a targeted node on a targeted datum.

In some embodiments, a targeted datum or a set of targeted data may be selected without a specific target node or nodes being selected. The process illustrated in FIG. 1 may even be applied to add the first nodes to an empty initial network. In some embodiments, a targeted node may be selected without a specific datum or set of data being targeted. In some embodiments, the selected datum may be a new datum that has not been included in prior training, as may happen in continual learning. The new datum may even represent a new classification category. Such problems fit the profile for targeted incremental growth as illustrated in FIG. 1.

In block 104, computer system 3600 selects a target-specific quick improvement method. Typically, a quick improvement method trains a special new node or set of nodes to be added to the network selected in block 101 in order to improve some aspect of the performance on the node and/or datum selected in block 103. In some embodiments, the new node set may comprise one or more "standard" nodes, as described in association with block 101. In some embodiments, the new node set may comprises one or more specialized nodes, such as an error-prediction node and an error correction node, as described in association with FIGS. 8 and 9 or specialized detector or discriminator nodes, such as described in association with FIG. 13 and FIGS. 28 to 34.

Figure 6:
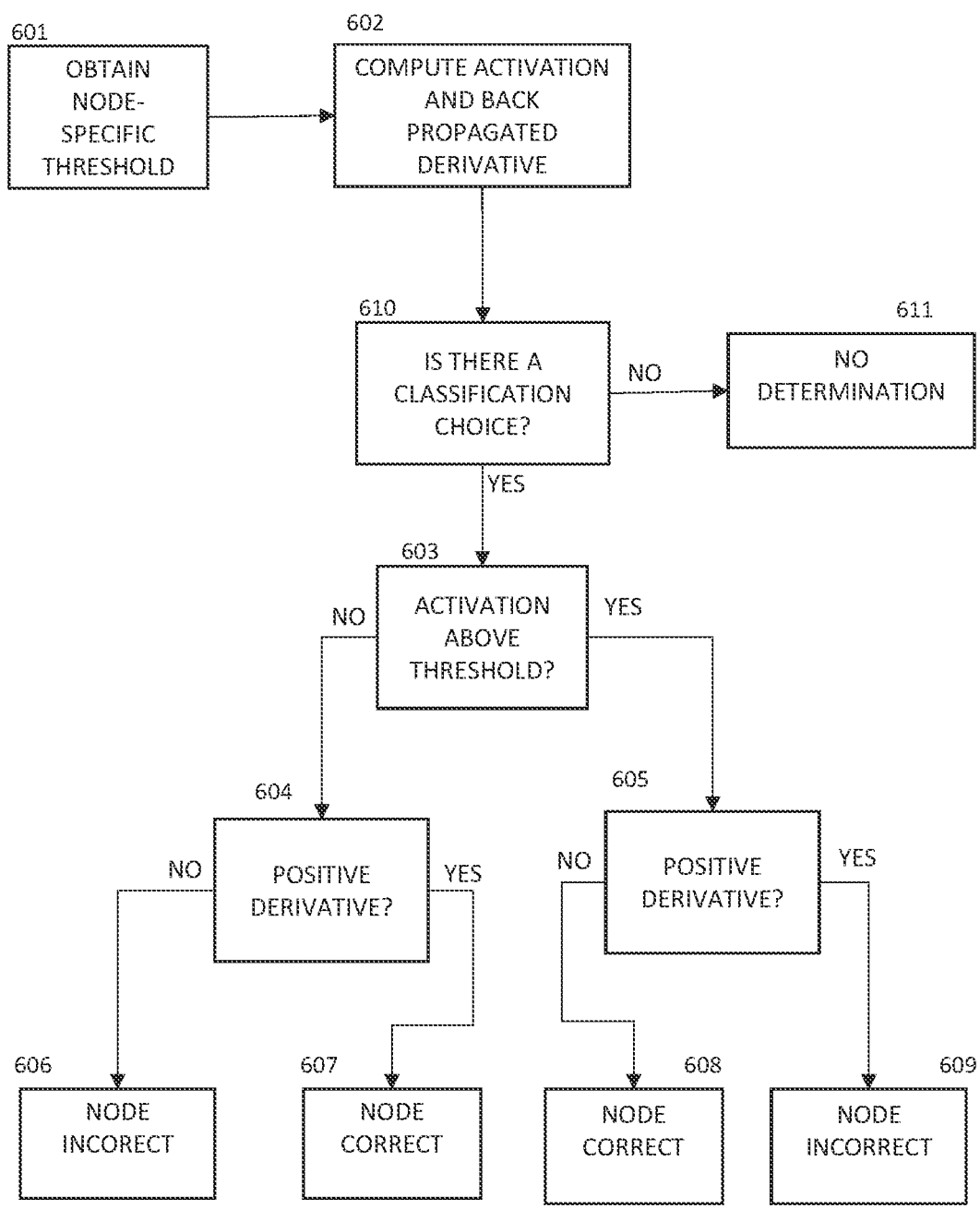
FIG. 6 is a diagrammatic logic chart of an illustrative embodiment of a method for specifying a local node-specific classification objective that may be used to determine whether a node has made a classification error on a datum d.

For example, the node selected in block 103 may make an error on the selected datum and the desired improvement may be to improve the activation of the node for the datum in error. The error may be determined by the classification target category if the selected node is an output node of a classifier. The error may be determined by a node-specific target or objective as illustrated in FIG. 6 if the selected node is an inner layer node. In continual learning, the error may be due to the selected datum representing a new category or may be due to a new datum that is not correctly classified by the existing network.

As another example, the selected node may be a node for which the magnitude of the estimated derivative of the error loss function (averaged across a set of training data, such as a mini-batch, for example) is small (e.g., less than a threshold value), so updates of the learned parameters in stochastic gradient descent are also small, which means that the learning process will be slow. In this example, the desired improvement may be to accelerate the learning process and to reduce the error loss function through faster learning, rather than to correct a specific error.

In block 104, computer system 3600 further selects an improvement method, such as one of the methods shown in FIG. 3. Depending on the selected improvement method, computer system 3600 may create one or more standard or special nodes and/or other network components to be trained by the selected method. For example, it may create a detector node for the selected datum as explained in association with FIGS. 23, 27 and other figures, or a discrimination node as explained in association with FIGS. 13, 33 and other figures. Other quick train methods may be used in various embodiments as explained in association with other figures, such as the combination of error-prediction and error-correction nodes as explained in association with FIGS. 8 and 9. In some embodiments, the nodes or network components associated with these quick train methods may be selected from a set of model forms that are designed to be easier to interpret and/or that tend to train more sensible decision boundaries. The humans and AI systems in an ILMS may assist in selecting the form of the quick-train models.

In block 105, computer system 3600 trains the target-specific new nodes or network sub-components created in block 104. In some embodiments, computer system 3600 first trains the new node set as a stand-alone network. In some embodiments, there may be connections from nodes in initial network 101 to nodes in the stand-alone network or networks comprising the new nodes. In some embodiments, this stand-alone training facilitates interpretation and/or helps enhance the sensibility of the decision boundaries. For example, a node that is an output node in a stand-alone network is typically easy to interpret, which provides a tentative interpretation for the corresponding inner node in the expanded network when the new nodes are merged into the expanded network in block 106. As another example, stand-alone training with one-shot learning with limited training data tends to produce simpler, more sensible decision boundaries. In various embodiments, in block 105, computer system 3600 may initialize the new node set using procedures associated with a form of quick-train method to achieve an immediate improvement for the targeted node or datum. In addition, various embodiments may train the stand-alone network using standard neural network training procedures such as stochastic gradient descent. In some embodiments, computer system 3600 may perform training based on non-standard algorithms such as activation split training as discussed in association with FIG. 17.

In some embodiments, the training of the nodes in the new node set is done in place in the expanded network. That is, in some embodiments, the computer system 3600 skips the stand-alone training and proceeds to block 106. In such embodiments, the stand-alone training in block 105 is replaced by the in-place training in block 107.

In block 106, computer system 3600 merges the stand-alone network that has optionally been trained in block 105 with the initial network obtained in block 101 to form an expanded network. In some embodiments, computer system 3600 merges the networks by retaining the connections from nodes in the initial network to nodes in the stand-alone network and by making one or more connections from each of new nodes in the stand-alone network to selected nodes in the initial network to create an expanded network comprising the new nodes and the nodes in the initial network, as described in association with FIGS. 2, 5, 11, 12, 18, 23 and other figures.

In a preferred embodiment, the connection weights for existing connections in the initial network or within the stand-alone network are given the values to which they have been trained. The weights of new connections between the two subnetworks, however, are initialized to zero so that, initially, the expanded network computes the same activation and output values as the initial network. In incremental growth, this initialization is herein called "no-harm growth" or, in the context of continual or lifelong learning, "learning new things without forgetting what has already been learned." Another aspect of the invention is a form of regularization that is associated with learning without forgetting, herein called "all-node regularization," which is discussed in association with block 110 and FIGS. 18 and 20. Some additional forms of regularization to be discussed in association with blocks 110 and 111 will further enhance these properties.

In block 107, computer system 3600 trains the expanded network using standard neural network training procedures such as stochastic gradient descent. In some embodiments, computer system 3600 also uses additional methods as discussed in association with other figures.

In block 108, an AI system implemented on computer system 3600 may propose an interpretation of the node selected in block 103, of one of the nodes in the new node set, or of a classification decision for the datum selected in block 103 or of other data selected in various embodiments during the training done in blocks 105 and 107. This interpretation may be confirmed by a human member of the ILMS. In continued training of a deployed system, an interpretation may be implicitly or explicitly confirmed by an end user. In some embodiments, an aspect of the invention, called "node-to-node relationship regularization," helps to propagate confirmed interpretations and their consequences throughout a network being trained. Node-to-node relationship regularization is discussed further in association with blocks 110 and 111 and FIGS. 18, 19, 20 and 21.

In this disclosure, the word "relationship" in the phrase "node-to-node relationship regularization" has a narrow technical meaning associated with the mathematical concept of a "relation," not the broader meaning associated with the word "relationship" in general language. In node-to-node relationship regularization, computer system 3600 imposes a node-specific regularization cost function based on the activation values of a regulating node N1 and a regulated node N2. The node-specific regularization cost function is designed such that it is minimized when the activation values of N1 and N2 are consistent with a specified binary relation. The term "binary relation" is well-known to those skilled in the art of functions and relations of binary, i.e. two-valued, variables. A binary variable may be associated with the activation level of a node in a neural network by specifying a threshold value and determining the value of the binary variable for a datum d by whether the activation value of the node for datum d is below or above the threshold value. Two examples of binary relations used in various embodiments of the invention are the "is-equal-to" relation, used, for example, to help incremental learning while avoiding forgetting things that have already been learned, and the "is-not-equal-to" relation used to increase diversity among nodes in a network or among member networks in an ensemble.

In some embodiments, in block 109, computer system 3600, with the help of the human team in the ILMS, may test the sensibility of one or more decision boundaries. Large neural networks and other machine learning systems with a large number of input variables may be vulnerable to adversarial attacks, in which small, perhaps imperceptible, changes in the input variables cause the machine learning system to make an error. Such as error is said not to be "sensible" if a human observer would say "no intelligent, sensible person would make that mistake."

In block 110, computer system 3600 tests the classification performance of the trained system on development data, that is on data that has not been included in the set of training data. In various embodiments, computer system 3600 compares the performance on a sample of development data with various other measures of performance.

In some embodiments, the quick improvement method selected in block 103 is intended to accelerate the training. In such embodiments, the success in the goal of accelerating the performance is first measured on training data during the training. In block 110, the computer system 3600 performs a confirmation test on development data.

An illustrative example test in an embodiment that is intended to accelerate training is to compare the current performance with the performance in an earlier epoch. This test is used to verify that the accelerated training has also improved performance on independent data.

In other embodiments, the selected quick improvement method is intended to fix an error, such as described in association with blocks 304 and 310 of FIG. 3 and other figures, or improve the performance measured by the network objective or error loss function, such as described in association with blocks 309 and 310 of FIG. 3 and other figures.

In various embodiments, an example test compares the performance on a sample of development data with the performance on the training data. This test measures the ability of the network to generalize from the training data to new, unseen data.

A related test compares the performance on development data of the merged network created in block 106 and trained in block 107 to the performance on development data of the initial network obtained in block 101. This test verifies that the expected performance on new data has not degraded due to the incremental growth and learning.

Together, the two tests help verify two goals: (1) the ability of the incrementally-improved network to learn new tasks without forgetting how to perform useful previously learned tasks; and (2) improving the ability of the incrementally-improved network to generalize to new unseen data.

An important aspect of helping both of the two goals is that the ability to generalize to new data is potentially vulnerable to continued training. The performance on development data and other unseen data is not reinforced by the minimization by gradient descent of the error loss function evaluated on training data. Without reinforcement, the performance on unseen data may be degraded as the system learns new tasks.

The aspect of the invention that is herein called "node-to-node relationship regularization," mentioned in the discussion of block 108, may also help each node in the network retain any ability to generalize that the node may have had in the initial network obtained in block 101.

Figure 18:
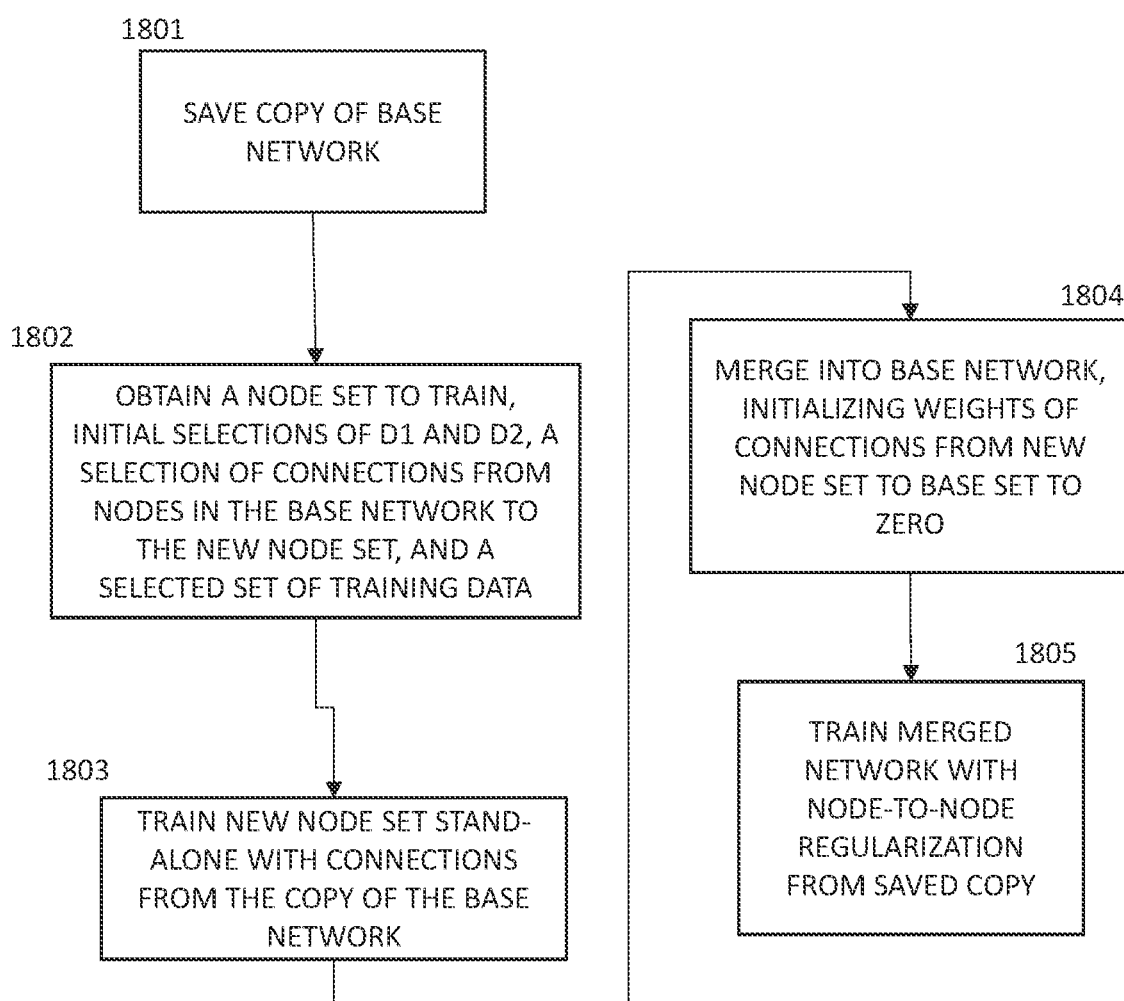
FIG. 18 is a flow chart of an illustrative embodiment of an aspect of the invention, in which a new node or node set is created by incremental growth.
Figure 19:
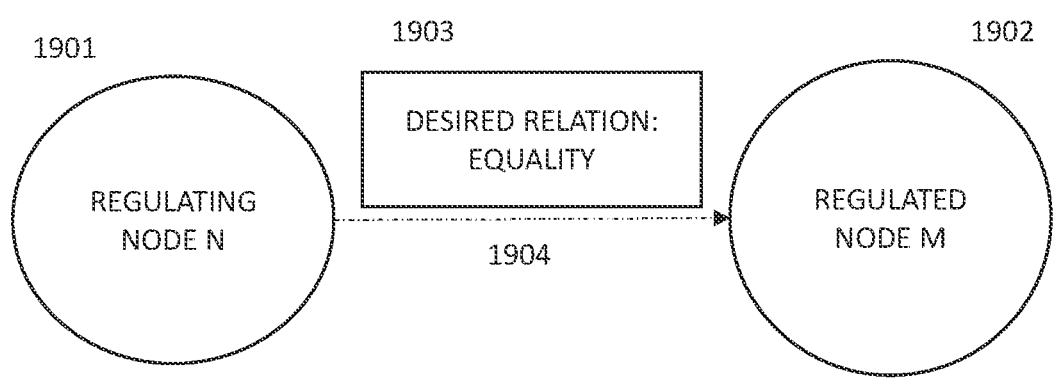
FIG. 19 is a diagram of a node-to-node relationship regularization link.
Figure 20:
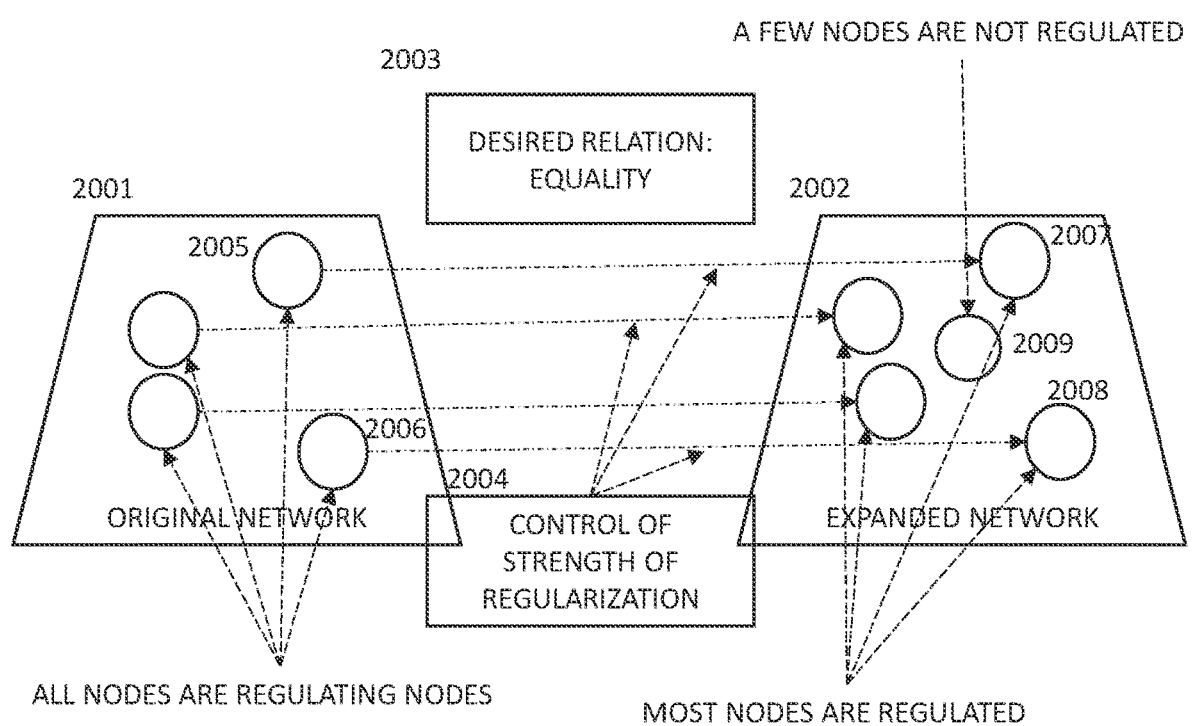
FIG. 20 is an illustrative embodiment of an aspect of the invention herein called "all-node regularization."

Node-to-node relationship regularization enables targeted incremental growth to learn new things efficiently while not forgetting what the initial network has already learned, as explained in association with FIG. 20 and block 1805 of FIG. 18. As explained in association with FIG. 19, node-to-node relationship regularization comprises creating a link between a regulating node and a regulated node. However, this link is not a network connection and does not participate in the feed forward activation computation of the regulating or regulated node. Rather, this link imposes a node-specific regularization on the regulated node that may be applied just before, during, or just after the back propagation of the partial derivatives of the network objective or error loss function. This regularization imposes a node-specific regularization cost on the regulated node if the activation computed for the regulated node during the preceding feed forward computation violates the specified relation for the node-to-node relationship link.

In an illustrative embodiment of an aspect of the invention relevant to block 110, each node in the initial (or base) network is linked to the corresponding node in the expanded network and the specified desired relationship is for the activation value of the regulated node to be the same as the activation value of the corresponding node in the initial network when activated by the same input datum d, as explained in association with FIGS. 19, 20 and block 1805 of FIG. 18. This use of node-to-node relationship regularization is herein called "all-node regularization." In situations where the expanded network is used as a replacement for the base network, such as because the performance of the base network, even after training, is unsatisfactory for some reason, the activation value of the regulating node of the base network for the input datum, d, can be stored in memory to be used for the node-to-node relationship regularization of the regulated node in the expanded network. Indeed, the activation values for all of the nodes for all of the training data items can be stored for potential use of node-to-node relationship regularization. In other situations, such as where the base network and expanded network are members of an ensemble, the base network and the expanded network could be trained together, as part of the training of the ensemble, such that the activation values of the base network are available for node-to-node relationship regularization.

The specified relationship is not forced, it is encouraged to a degree that is determined by hyperparameters. These hyperparameters may be specified in the system design, but in a preferred embodiment they are controlled by the ILMS. The ILMS, implemented on computer system such as 3600, may adjust the strength of this regularization on a node-specific basis based on the results of the testing done in block 110. In some embodiments, a node-to-node relationship regularization applies only for selected data. The ILMS may also adjust this selection of data. A tight control on this node-to-node relationship regularization helps prevent the expanded network from forgetting anything that the initial network has already learned while targeted, looser regularization allows some weights to be changed to learn new knowledge that has been enabled by the addition of the new nodes or other network sub-components. This embodiment is discussed in further detail in association with FIG. 20.

Figure 21:
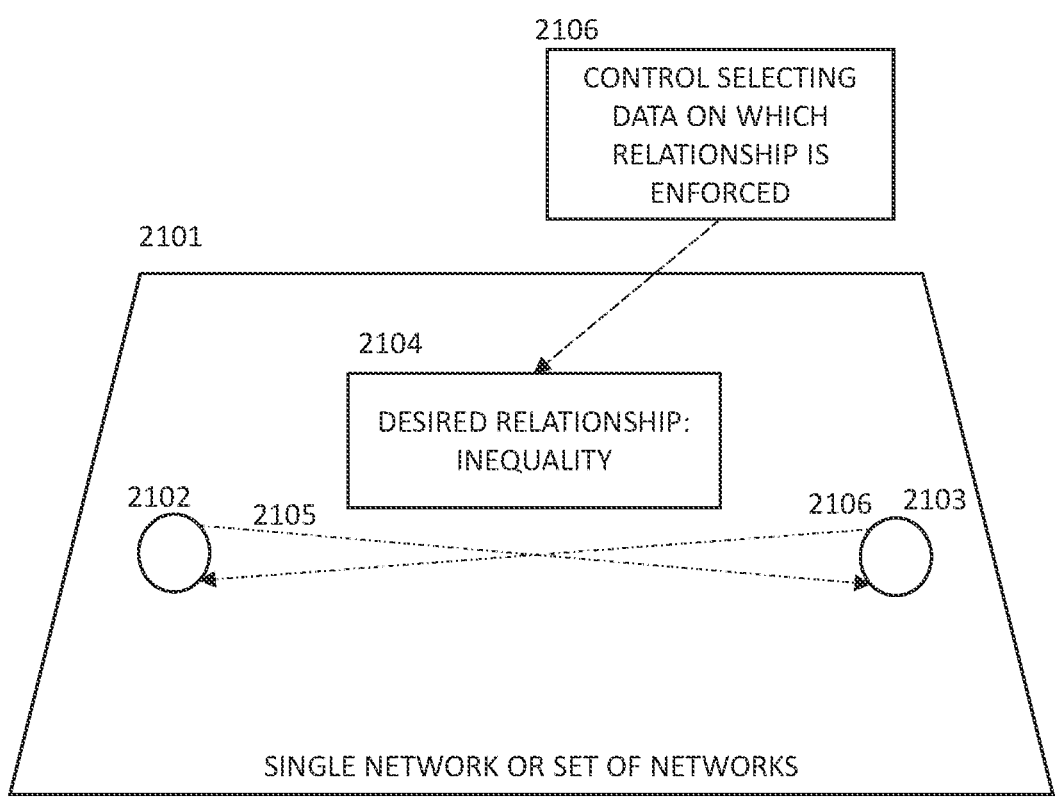
FIG. 21 is an illustrative embodiment of another aspect of node-to-node relationship regularization.

In another aspect of node-to-node relationship regularization, illustrated in FIG. 21, two nodes in the expanded network may be linked with a node-to-node relationship link in which the specified relationship is to have their activation values not be equal. This relationship may be used, for example, when a new node is to be encouraged to learn something that a target node or some related node has failed to learn. This relationship may also be used more broadly to encourage diversity in the training of a network or of an ensemble, as discussed in association with FIG. 21.

In block 111, the computer system 3600, in association with the ILMS, adjusts the degree and kinds of regularization. This regularization includes many forms of regularization that are well known to those skilled in the art of training neural networks.

In addition, in block 111, the computer system 3600 and the ILMS adjust a form of regularization that is unique to incremental growth, and that works well with targeted incremental growth. This form of regularization is herein called "node-to-node relationship regularization." Node-to-node relationship regularization is discussed in association with FIGS. 19, 20 and 21. In some embodiments, in block 111, computer system 3600 may increase the strength of some or all the node-to-node relationship regularization links, including the all-node regularization links from the initial network obtained in block 101 to the merged network built in block 106, if the tests performed in block 110 indicate the need to do so. On the other hand, in block 111, computer system 3600 may selectively decrease the strength of some of the node-to-node relationship links to facilitate learning new things, if the tests in block 110 indicate the need to decrease the strength of some links.

In block 112, computer system 3600 checks one or more stopping criteria. Based on the tests performed in block 110 and on hyperparameters and learning paradigms specified by the humans and AI systems in the ILMS, computer system 3600 may proceed in any of several ways. For example, computer system 3600 may return to block 102 to begin the selection of another target node and/or datum and another incremental growth of the network. As another example, if the error rate meets a specified criterion and the interpretation and sensibility are adequate, computer system 3600 may terminate the training.

Figure 2:
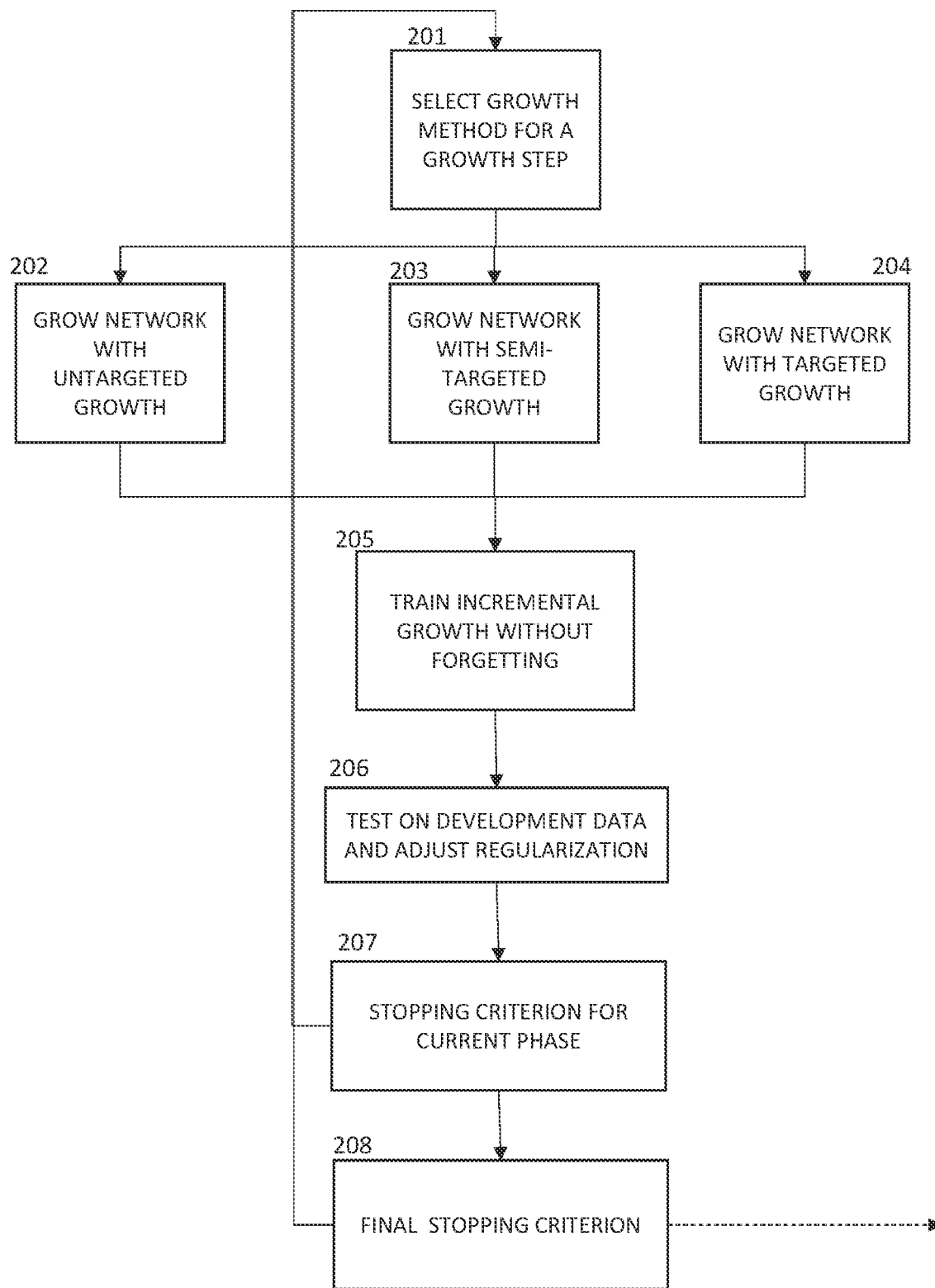
FIG. 2 is a flow chart of a higher-level network growth and training process that comprises the targeted incremental growth illustrated in FIG. 1.

In some circumstances, in some embodiments, as illustrated in FIG. 2, computer system 3600 may choose to switch, at least temporarily to semi-targeted or untargeted growth. FIG. 2 is a flow chart of a higher-level network growth and training process that comprises the targeted incremental growth illustrated in FIG. 1. In block 201, computer system 3600, controlled by hyperparameters or as directed by the ILMS, selects one of the growth methods: untargeted, semi-targeted or targeted growth.

In block 202, computer system 3600 proceeds in untargeted growth. In untargeted growth, computer system 3600 may substantially increase the size of a network or of a multi-network system such as an ensemble. For example, computer system 3600 may add one or more entire layers to a layered feed forward neural network or greatly increase the number of member networks in an ensemble. In preferred embodiments, even with untargeted growth, the expanded system may be initialized and regularized using node-to-node relationship regularization to achieve incremental growth while remembering what the initial system has already learned, learning, as explained in association with block 205, block 108 of FIG. 1, and FIGS. 19, 20 and other figures.

Figure 22:
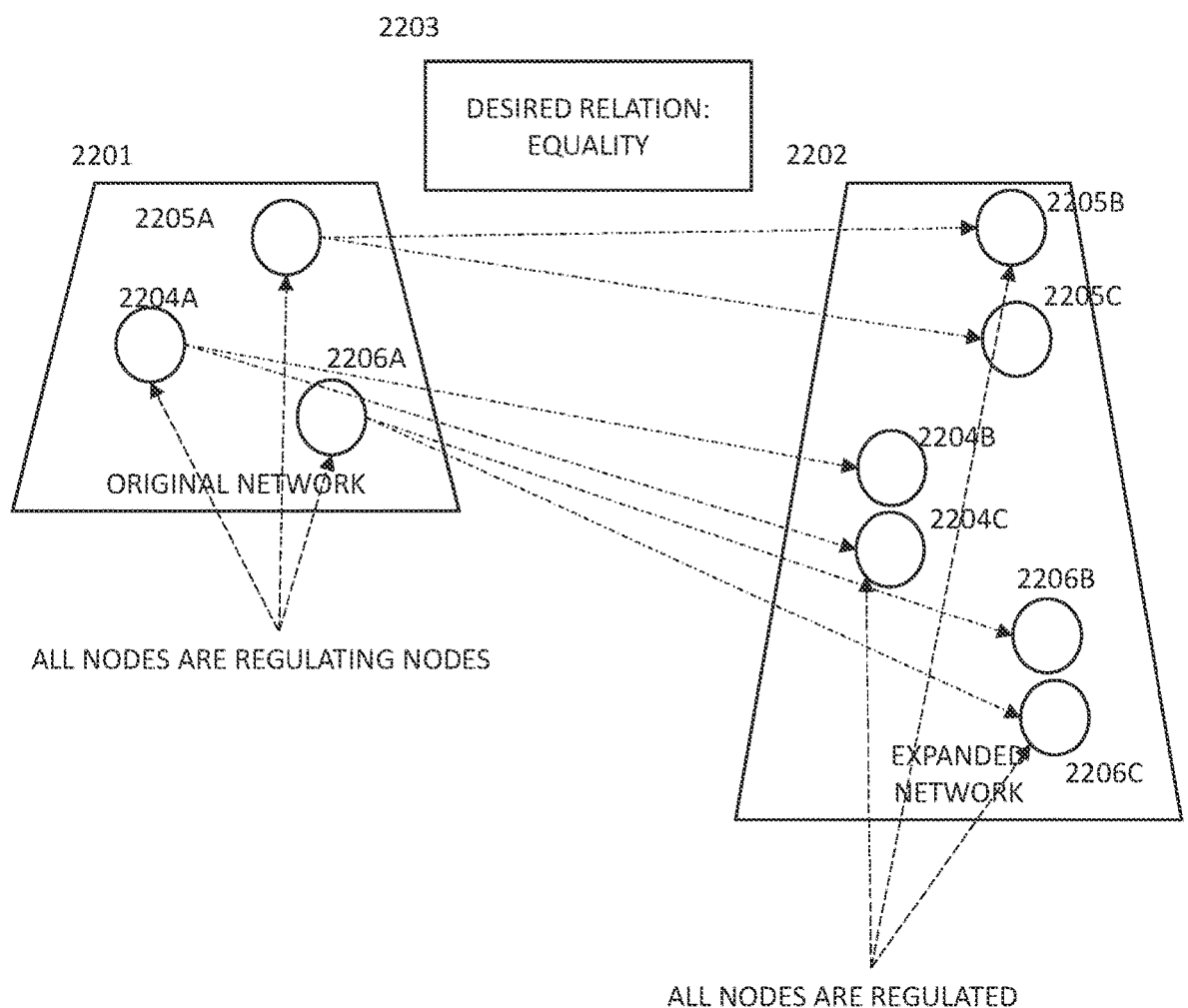
FIG. 22 illustrates an aspect of the invention, herein called "doubling."

For example, the number of nodes of a neural network may be doubled with each of two new nodes corresponding to a regulating node in the initial network being a regulated node, as discussed in association with FIG. 22. The ILMS may customize the respective strengths of the regularization of the two nodes so that, for example, one can learn something new while the other remembers what has already been learned. Using ILMS customized control of node-to-node regularization strength means that computer system 3600 does not need to predetermine which node plays which role. The role assignment or even the sharing of the roles may be determined by the changes that occur in the surrounding network during the process of continued training.

There are many embodiments of untargeted growth with different choices as to the form and size of the additional structure. For example, some embodiments use a more moderate rate of growth, such as layer-by-layer growth of a layered feed forward neural network. More moderate growth may facilitate control of the degree of regularization and obtain better generalization to new data. In incremental growth used in various embodiments of the invention, computer system 3600 may initialize each new, expanded network from the previous network, so the amount of computation needed to train the expanded network is generally much less that would be required to train the expanded network from scratch.

In block 203, computer system 3600 proceeds with semi-targeted growth. In semi-targeted growth a connection or node may be added to the network or hyperparameters may be changed to help the training process overcome slow training such as occurs near a stationary point in the network error loss function. The growth may be targeted at accelerating the training and thereby improving performance without being targeted at a specific node or datum.

For example, consider the formula for updating a weight of an existing connection between a node j and a node k in stochastic gradient descent:

$$\delta_{j,k} = \Sigma_d Y_j(d) * \partial \text{Loss}(d)/\partial Z_k(d)$$

where $Y_j(d)$ is output activation value of node j on datum d, Loss(d) is the error loss function for datum d, $Z_k(d)$ is the weighted sum of the inputs and bias of node k for datum d, and the sum is taken over some specified batch of data such as a mini-batch. This formula may also be evaluated for a pair of nodes j and k that are not connected. It may be used by computer system 3600 to select a pair of unconnected nodes j and k to be connected by a new connection in semi-targeted growth.

As another example, a node may be added to a network by splitting a single node into two nodes and creating a node-to-node relationship regularization link in which the specified relationship is that the two nodes should have different activations when the network is activated by any datum d in a specified set of data. An example embodiment of node splitting is discussed in association with FIG. 26.

Node-to-node relationship regularization links that encourage diversity are discussed in association with FIG. 21. By choosing a large or small set of data on which the relationship is to be enforced, computer system 3600, guided by the ILMS, may control the circumstances under which the two nodes diverge.

In block 204, computer system 3600 proceeds with targeted incremental growth as has been described in association with FIG. 1. In the embodiment illustrated in FIG. 2, blocks 204-208 together represent the operations of blocks 102-111 in FIG. 1, except the steps are somewhat reordered and the descriptions of block 205-208 are simplified to a generic version that fits untargeted and semi-targeted incremental learning in addition to targeted incremental learning. In block 204, computer system 3600 performs preliminary tasks to the training process in block 205. The preliminary tasks vary somewhat in various embodiments, as explained in association with other figures.

In various embodiments, the incremental growth that computer system 3600 may implement in blocks 204 and 205 may add a single new node or a small set of nodes to the base network. As explained in association with FIG. 1, the addition of this new node or node set may be targeted at improving the performance of a selected node N1.

An example of a preliminary task that may be performed by computer system 3600 in block 205 is to pick a target node N1 whose performance is to be improved in some way. In some embodiments, another preliminary task that may be performed by computer system 3600 is to select a target datum D1. Several embodiments of the selection of N1 and D1 are illustrated in FIG. 3. In some embodiments, another preliminary task is to select a second datum D2 which is to be discriminated from D1. An example embodiment of the selection of D2 is illustrated in FIG. 4.

Figure 5:
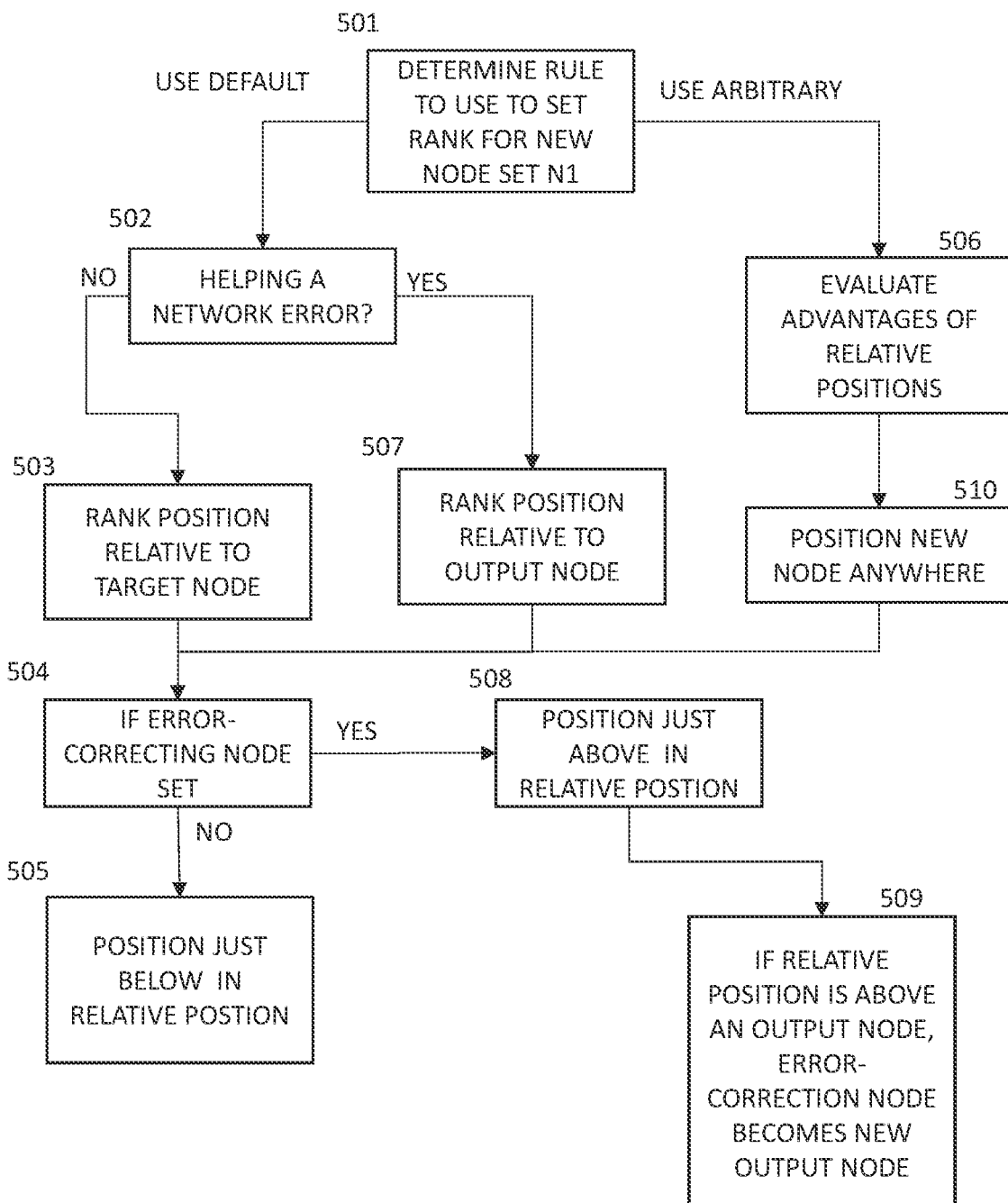
FIG. 5 is a flowchart of an illustrative embodiment of an aspect of the invention in which a computer system determines the position in the network at which to place a new node or node set.

Another preliminary task that may be performed by computer system 3600 in block 204 is to select the position in the base network at which the new node or node set will be placed when the new node or node set is added to the base network, such as described in association with FIG. 5. Even in embodiments in which computer system 3600 trains the new node or node set as a stand-alone network, the position in which the new node or node set is to be placed must be determined first because the position of the new node or node set affects the possible choices for connections from nodes in the base network to the new node or nodes in the new node set.

Another preliminary task that may be performed by computer system 3600 in block 204 is to select the nodes in the base network that may have connections to one of more nodes in the node set. In some embodiments, in block 204, computer system 3600 may also determine initial values for the connection weights for these connections.

Another preliminary task that computer system 3600 may perform in block 204 in various embodiments is to select a set of training data and target values for each selected training datum for the stand-alone training. In some embodiments, the stand-alone training uses a subset, possibly a small subset, of the full training set to reduce the amount of computation required for the training. The selection of the stand-alone training set and the target values depends of the selected improvement method. Examples of various improvement methods that are used in various embodiments are presented in FIG. 3 and discussed in association with other figures.

In general, the preliminary tasks that have been discussed above are prerequisites for block 1802 in FIG. 18.

In block 205, computer system 3600 trains the new node sets as a stand-alone network and then merges the stand-alone network into the base network to create an expanded network. The expanded network may continue to be trained without forgetting, by using the process described in association with FIG. 18 and continued all-node regularization as illustrated in FIG. 20.

In block 206, computer system 3600 performs tests on development data. Computer system 3600 will have already trained the base network before the incremental growth of block 202, 203, or 204 and tested its performance on the training data and development data and will have recorded the results. Thus, in addition to comparing the performance of the new, expanded network on the training data to its performance on development data, in block 206, computer system 3600 may make other comparisons. For example, computer system 3600 may compare the performance of the expanded network to the performance of the base network. The computer system 3600 may also compare a ratio of performance to cost. Using a node-specific local target, as described in association with FIGS. 6 and 7, computer system 3600 may also measure the performance of an inner node N and make a comparison of the performance of node N on training data and development data. For any node in the base network, computer system 3600 may compare the node's performance in the expanded network to its performance in the base network.

In some embodiments, the stand-alone network may be tested and confirmed for interpretability under control of the AI systems and human teams in the ILMS, especially in the case of targeted incremental growth, as explained in association with block 108. In block 206, computer system 3600 may test and confirm interpretability of the stand-alone network in any of the three methods of incremental growth and confirm the success of propagating any interpretation in the expanded network. The targeted incremental growth of FIG. 1 or block 204 may facilitate this interpretation and testing process.

In block 206, computer system 3600 may also perform tests that are used in the stopping criteria of blocks 207 and 208.

In block 207, computer system 3600 may check a stopping criterion that is specific to the method of incremental growth that computer system 3600 used in the latest round of growth to help decide whether to continue using that method of growth or to switch to a different method of growth. In some embodiments, herein called "three-phase" embodiments, the incremental growth occurs in three phases. First, computer system 3600 performs untargeted incremental growth, making relatively large changes in the size of the network with each growth step. Then, in these three-phase embodiments, computer system 3600 makes smaller, semi-targeted incremental growth steps. Finally, computer system 3600 uses targeted incremental growth to make final improvements in the network.

In some embodiments, the process starts with a network that has been pre-trained. The pre-trained network may have been trained on the same task and data as the current training task or it may have been trained on a different task or on different data. In any case, the pre-trained network may already be of a size and performance level in which further untargeted growth is not desired by the developer or is not selected by the ILMS. In such embodiments, computer system 3600 may begin training with semi-targeted or targeted incremental growth.

In some embodiments, computer system 3600 may start targeted incremental growth with an empty network with only input variables and targets for the outputs.

In three-phase embodiments, in block 207, computer system 3600 checks a stopping criterion to decide when to switch from untargeted growth to semi-targeted growth and a criterion to decide when to switch from semi-targeted growth to targeted growth. For example, a criterion for stopping untargeted growth may be that the performance on development data is worse than the performance on training data by a margin that is greater than the margin that was measured for the base network before the latest incremental growth step. In such a case, in some embodiments, computer system 3600 may not only terminate the untargeted growth phase, it may revert to an earlier base network before proceeding to the semi-targeted growth phase.

In embodiments in which computer system 3600 switches back and forth among the three incremental growth methods, computer system 3600 may temporarily stop untargeted incremental growth if, for example, the relative performance improvement in the latest round of incremental growth is less than expected or if it is less than the relative increase in cost in some measure.

Semi-targeted incremental growth and targeted incremental growth both may target increasing the magnitude of the gradient, so in some embodiments there is little barrier to switching back and forth if the purpose of the current incremental growth is to accelerate the training. In addition, either method may be used to create an expanded network with non-zero gradient even when the training of the base network has converged to a local or global minimum of the error loss function for the base network. Computer system 3600 may implement this form of improvement, for example, by various methods listed in block 309 FIG. 3.

Figure 7:
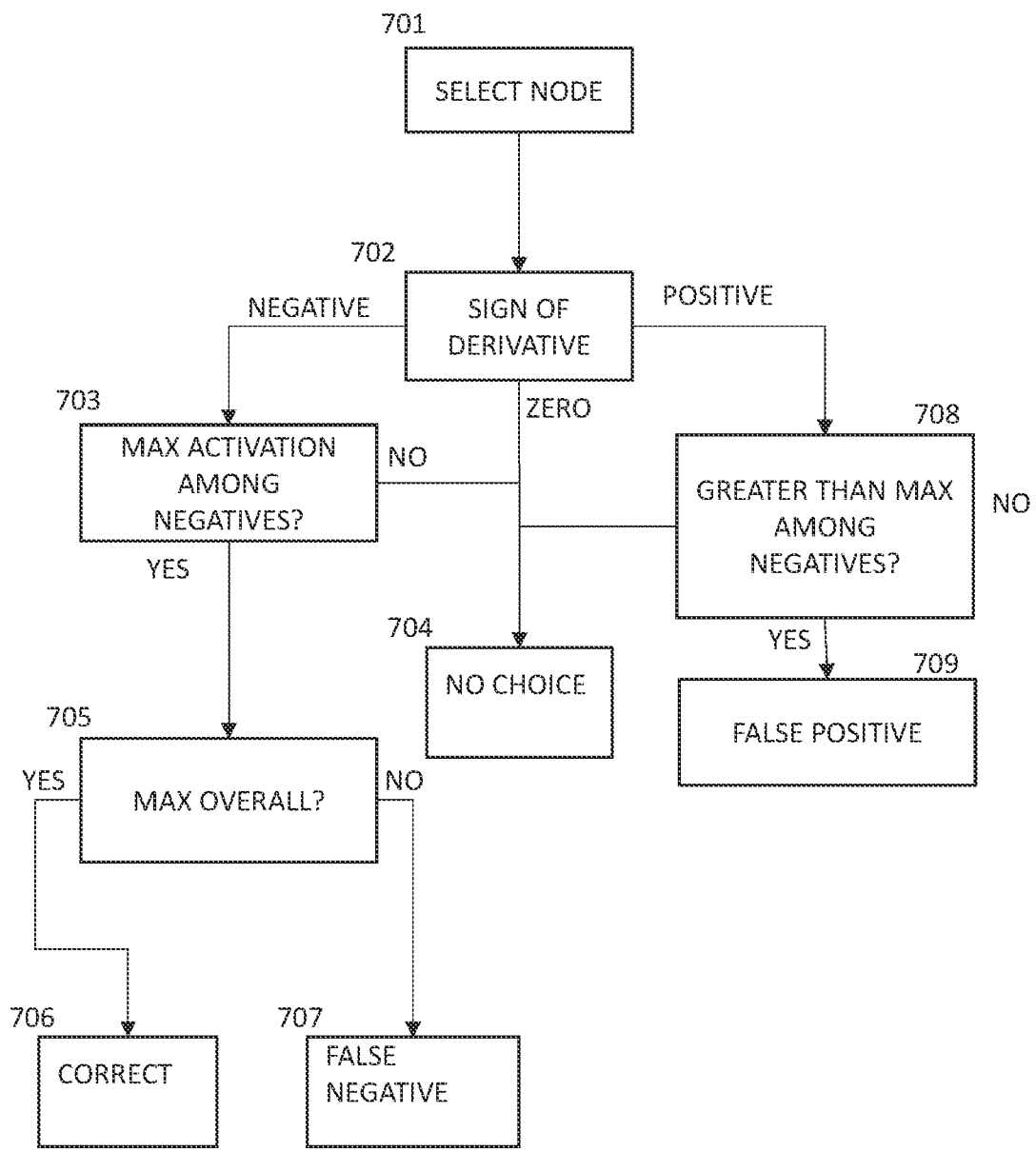
FIG. 7 is a flow chart of an illustrative embodiment of an aspect of the invention in which a computer system determines whether a node k in a softmax set S has made a classification error on a datum d.

On the other hand, targeted incremental growth is also capable of targeting specific errors, either network errors or errors of an individual node relative to a node-specific target, as explained in association with FIGS. 6 and 7. Computer system 3600 may correct such errors, for example, by the methods listed in block 304 in FIG. 3. In some embodiments, computer system 3600 may temporarily stop semi-targeted incremental growth and switch to targeted incremental growth based in part on a criterion that detects an opportunity for targeted incremental growth. For example, computer system 3600 may switch if a persistent error seems to be limiting the performance.

In some embodiments, semi-targeted incremental growth and targeted incremental growth may be completely mixed and treated as a single method. However, in the illustrative embodiments described herein, computer system 3600 adding one or more connections to a network without adding any nodes may be an instance of semi-targeted growth. Therefore, in some embodiments a criterion for temporarily stopping targeted incremental growth may be that testing has revealed an opportunity to improve performance by adding one or more connections without adding any nodes. Such an opportunity may be detected by computer system 3600 evaluating the expression in the discussion of block 203 for a node pair j, k that are not currently connected:

$$\delta_{j,k} = \Sigma_d Y_j(d) * \partial Loss(d)/\partial Z_k(d).$$

If computer system 3600 determines in block 207 to stop the current method of incremental growth, before switching to another method of incremental growth, computer system 3600 proceeds to block 208 to test criteria for terminating the growth and training process. An example criterion for stopping the process is that there are no more errors and that goals for robustness, sensibility, and interpretability have been satisfied. In some embodiments a stopping criterion might be that there are no remaining errors on the training data.

In other embodiments, training may continue, attempting to improve performance on development data or other measures of the ability to generalize to new data. In three-phase embodiments, any criterion for computer system 3600 stopping targeted incremental growth in block 207 is automatically also a criterion for stopping the growth and training process in block 208.

Another example criterion for computer system 3600 stopping the process in block 208 would be the inability of the incremental growth process to achieve continued improvement on development data even though the error rate on training data has not been reduced to zero.

Another example criterion is the use of some resource reaching a specified limit, such as a limit on the amount of time, the amount of computation, or the amount of memory required. The limit on a resource might be a limit on the resource used in the training process or it might be a limit on the estimated resources required for a deployed version of the network, based on its size and complexity.

If computer system 3600 does not determine to stop the process based on the specified stopping criteria, in block 208, computer system 3600 returns to block 201 to select the method to use for the next round of incremental growth. If no criterion for stopping the current method has been met in block 207, computer system 3600 continues to select the current method. If, in block 207, a criterion for selecting a particular new method has been met, such as an opportunity unique to that method, then computer system 3600 selects that method in block 201. If no criterion preferring a particular method has been met, computer system 3600 may select a method based on a predetermined schedule or by a random selection.

FIG. 3 is a flowchart of an illustrative embodiment of a process by which computer system 3600 may select a target node N1, select a target datum D1, and select among several methods to make an incremental growth in the network to improve the performance of N1. In block 301, computer system 3600 decides which of two criteria to use to select a target node N1.

If computer system 3600 chooses to select a target node that makes classification error, it proceeds to block 302. In this path, computer system 3600 may create and train an incremental addition to the network that corrects an error or at least reduces the error loss function for the error.

If computer system 3600 chooses to increase the magnitude of a selected partial derivative, for example, to break out of a region of slow learning, then computer system 3600 proceeds to block 306, to select a node for which the magnitude of the derivative of the network error loss function with respect to the node's activation value averaged across a selected subset of training data is small (e.g., less than a threshold).

In block 302, computer system 3600 selects a node that makes a classification error. It is straightforward to determine whether an output node in a classifier has made a classification error. However, on most tasks, even on training data, the target classification is only specified for output nodes.

In a preferred embodiment, computer system 3600 uses the process illustrated in FIGS. 6 and 7 to determine, for each datum on which a node N has made a classification choice whether that choice is correct. For any bounded, monotonic activation function, such as the sigmoid function $\sigma(x)=1/(1+\exp(-x))$ or the hyperbolic tangent $\tanh(x)=(\exp(x)-\exp(-x))/(\exp(x)+\exp(-x))$, the node may be said to make a classification choice depending on whether the activation value is above or below a threshold value that is set by a hyperparameter specified by the system developer or by the ILMS. The value of x is the weighted sum of the incoming connections and node bias. Both the sigmoid function $\sigma(x)$ and the hyperbolic tangent function $\tanh(x)$ have a natural threshold at the value $x=0$, which corresponds to an activation value of 0.5 for the sigmoid function and an activation of 0 for the hyperbolic tangent. In some embodiments, the system developer or the ILMS may set a threshold value different from the natural threshold.

On the other hand, for a rectified linear unit with an activation function defined by $ReLU(x)=0$ if $X \leq 0$, $=x$, if $x>0$, it is not necessarily clear that the node has made a classification choice. In a preferred embodiment, a node with a $ReLU(x)$ activation function may be said to be fitting a piecewise linear regression if $x \geq 0$ and not to be making a classification choice. However, if $x<0$, the node with a ReLU activation function will have made an implicit classification choice comparable to a sigmoid or hyperbolic tangent with $x<0$. In some embodiments, the computer system 3600 may determine a node N with a ReLU activation function is in error on a datum d for which $x_N(d)<0$ by a process similar to the process illustrated in FIGS. 6 and 7.

In the region of input values $x<0$ for a node with a ReLU activation function, the derivative of the function is zero, so the derivative of the network error loss function is also zero with respect to the input to the node. However, the derivative of the error loss function with respect to the output value of the ReLU may be either positive or negative. If the derivative of the error loss function is negative, the negative of the derivative would be positive. If a non-zero negative gradient update were possible it would be in the direction of trying to make the activation positive. In other words, a positive derivative with respect to the output value of the node is trying to change the classification from making a choice to not making a choice. In this embodiment, computer system 3600 treats such a classification choice as an error. Thus, even for a node with a ReLU activation function there may be some data for which the node makes a classification choice and the choice is an error. A node for which there is such an error would be a possible choice for N1, as would any node with a bounded activation function with a specified threshold if the node makes an error on at least one datum.

In block 303, computer system 3600 selects as a target datum a datum D1 on which node N1 makes a classification error. By the criterion in block 302 for selecting N1, there is at least one such datum.

Figure 8:
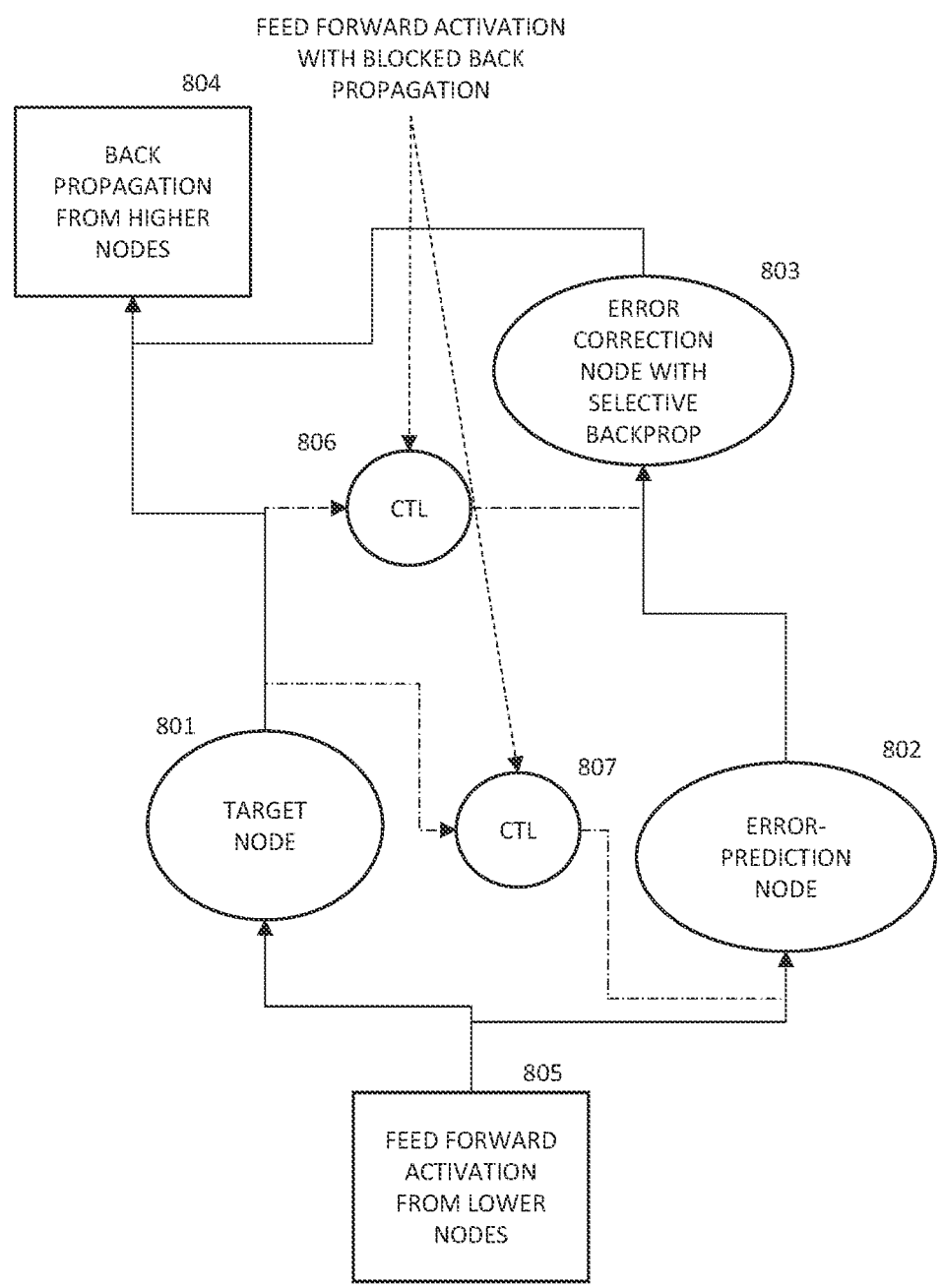
FIG. 8 is an illustrative embodiment in which a pair of new nodes attempt to predict and correct classification errors of a target node.
Figure 9:
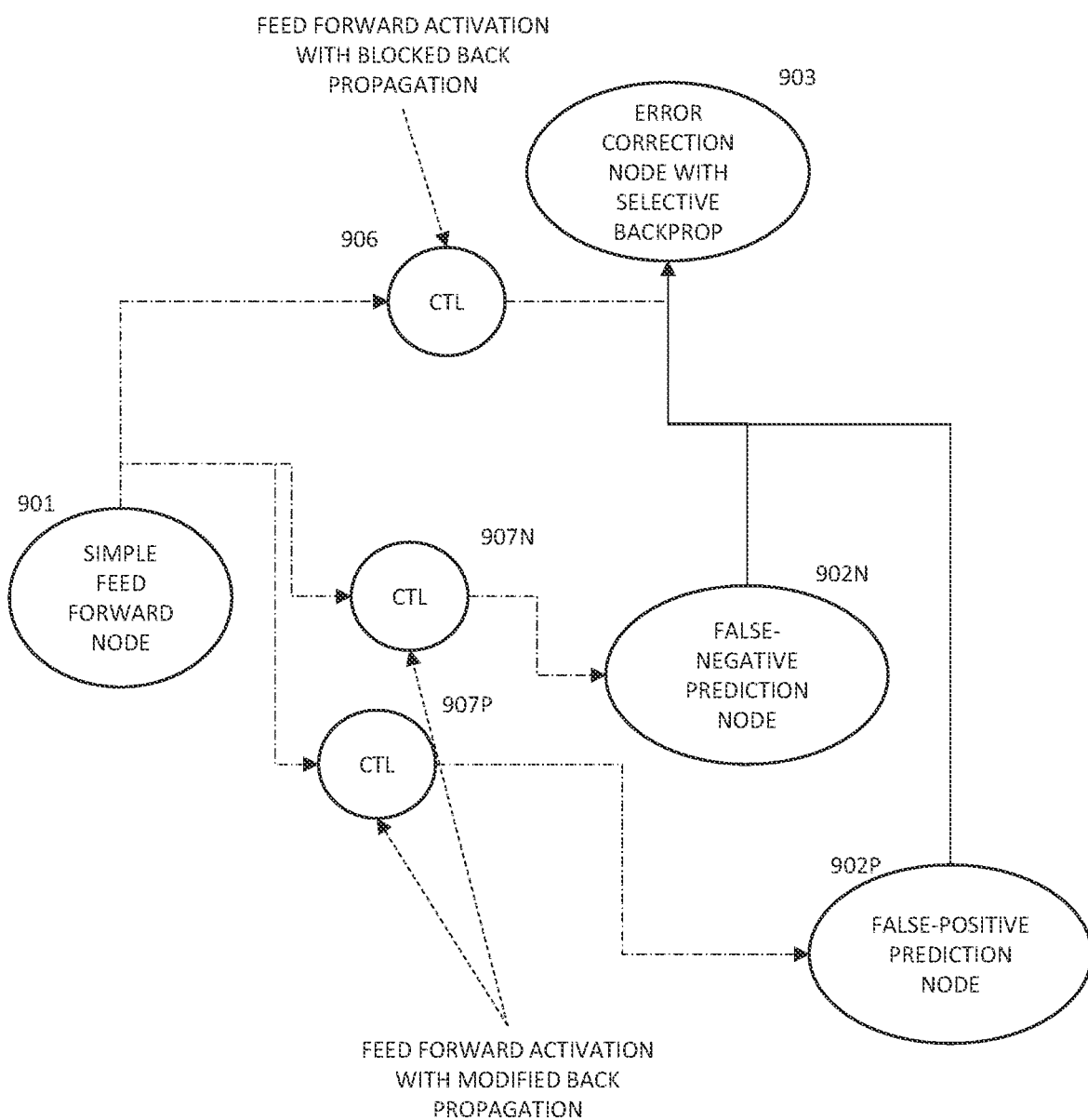
FIG. 9 illustrates another embodiment of an error prediction and error correction node set.
Figure 23:
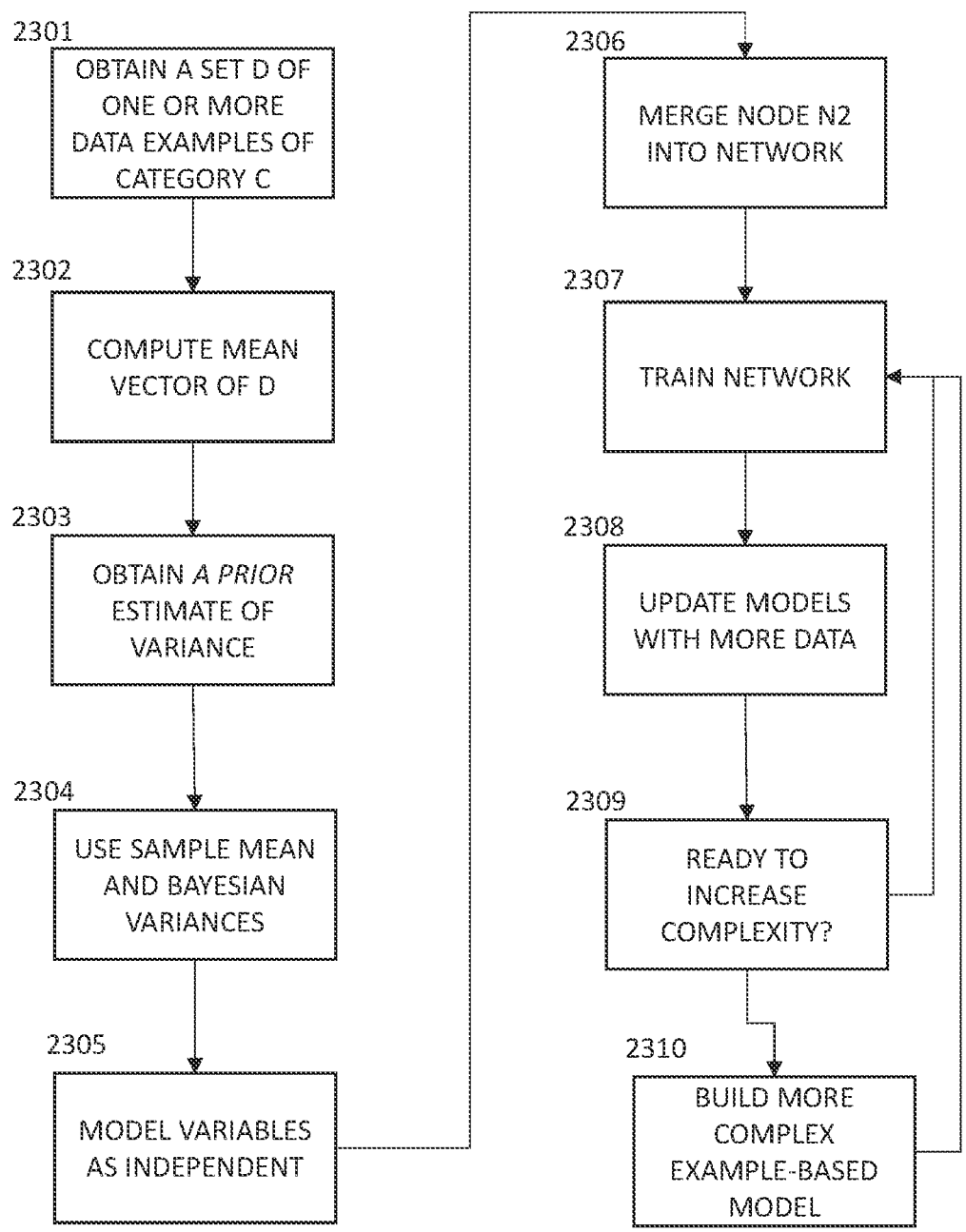
FIG. 23 is a flowchart of an illustrative embodiment of the invention in which a detector node N2 is created and trained to be merged as an incremental addition to a network.
Figure 26:
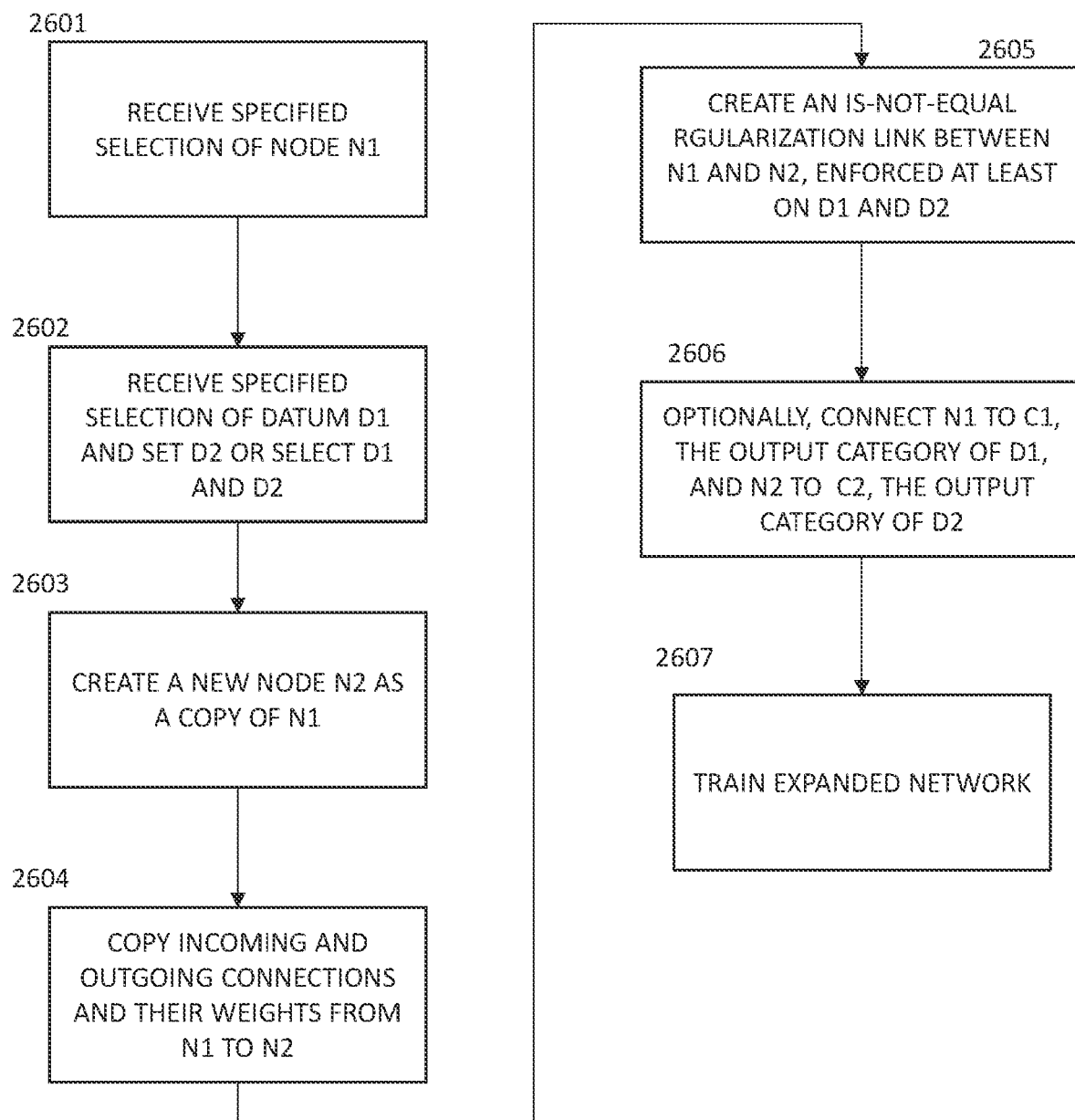
FIG. 26 is an illustrative embodiment an aspect of the invention, herein called "node splitting."

In block 304, computer system 3600 selects one of several methods for making an incremental addition to the network to improve the performance of node N1. In this illustrative embodiment, there are four choices: (1) to create a detection node to detect instances of D1 and to reject data that are not instances of D1, for example, as illustrated in FIG. 23; (2) to create a discriminator node to discriminate between datum D1 and some other datum or set of data D2, for example, as illustrated in FIG. 13, 32, 33 or 34; (3) to add a combination of an error prediction node and an error correction node as illustrated in FIGS. 8 and 9; (4) to split target node N1 into two nodes, as illustrated in FIG. 26. Then computer system 3600 proceeds from block 304 to block 310. If computer system 3600 selects in block 301 to use the criterion of a small magnitude for the derivative averaged over a set of data (e.g., less than a threshold), then computer system 3600 proceeds to block 306.

In block 306, computer system 3600 selects a node N1 with a small magnitude (e.g., less than a threshold value) of the derivative of the network error loss function with respect to the activation function when the derivative is averaged over a specified set of data. The specified set of data may be the set of training data or may be a sufficiently large subset of the training data such that the average over the specified set is a good estimate of the average over the full set.

In block 306, computer system 3600 makes a choice whether to proceed to block 307 or to block 308. In some embodiments, the choice may be specified in the system design; in some embodiments it may be determined by a hyperparameter set by the ILMS; and in some embodiments the choice may be made at random or by some specified criterion.

In block 307, computer system 3600 selects a datum D1 for which the value of the absolute value of the derivative $|\partial L/\partial y_{N1}(D1)|$ is relatively large (greater than a threshold value). In some embodiments, computer system 3600 chooses D1 to maximize this absolute value, but that choice is not required. Some embodiments choose a D1 from among the set of data with relatively large values (e.g., greater than a threshold) for this expression. It is sufficient to choose a datum D1 for which the magnitude of the derivative for datum D1 is large relative to the magnitude of the average of the derivative, which, by the selection criterion in block 306, is small.

In block 308, computer system 3600 selects an arbitrary D1 for which the magnitude is of the derivative is non-zero, preferably larger (e.g., greater than a threshold) than the magnitude of the derivative averaged over a specified set of data, such as a minibatch or the entire epoch. In some embodiments, the criterion in block 308 may be used to permit the selection of a target datum D1 that also satisfies some other criterion, such as the criterion in block 302.

Figure 11:
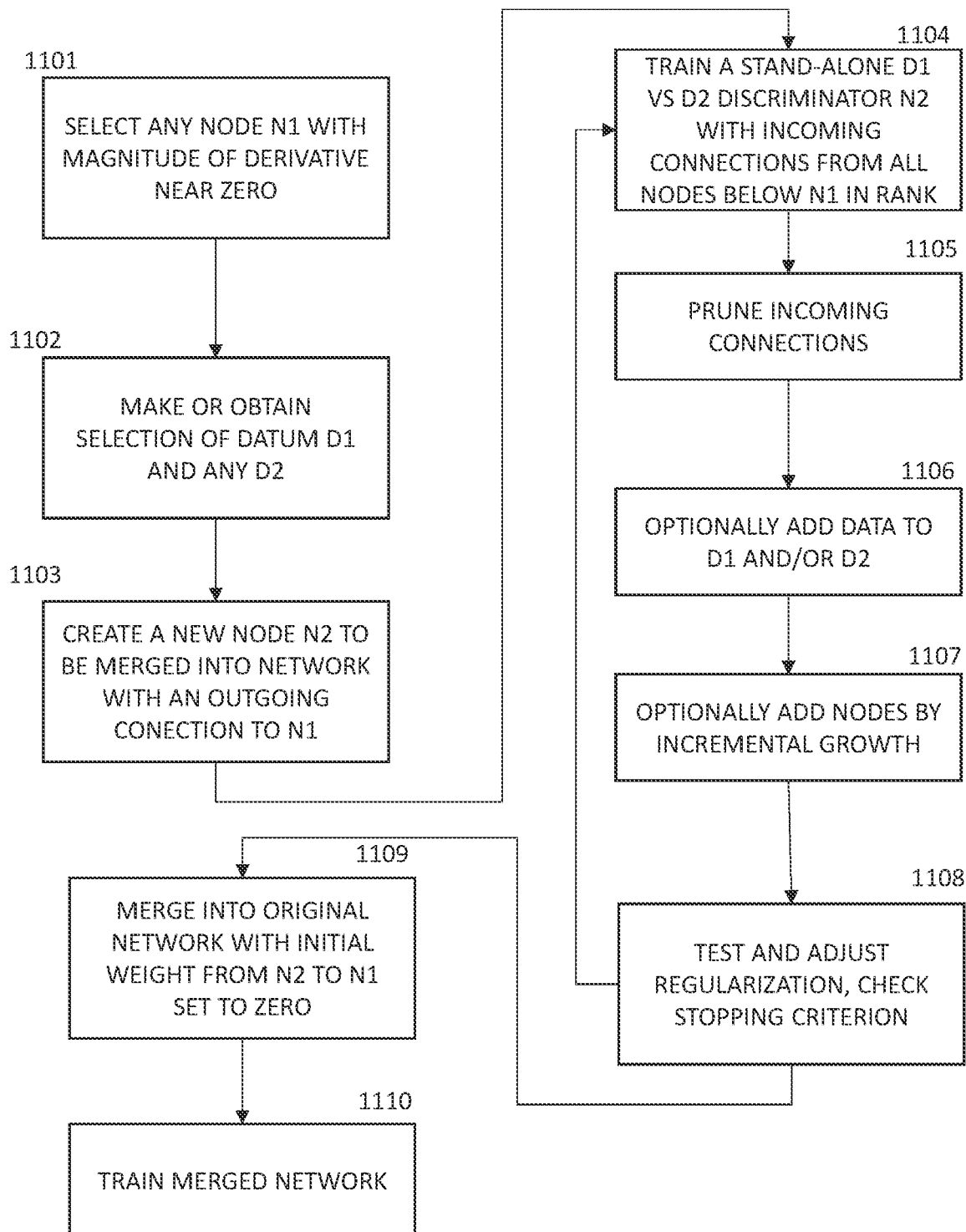
FIG. 11 is a flow chart of an illustrative embodiment of an aspect of the invention in which a computer system uses a procedure herein called a "semi-targeted data procedure."
Figure 13:
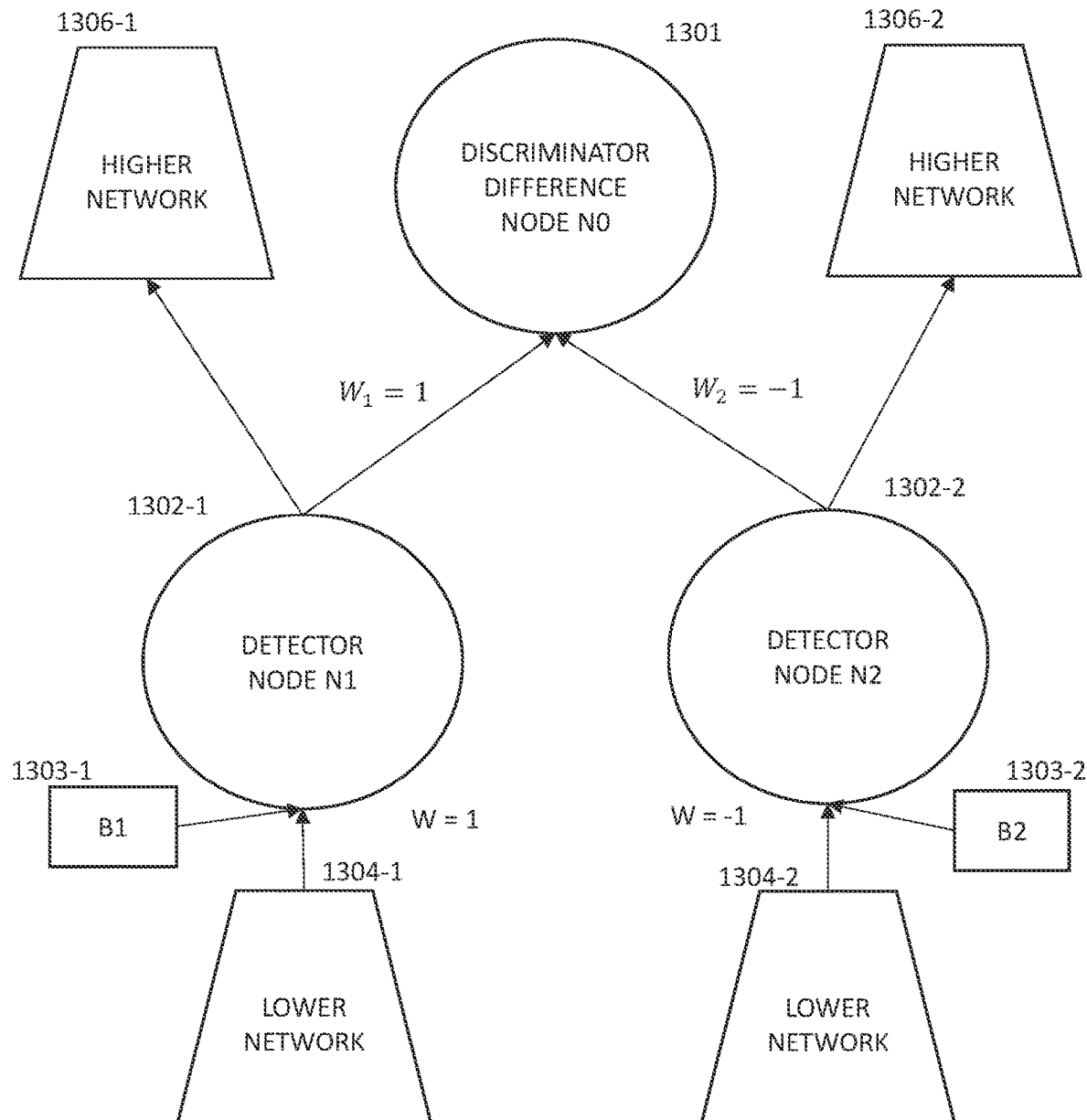
FIG. 13 shows an illustrative embodiment of an aspect of the invention.
Figure 16:
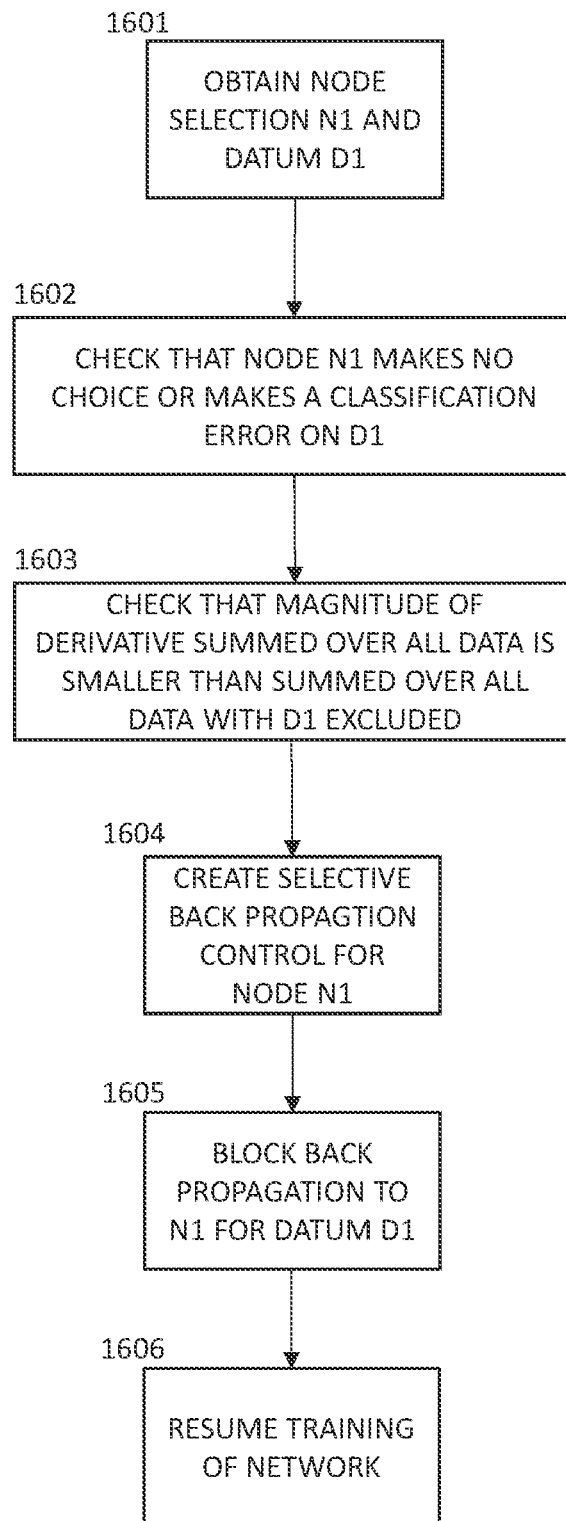
FIG. 16 is an illustrative embodiment of an aspect of the invention which is a form of selective back propagation herein called "implicit delegation."
Figure 17:
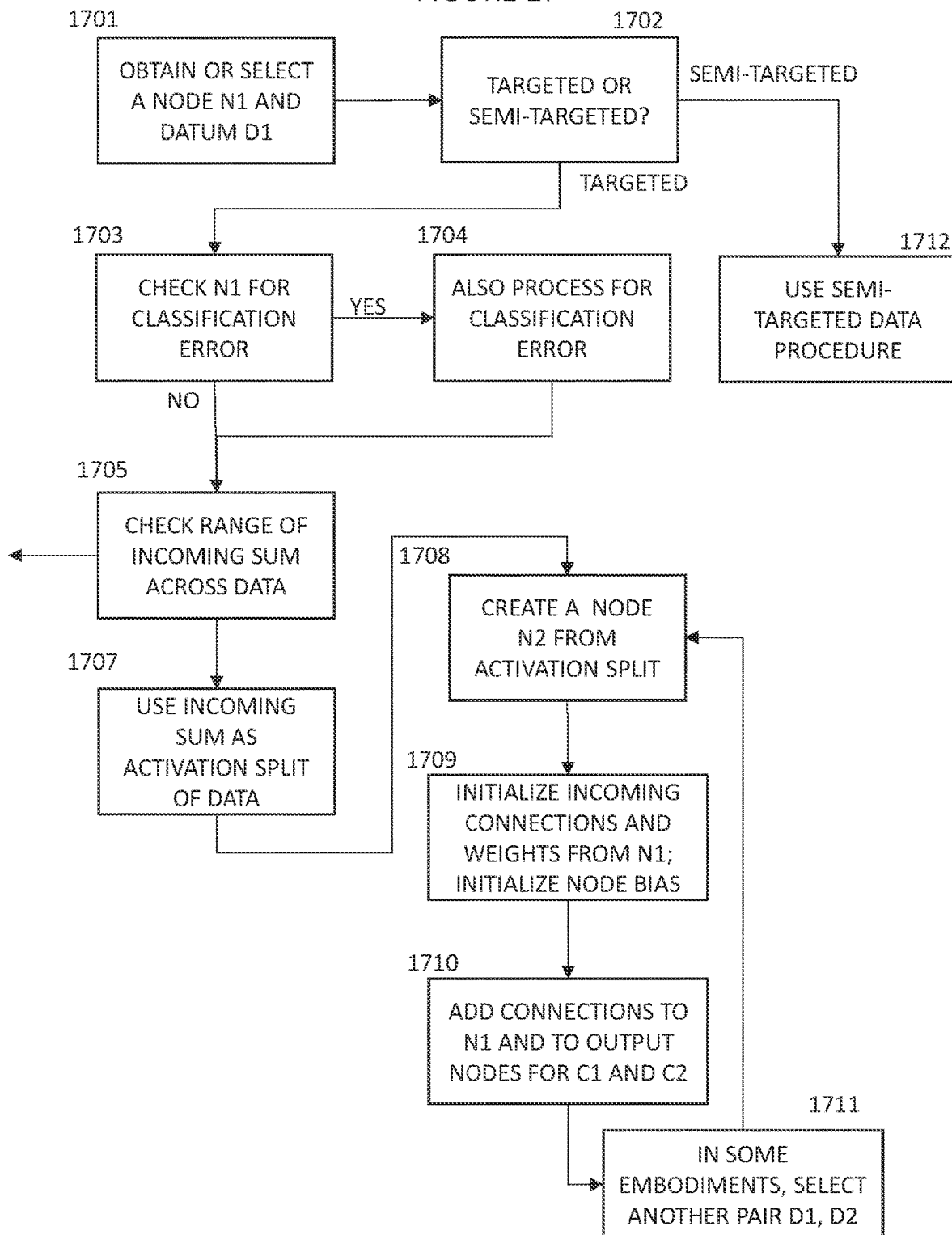
FIG. 17 is a flowchart for an illustrative embodiment of an aspect of the invention for creating a set of nodes that implement what is herein called an "activation split."
Figure 29:
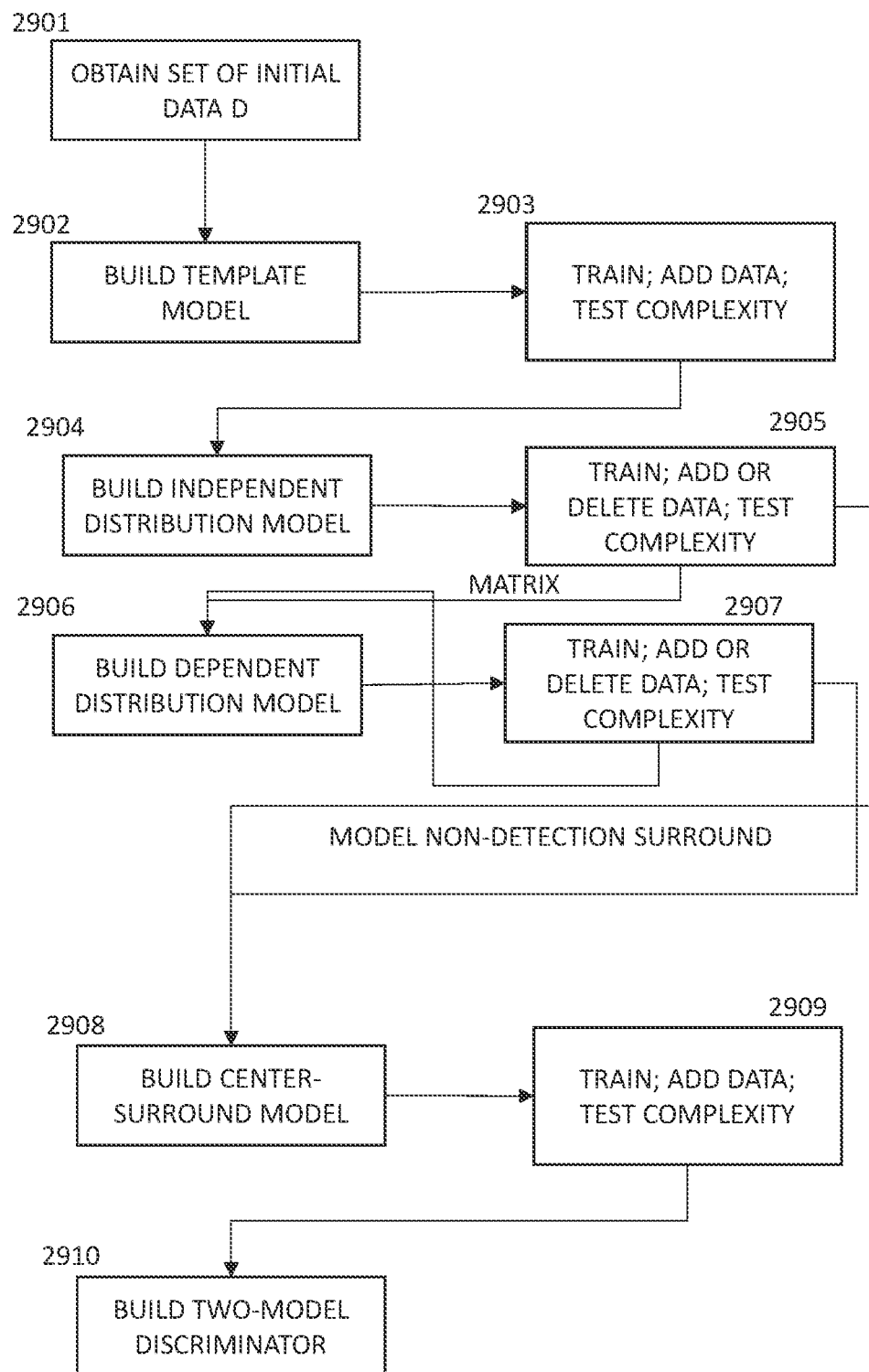
FIG. 29 shows an illustrative embodiment of an aspect of the invention in which increasingly complex example-based models for detectors and discriminators are built.

From either block 307 or block 308, computer system 3600 proceeds to block 309. In block 309, computer system 3600 selects one of several methods for making an incremental addition to the network to improve the performance of node N1. In this illustrative embodiment, there are six choices: (1) to create a discriminator node, as illustrated in FIG. 13; (2) to use node N1 to do an activation data split, as illustrated in FIG. 17; (3) to add a combination of an error prediction node and an error correction node as illustrated in FIGS. 8 and 9; (4) to use a semi-targeted data procedure such as illustrated in FIG. 11; (5) to impose selective back propagation to N1, excluding datum D1, as illustrated in FIG. 16, optionally accompanied by the creation of a detector node for datum D1, for example, as illustrated in FIG. 23 or 29; or (6) to split node N1 into two nodes, as illustrated in FIG. 26. After selecting an improvement method, computer system 3600 proceeds to block 310 and trains the new node or node set.

FIG. 4 is a flow chart of an illustrative embodiment of an aspect of the invention for selecting a set D2 of data items to be discriminated from a target datum D1. In this illustrative flow chart, the selected set D2 may have one or two members or may be empty. In some embodiments additional members may be added to the set D2. In some embodiments, D1 may represent a set with more than one element rather than a single datum. In some embodiments, additional members may later be added to either set D1 or set D2, after computer system 3600 has completed the process illustrated in FIG. 24.

In block 401, computer system 3600 obtains the specification of a target node N1 and a target datum D1.

In block 402, computer system 3600 selects D2 based on the criteria in sub-blocks 403 to 407. In some embodiments, computer system 3600 preferably selects a set D2 with a single element, with exceptional cases for the criterion in block 404 being handled by computer system 3600 as specified in block 405 or block 406. In some embodiments, additional elements may be added to set D2.

In block 403, the criterion is that the classification category of any datum d in the set D2 should be different from the category of datum D1. In some embodiments, if there are two or more elements in the set D2, for example, as specified in block 405, then all members of D2 are required to have the same classification category as each other and different from that of D1.

In block 404, the criterion is that the magnitude of the sum of the derivative of the error loss function with respect to the output activation of node N1, summed over the data in the union of D1 and D2 should not be near zero (e.g., at least a threshold value greater than zero). For example, it may be required to be greater than a threshold specified by a hyperparameter set by the system designer or the ILMS.

If there is no datum d2 for which the criterion in block 404 is met, computer system 3600 may select an arbitrary datum d2, preferably subject to the criterion in block 403, and proceed to block 405.

In block 405, the computer system 3600 adds an additional datum to the set D2 to satisfy the criterion in block 404, preferably subject to the criterion in block 403. If the criterion in block 404 cannot be met by adding a second datum to the set D2, as may happen, for example, if there is only one datum with non-zero derivative that is not in the same classification category as D1 or if the magnitude threshold for selection in block 404 is too high, then computer system 3600 may proceed to block 406.

In block 406, computer system 3600 specifies that the set D2 be the empty set. This specification is equivalent to specifying that the discriminator of D1 versus D2 should instead be a detector for D1.

From block 404, block 405 or block 406, computer system 3600 proceeds to block 407 and specifies the set D2 as determined by block 404, 405 or 406.

FIG. 5 is a flowchart of an illustrative embodiment of an aspect of the invention in which computer system 3600 determines the position in the network at which to place a new node or node set. In some embodiments, the position to place the new node or node set may be determined before the node or node set is trained so that the set the set of nodes in the initial network from which connections made be made to the new node or node set is known.

In block 501, computer system 3600 may determine which of several rules may be used to determine the position for the new node or node set. If the default position is to be used, the computer system 3600 proceeds to block 502. In block 502, computer system 3600 checks whether the improvement method is aimed at correcting a network error. If so, computer system 3600 proceeds to block 507, otherwise, computer system 3600 proceeds to block 503. In block 503, computer system 3600 sets the position to be determined as a position relative to the target node N1 and then proceeds to block 504. In block 504, computer system 3600 checks whether the chosen improvement method is to create an error prediction-correction node set. If so, computer system 3600 proceeds to block 508, otherwise computer system 3600 proceeds to block 505. In block 505, computer system 3600 selects the position for the new node or node set to be just below the selected position, which may be the target node selected in block 503, an output node selected in block 507, or an arbitrary position selected in block 510. If the improvement is aimed at helping correct a network error, then computer system 3600 proceeds from block 502 to block 507. In block 507, computer system 3600 sets the position to be determined as a position relative to the output node that corresponds to the correct category for the datum on which there is an error to be corrected. Computer system 3600 then proceeds to block 504. If the position is to be determined other than by selecting the default position, then computer system 3600 proceeds from block 501 to block 506.

In block 506, computer system 3600 may evaluate the advantages or disadvantages of various potential positions. For example, a new node or node set in a high-rank position has a greater number of potential connections from lower rank nodes in the base network. On the other hand, a new node or node set in a low-rank position has a greater number of potential connections to higher rank nodes which may benefit from a connection from the new node or node set. In either case, the new node or node set may receive connections directly from input nodes and other low rank nodes and/or may send connections directly to output nodes, so the position of the new node or node set does not necessarily have an advantage or disadvantage due the directness of those potential connections.

In block 510, computer system 3600 may select an arbitrary node as the position relative to which to place the new node or node set, taking account of the relative advantages evaluated in block 506. From block 510, computer system 3600 proceeds to block 504.

If the improvement method is to create an error prediction-correction node set, then from block 504 computer system 3600 proceeds to block 508.

In block 508, computer system 3600 selects the position for the new node or node set to be just above the node selected as the relative position in block 503, block 507 or block 510. Computer system 3600 then proceeds to block 509.

In block 509, if the relative position is above an output node, then computer system 3600 makes the error correction node in the new error prediction-correct node set an output node in place of the former output node selected as a relative position. In some embodiments, the former output node becomes a hybrid node, continuing to have a target output from which to start back propagation while also having an outgoing connection to the new error correction node and optionally an output connection to the new error prediction node. The back propagation from the former output node is in addition to the back propagation from the new error correction node back propagated through the error prediction node.

FIG. 6 is a diagrammatic logic chart of an illustrative embodiment of a method for specifying a local node-specific classification objective that may be used to determine whether a node has made a classification error on a datum d. The method illustrated in FIG. 6 applies to all data for a node with a bounded monotonic activation function with a natural or a specified threshold value and for some data values for other activation functions. For example, both the sigmoid function $\sigma(x)=1/(1+\exp(-x))$ and the hyperbolic tangent $\tanh(x)=(\exp(x)-\exp(-x))/(\exp(x)+\exp(-x))$ have a natural threshold at $x=0$. A hyperparameter, set by the system developer or by the ILMS, may specify a node-specific threshold for these and other activation functions.

In block 601, computer system 3600 retrieves or sets a node-specific thresholds. In block 602, computer system 3600 computes the feed forward activation and back propagated derivative of the network for a datum d.

In block 610, computer system 3600 determines from the form of the activation function and the activation value for datum d whether the node has made a classification choice for datum d, for example by comparing the activation value of a node to a specified threshold, as discussed in association with block 302 of FIG. 3. In some embodiments, computer system 3600 may determine a node not to have made a classification choice if the magnitude of the difference of the activation value of the node and the specified threshold activation value is less than a specified criterion. In some embodiments, computer system 3600 may determine a node not to have made a classification choice if the magnitude of the derivative of the error loss function with respect to the activation value of the node is less than a specified criterion.

In some embodiments, a node with an unbounded activation function, such as the ReLU function $ReLU(x)=0$, if $x\leq0$; $=x$ if $x>0$, may be said to have made a classification choice on some data but not on other data. For example, in some embodiments, a node with the ReLU activation function may be said to have made a classification choice on a data d for which the input to the activation function is less than zero, $x(d)<0$. For $x\geq0$, the node may be said to be fitting a regression model rather than making a classification decision.

In some embodiments, a node with an activation function $f(x)$, such as a ReLU function, for $f(x)$ is bounded for $x<0$ but unbounded for $x\geq0$, may be said to have made a classification error on a datum d only if $x<0$ and the derivative is negative, indicating a desired update in the positive direction and corresponding to block 606. In some embodiments, for such an activation function, if $x\geq0$, computer system 3600 proceeds to block 611 to indicate that the node has not made a classification choice for datum d.

If computer system 3600 determines in block 610 that the node has made a classification choice on datum d, computer system 3600 proceeds to block 603. In block 603, computer system 3600 compares the activation of the node to its specified threshold and proceeds to either block 604 or block 605. In block 604, computer system 3600 checks whether the derivative of the error loss function with respect to the output activation of the node is positive or negative and then proceeds to either block 606 or block 607. In block 605, computer system 3600 checks whether the derivative of the error loss function with respect to the output activation of the node is positive or negative and then proceeds to either block 608 or block 609. In block 606, computer system 3600 declares the node to have made a classification error on datum d. In block 607, computer system 3600 declares the node not to have made a classification error on datum d. In block 608, computer system 3600 declares the node not to have made a classification error on datum d. In block 609, computer system 3600 declares the node to have made a classification error on datum d.

FIG. 7 is a flow chart of an illustrative embodiment of an aspect of the invention in which computer system 3600 determines whether a node k in a softmax set S has made a classification error on a datum d. In a softmax set, the output values for a set of nodes is constrained to sum to 1 by a formula such as $act_k(d)=\exp(in_k(d))/\Sigma_j \exp(in_j(d))$, where $in_j(d)$ is the weighted summed input to node j, and the summation in the expression is over the set of nodes j in S. In the illustrative embodiment of FIG. 7, computer system 3600 makes a determination for node k similar to the determination for standard nodes described in association with FIG. 6.

In block 701, computer system 3600 selects node k, one of the nodes of the softmax set S. In block 702, computer system 3600 checks the sign of the derivative of the network error loss function with respect to node k. If the derivative is negative, computer system 3600 proceeds to block 703. If the derivative is positive, computer system 3600 proceeds to block 708. If the derivative is exactly 0, computer system 3600 proceeds to block 704 and determines node k not to have made a classification choice on datum d. In some embodiments, computer system 3600 may determine node k not to have made a classification choice on datum d, if the magnitude of the derivative is less that a value specified by hyperparameter.

In block 703, computer system 3600 determines whether node k has the maximum activation value among the subset of S for which the derivative is negative. If node k does not have the maximum value, computer system 3600 proceeds to block 704 and determines node k not to have made a classification choice on datum d. If node k does have the maximum value, which it may share with other nodes in S, computer system 3600 proceeds to block 705. In block 705, computer system 3600 asks whether the activation value of node k is the maximum activation value among all nodes in S, including the nodes with non-negative values for the derivative. If the activation value of node k is the overall maximum, then computer system 3600 proceeds to block 706, otherwise computer system 3600 proceeds to block 707. In block 706, computer system 3600 determines node k to have made a correct classification decision on datum d. In block 707, computer system 3600 determines node k to have made a false negative classification error on datum d. In block 708, computer system 3600 determines whether the activation value for node k is greater than the maximum activation value for any of the nodes in S with negative values for the derivative of the network error loss function. If so, computer system 3600 proceeds to block 709, otherwise computer system 3600 proceeds to block 704. In block 709, computer system 3600 determines node k to have made a false positive classification error on datum d.

FIG. 8 is an illustrative embodiment in which a pair of new nodes attempt to predict and correct classification errors of a target node 801. In this illustrative embodiment, it is assumed that, on at least some data, it may be determined that target node 801 has made a classification choice and whether that choice has been correct or incorrect. For example, target node 801 may be any output node in a classification network. Target node 801 may also be an inner layer node with an activation function and specified threshold T with classification errors determined, for example, by the illustrative embodiment shown in FIGS. 6 and 7. Block 805 represents feed forward activation from lower nodes and, if target node 801 is an inner layer node, block 804 represents back propagation from higher nodes. In FIG. 8 and other diagrams of neural networks, the arrows are in the direction of the feed forward computation and the back-propagation computation of partial derivatives of the error loss is in the opposite direction of the arrows.

Control switches 806 and 807 represent that there is feed forward activation from node 801 to node 803 and optionally to node 802, but there is no back propagation from them back to node 801. This violation of the normal back propagation rule is explained below.

In general, for a node with a bounded, monotonic activation function and a specified threshold T it is possible to determine if the node has made a classification error for any datum. For a node with an unbounded monotonic activation function, such as the ReLU function $ReU(x)=0$, if $x \leq 0$; $=x$, if $x>0$, it is possible to determine that the node made a classification choice on a datum d, if, for datum d, x<0, and to determine whether that classification choice is correct or incorrect.

In an illustrative embodiment, error prediction node 802 may initially be trained on any training datum d for which it has been determined that target node 801 has made a classification choice, with the target value for error prediction node 802 being one value, say 0, if target node 801 has made a correct classification choice for datum d and a different target value, say 1, if target node 801 has made an incorrect classification choice. In this illustrative embodiment, node 802 may be said to be an "error detector" node. In this illustrative embodiment, error prediction node 802 is not trained on data for which target node 801 has not made a classification choice.

In an illustrative embodiment, error correction node 803 is a non-standard node that performs a complex computation that depends on the activation function and threshold of target node 801. For example, in one illustrative embodiment, if error prediction node 802 has an activation function with the range [0, 1] and is trained with a target of 1 when target node 801 makes a classification error and is trained with a target of 0 when target node 801 makes a correct classification, then computer system 3600 may set error correction node 803 to produce output value A if node 801 makes no classification choice and otherwise to produce the output value A+2*Z*(T−A), where T is the specified threshold of node 801, A is the output activation of node 801 and Z=0 if the output of node 802 is less than or equal to 0.5 and Z=1, if the output of node 802 is greater than 0.5. Thus, in this illustrative embodiment, node 803 passes through the activation value of node 801 unless node 801 has made a classification choice and node 802 predicts that that choice is an error, in which case node 803 reverses the output of node 801 relative to its threshold value.

Regarding error correction node 803, in preferred embodiments, computer system 3600 also performs a non-standard computation during the back-propagation computation. As already described, despite computing feed forward activation from target node 801 to error correction node 803, computer system 3600 does not back propagate the partial derivative of the network error loss function from error correction node 803 to target node 801.

In some embodiments, the back propagation from error correction node 803 to error prediction node 802 is also non-standard. In these embodiments, during back propagation, computer system 3600 computes whether target node 801 has made a classification error on a datum d, for example, using the computation illustrated in FIG. 6 or FIG. 7. Computer system 3600 then uses that determination of whether target node 801 has made a classification error on datum d to define a target for datum d for error correction node 802. For datum d, the locally defined target for error correction node 802 is 1 if target node 801 makes a classification error on datum d, and the locally defined target for error correction node 802 is 0 if target node makes a correct classification choice on datum d. In a preferred embodiment, there is no back propagation to error prediction node 802 if target node 801 does not make a classification choice on datum d.

In effect, computer system 3600 treats error correction node 803 like an output node with this locally defined target and, in place of normal back propagation from error correction node 803, it substitutes the derivative of the error cost function for this locally defined target. For example, if the activation function of error correction node 803 is the sigmoid function and the error cost function is cross entropy, the derivative $act_{EP}(d)-target(d)$ is back propagated to error prediction node 802, where $act_{EP}(d)$ is the output activation of error prediction node 802 for datum d.

In some preferred embodiments, error prediction node 802 has an activation with a temperature hyperparameter. For example, a sigmoid activation function with a temperature T>0 is given by $\sigma(x; T)=1/(1+\exp(-x/T))$. The standard sigmoid function is the same as a sigmoid function with temperature T=1. At higher values of temperature T, the transition of the function from a value of zero to a value of 1 is more gradual. As the temperature is decreased toward T=0, the sigmoid function with temperature T approaches a unit step function, the activation function of a classical Perceptron P(x)=0, if x≤0, =1, if x>0. In some embodiments, computer system 3600 decreases the temperature of error correction node 802 as the iterative training of the network converges, for example as discussed in association with FIG. 14. In some embodiments, at termination of the training process, computer system 3600 may replace a sigmoid activation function with a temperature T less than a specified value with the Perceptron activation function. In some embodiments, sigmoid activation functions with temperature are also used for nodes other than error correction nodes and these nodes may also be trained with the temperature gradually reduced by computer system 3600 as the training converges.

Figure 31:
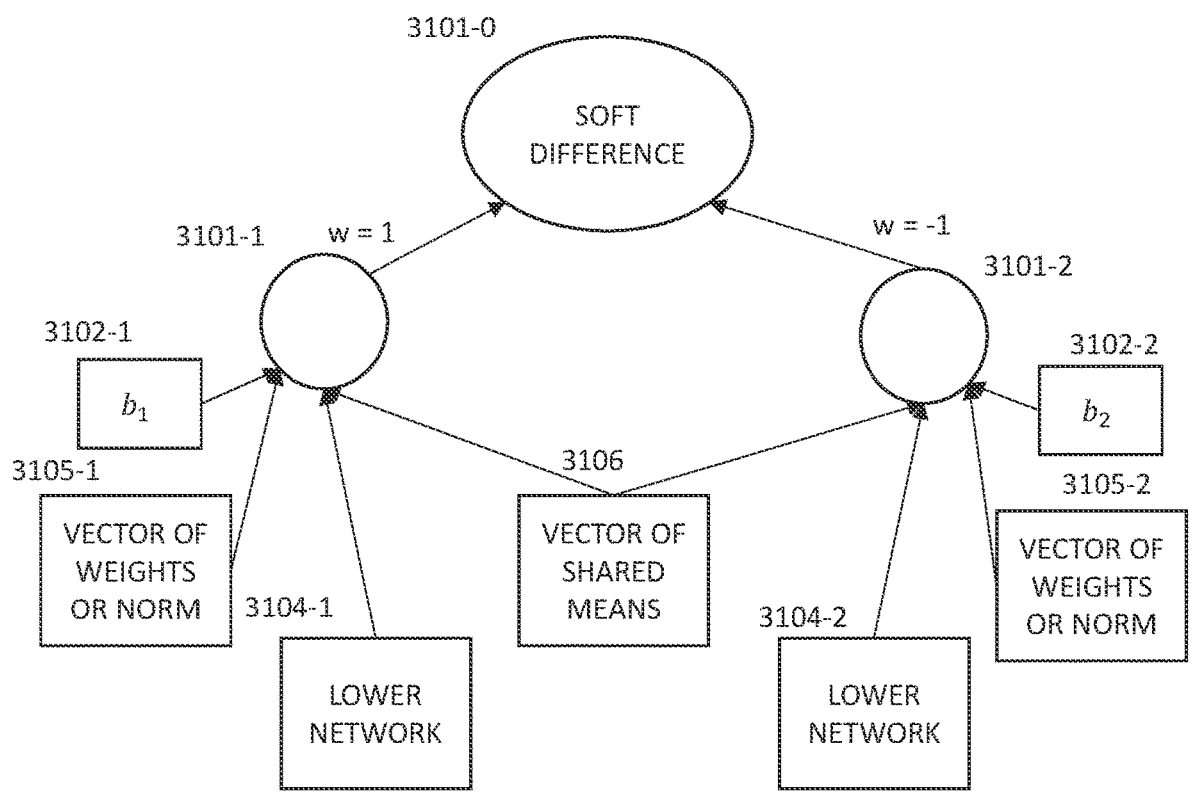
FIG. 31 is a diagram of an illustrative embodiment of an aspect of the invention in which a detector model that also discriminates between a target detection set D and a rejection set R.
Figure 33:
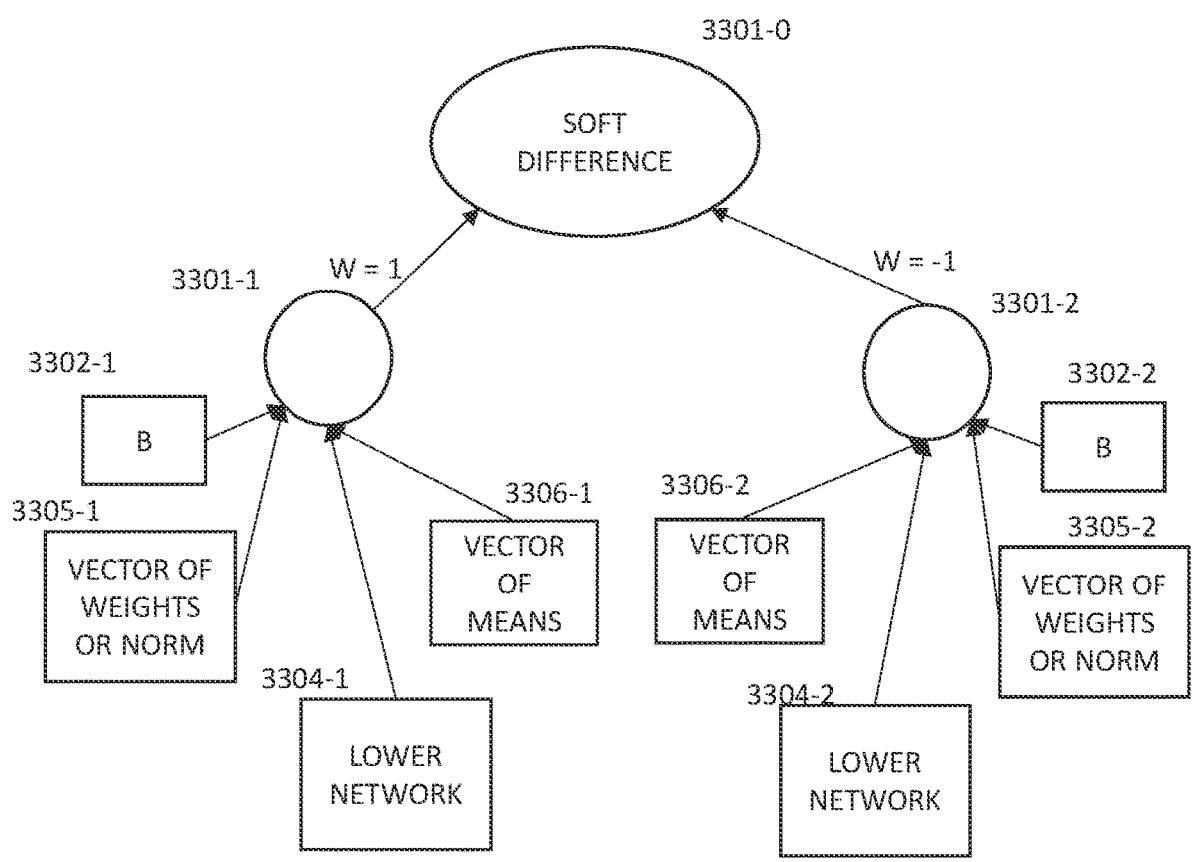
FIG. 33 is an illustrative embodiment of an aspect of the invention in which a computer system trains a discrimination node.

Other examples of the use of the temperature hyperparameter are discussed in association with soft-difference nodes in FIGS. 13, 31 and 33. There is additional discussion of the temperature hyperparameter in association with FIG. 14.

In some embodiments, after an incremental growth phase, computer system 3600 increases the temperature of all activation functions with a temperature hyperparameter for the resumed training of the merged network. In some embodiments, however, for some, or all, of the activation functions, computer system 3600 does not change the temperature hyperparameter.

FIG. 9 illustrates another embodiment of an error prediction and error correction node set. All three control units 906, 907P and 907N block back propagation. In FIG. 9 there are two error prediction nodes, 902P and 902N. Control units 907P and 907N selectively control the feed forward activation of error prediction nodes 902P and 902N. Computer system 3600 passes a forward activation through control 907P only if target node 901 makes a classification choice and has an activation above threshold. Computer system 3600 passes a forward activation through control 907N only if target node 901 makes a classification choice and has an activation below threshold. Thus, error prediction node 902P is only active for data on which target node 901 has made a positive classification and error prediction node 902N is only active for data on which target node 901 has made a negative classification. Thus, error prediction node 902P is trained to detect false-positive errors, and error prediction node 902N is trained to detect false-negative errors. Thus, in the embodiment illustrated in FIG. 9 computer system 3600 may learn a different discrimination boundary for false positives than for false negatives. In a preferred embodiment, error correction node 903 operates the same as error correction node 803 in FIG. 8, except that on a datum d error correction node 803 only provides a target to the error prediction node that is active for datum d and only if target node 901 has made a classification choice.

Figure 10:
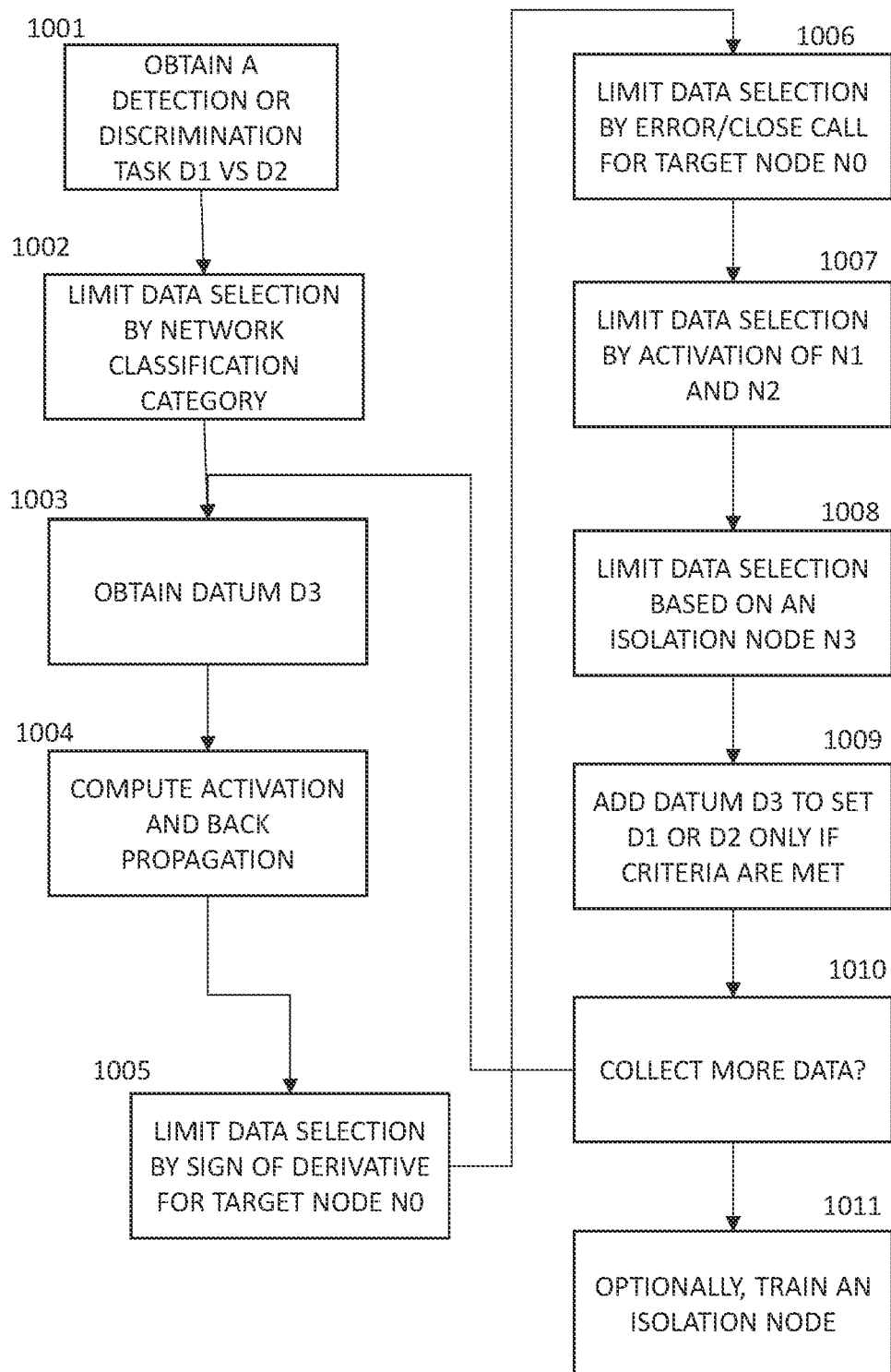
FIG. 10 is an illustrative embodiment of an aspect of the invention in which additional data is selected for a detection or discrimination subtask.

FIG. 10 is an illustrative embodiment of an aspect of the invention in which additional data is selected for a detection or discrimination subtask, such as one-shot learning as described in association with FIG. 23, building a semi-targeted discriminator as described in association with FIG. 13, or building example-based template and probability models as discussed in association with FIGS. 27, 31, 32, and 34.

In block 1001, computer system 3600 obtains a specified detection set D1 and, optionally, a discrimination or rejection set D2. In the illustrative embodiment of FIG. 27, the detection set D1 may be associated with a new node N1 or pair of new nodes N1 and N2. In some embodiments, computer system 3600 may be training the new node or nodes to improve the performance of a specified target node N0.

In some embodiments, computer system 3600 may obtain an isolation node N3 that computer system 3600 may use to limit the potential candidates for sets D1 and D2 in block 1008. Such an isolation node may have been trained, for example, in block 1011 in a previous implementation of the embodiment illustrated in FIG. 10 or may have been trained separately based on some estimate of potential relevance to the task being specified in block 1001.

In some embodiments, in block 1002, computer system 3600 may limit the set of data which may be added to set D1 based on the classification category of each datum of training data. For example, in some embodiments, the set D1 may be limited to data of a single classification category, or the sets D1 and D2 may be associated with a pair of disjoint subsets of the set of classification categories.

In block 1003, computer system 3600 obtains a datum d3 to be tested for inclusion in set D1 or D2.

In various embodiments, in blocks 1004-1008, computer system 3600 may apply various criteria for restricting the assignment of a datum d3 to set D1 or to set D2. Computer system 3600 may apply a certain criterion in some embodiments and not in other embodiments. Computer system 3600 may apply the criteria in any order. In the illustrative embodiment, the criterion in block 1002 is shown applied first since that criterion may be applied before datum d3 is selected. However, in some embodiments, computer system 3600 may apply the criterion in block 1002 after block 1003 and in any order with respect to blocks 1004-1008.

In block 1004, computer system 3600 computes the activation of the network for datum d3 and the back propagation of derivatives of the error loss function for datum d3.

In block 1005, in some embodiments, computer system 3600 may limit the data selection based on the sign of the derivative of the error loss function with respect to target node NO. For example, in some embodiments, computer system 3600 may only assign a datum d3 to the set D1 if the derivative is positive. In some embodiments, computer system 3600 restricts the assignment for both set D1 and set D2, with opposite signs. In some embodiments, computer system 3600 only restricts the assignment for set D1.

In block 1006, in some embodiments, computer system 3600 only makes an assignment for datum d3 if there is an error or a close call on the data d3. In some embodiments, computer system 3600 makes an assignment on if there is an error, not a close call.

In some embodiments, computer system 3600 restricts the assignment based on whether there is an error or close call by the network. In some embodiments, computer system 3600 restricts the assignment based on whether there has been an error or close call for the node NO based on a node-specific local target determined as described in association with FIGS. 6 and 7. In some embodiments, computer system 3600 may make the assignment only if there is an error or close call for both the network and node NO. In some embodiments, computer system 3600 may make the assignment only if there is an error or close call for both the network and for node NO. In some embodiments, computer system 3600 may use only one of the two criteria to decide whether to make the assignment.

In block 1007, in some embodiments, computer system 3600 may restrict the assignment of a datum d3 to D1 or D2 based on the activation values for node N1 or for nodes N1 and N2. For example, in some embodiments, computer system 3600 may assign d3 to set D1 only if $act_{N1}(d3) > minAct$, for a specified hyperparameter minAct. In some embodiments, computer system 3600 may assign d3 to set D1 only if $act_{N2}(d3) > minAct$. In some embodiments, the restriction is enforced for assignment to set D1 but not for assignment to set D2, for example, when node set D2 is intended as a catch-all alternative.

In some embodiments, computer system 3600 may concentrate on refining a decision boundary and may assign a datum d3 to set D1 or D2 only if both $act_{N1}(d3) > minAt$ and $act_{N2}(d3) > miAct$ and $|act_{N1}(d3) - act_{N2}(d3)| < maxiff$, for specified hyperparameters minAct and maxDiff.

In some embodiments, in block 1008, computer system 3600 assigns a datum d3 to set D1 or set D2 only if the activation of an isolation node N3 obtained in block 1001 is above a specified threshold: $act_{N3}(d3) > inRelevant$, for a specified value of minRelevant.

In block 1009, computer system 3600 may add the datum d3 to set D1 or to set D2 only if the criteria for assignment in blocks 1004-1008, as well as 1002, have been met.

In block 1010, computer system 3600 checks a stopping criterion to determine whether to collect additional data. For example, the stopping criterion may be to stop if all the available data has been tested or if the number of assigned data has reached a specified amount.

In block 1011, in some embodiments, computer system 3600 may train a node or subnetwork N3 to discriminate the union of the sets D1 and D2 from the rest of the training data or from the remainder of some other specified set. The node or subnetwork N3 may then be used as an isolation node N3 in block 1008 during continued or resumed training.

Figure 15:
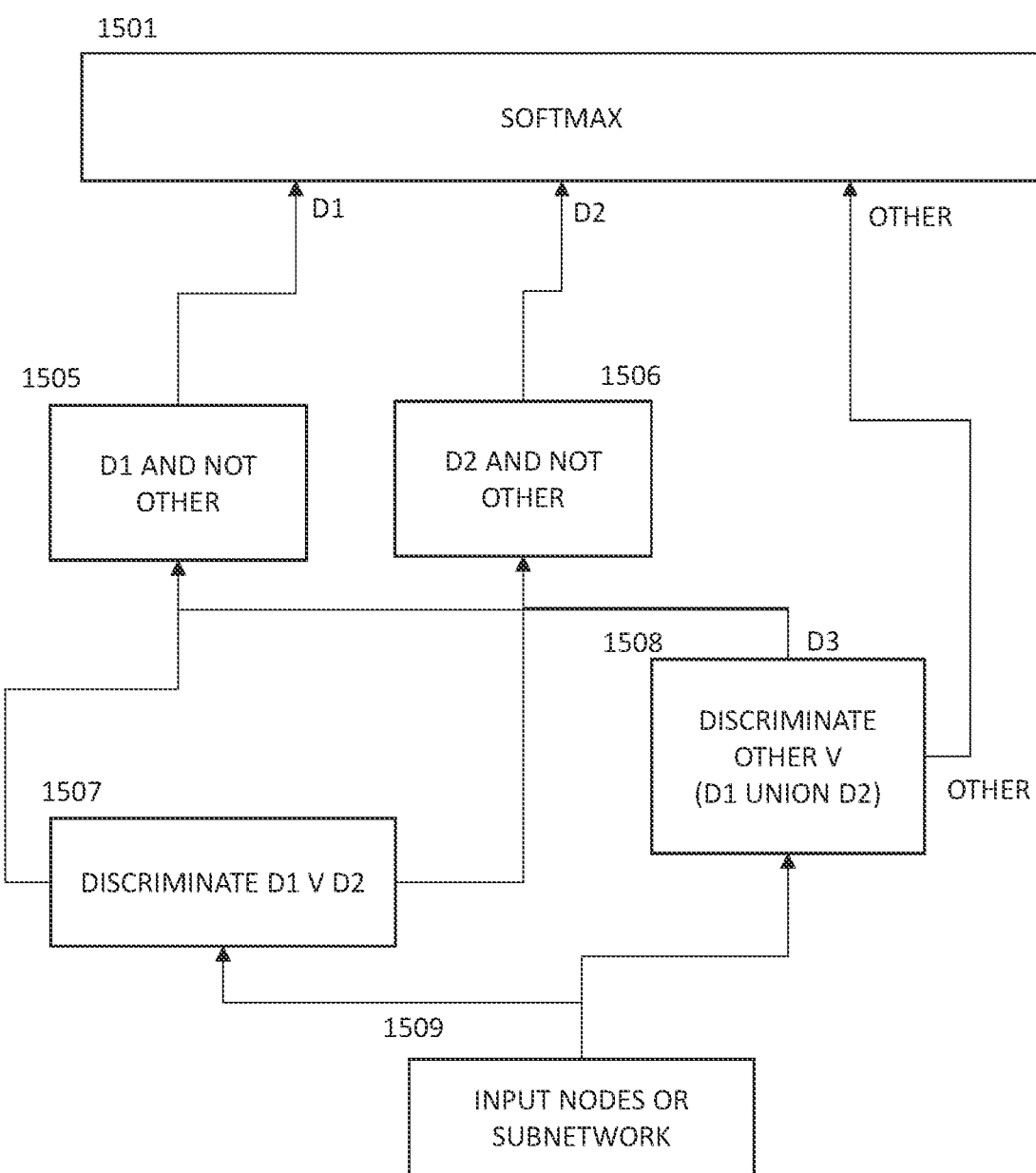
FIG. 15 shows an illustrative embodiment of an aspect of the invention as a diagram of a network or subnetwork.

The node or subnetwork N3 may also be used in a three-way discrimination during subsequent unsupervised classification or inference, for example, as discussed in association with FIG. 15.

FIG. 11 is a flow chart of an illustrative embodiment of an aspect of the invention in which computer system 3600 may use a procedure herein called a "semi-targeted data procedure." That is, computer system 3600 may or may not select a target node N1, but computer system 3600 may select two sets of data D1 and D2 to be discriminated, where computer system 3600 makes the selection in a manner that is not dependent on the selection of node N1. Computer system 3600 may also use the procedure illustrated in FIG. 11 for improving the performance of a node N1 that has been selected in targeted incremental growth. This illustrative embodiment also illustrates that an optimum choice of D1 in the illustrative embodiment of FIG. 3 or optimum choice of D2 in FIG. 4 is not critical to the success of the targeted incremental growth. In each case, some embodiments may make a less than optimized choice either for simplicity or based on some additional criterion.

In block 1101, computer system 3600 selects any node N1 that has a small magnitude (e.g., less than a threshold) for the derivative of the network error loss function with respect to the output activation of the node. The threshold for determining whether the magnitude of a node is small enough may be relative to the magnitude of the derivative for other nodes or may be determined by a hyperparameter set by the system developer or by the ILMS.

In block 1102, computer system 3600 obtains or makes the selection of a datum D1 or set of data D1 and makes or selects a datum or a set of data D2. When computer system 3600 selects D1 and/or D2, there is no constraint on the selection, except that, preferably, neither D1 nor D2 is a subset of the other. However, in some embodiments, both D1 and D2 may both have already been selected, for example, as described in association with FIGS. 3 and 4.

In block 1103, computer system 3600 creates a new node N2 to be merged into the network with an outgoing connection from N2 to N1.

In block 1104, computer system 3600 trains N2 as a stand-alone network discriminating D1 from D2, initially, with incoming connections from all the nodes in the original network below N1 in rank or from any subset of those lower rank nodes that may be specified by the ILMS or that may have been previously selected by computer system 3600. In an example embodiment, N2 may be the only node in the stand-alone network. In some embodiments there may be additional nodes in the stand-alone network.

In block 1105, computer system 3600 prunes the set of incoming connections. In some embodiments, computer system 3600 may prune the connections whose connection weights have the smallest magnitude. In some embodiments, computer system 3600 may use other criteria such as pruning one connection from a pair of incoming nodes whose output activations have a correlation compared to the correlations of other pairs of nodes.

In block 1106, computer system 3600 may optionally add data to either D1 or D2, for example, as discussed in association with FIG. 10.

In block 1107, computer system 3600 may optionally add additional nodes to the stand-alone network, as discussed in association with FIGS. 1, 3, 4 and other figures.

In block 1108, computer system 3600 may test the performance of the stand-alone network on development data and may adjust regularization and other hyperparameters.

In block 1108 computer system 3600 also checks a stopping criterion. In the iterative training in block 1104, computer system 3600 does the iterative training until a stopping criterion, so the stopping criterion in block 1108 is only to determine when to stop the process of pruning the set of incoming connections. This stopping criterion may be based, for example, on a specified tradeoff between reducing the number of incoming connections while maintaining the degree of separation between D1 and D2 relative to a bound or a norm on the incoming weights.

When the stopping criterion in block 1108 is met, computer system 3600 proceeds to block 1109. In block 1109, computer system 3600 merges the stand-alone network into the original network with a connection from node N2 to node N1 with a connection weight initialized to zero. In block 1110, computer system 3600 trains the merged network.

FIG. 12 is an illustrative embodiment of a set of guidelines for selecting the incoming connections for a new node or node set to be added to a network, given a specific position in the original network at which the new node or node set is to be merged, a specified target datum D1, and a set D2 comprising at least one datum to be discriminated from D1.

Block 1201 states the purpose of the guidelines. Guideline 1202 specifies that computer system 3600 may choose the set of nodes from which connections may be made to be the new node or node set, namely from the set of nodes lower in rank than the position selected for merging the new node or node set into the existing network, including an input node for each input variable.

In some embodiments, the guideline may specify a smaller set as the set of nodes from which to choose nodes to potentially connect. For example, some embodiments limit the set to the set of nodes that have connections to N1 in the existing network. Some embodiments may limit the connections to be only from the set of input nodes. Some embodiments may allow connections from both input nodes and nodes connected to N1 in the existing networks but no others.

In guideline 1203, in some embodiments, computer system 3600 preferably limits the set of nodes from which incoming connections may be made to the new node or node set to a subset of the nodes for which the activation value for D1 differs from the average activation for the elements in set D2.

In guideline 1204, in some embodiments, computer system 3600 may limit the set of nodes from which connections may be made to the new node or node set to be input nodes or nodes that have been "frozen," that is nodes for which updates in the iterative training have been stopped for the node and all nodes in the subnetwork that activates the node.

In block 1205, computer system 3600 selects the set of incoming connections preferably consistent with guidelines 1202-1204.

Any of many simple methods well-known to those skilled in the art of training neural networks may be used to initialize the weights of the selected incoming connections to the new node or node set. For example, they may be initialized with random values with a normal distribution with mean zero and a specified standard deviation.

In an example embodiment, in block 1206, computer system 3600 initializes the weights to discriminate between datum D1 and a single representative R2 of the set D2. If D2 has a single member, it is the representative. Otherwise the representative R2 may be a selected member of D2 or may be the vector average of the members of D2. To discriminate between datum D1 and the representative R2 of D2, the computer system 3600 sets the weights to the vector R2-D1, optionally multiplied by a positive scaling factor. In one example embodiment, computer system 3600 may set the bias to 0.5 times the square of the scaled Euclidean distance from D1 to R2. In another example embodiment, computer system 3600 may adjust the value of the bias to the value that minimizes the error rate or that minimizes an error loss function evaluated on a data set comprising D1 and the set D2.

In the illustrative embodiment, the connection weights and bias may be trained further in the subsequent training of the merged network.

FIG. 13 shows an illustrative embodiment of an aspect of the invention with a subnetwork comprising two detector nodes 1302-1 (node N1) and 1302-2 (node N1) and a special discriminator-difference node 1301 (node NO).

As specified in the system design or under control of the ILMS, computer system 3600 may use different forms for the discriminator-difference node, depending on the forms of the detector nodes 1302-1 (node N1) and 1302-2 (node N2). In addition, computer system 3600 may use non-standard training for discriminator-difference node 1301.

The node biases 1303-1 and 1303-2, the lower networks 1304-1 and 1304-2, and the higher networks 1306-1 and 1306-2 are standard neural network components, well-known to those skilled in the art of training neural networks.

Computer system 3600 may adjust the form of discriminator-difference node 1301 depending on the form of the activation functions for detector nodes 1302-1 and 1302-2. For example, if detector nodes 1302-1 and 1302-2 both have bounded activation functions with the range [0, 1], then computer system 3600 may make the activation function of node 1301 be $act_{N0}(d)=ct_{N1}(d)-act_{N2}(d)$, giving discriminator-difference node NO the range [−1, 1].

As another example, if detector nodes 1302-1 and 1302-2 both have bounded activation functions with the range [−1, 1], then computer system 3600 may make the activation function of node 1301 be $act_{N0}(d)=0.5*(act_{N1}(d)-act_{N2}(d))$, giving discriminator-difference node NO the range [−1, 1].

If detector nodes 1302-1 and 1302-2 both have activation functions with some other range, then computer system 3600 may first apply an affine transformation to the activations of 1302-1 and 1302-2 before taking the difference.

On the other hand, if detector nodes 1302-1 and 1302-2 have activations that are based on a vector norm or that are estimates of the logarithm of the probability density function for an exponential distribution, such as discussed in association with FIGS. 27, 28, 30, 31 and 32, then, for the activation function of node 1301 in some embodiments, computer system 3600 may use a "soft-difference" activation function, such as $$act_{N0}(d) = \left(\exp\left(act_{N1}\left(\frac{d}{T}\right)\right) - \exp\left(act_{N1}\left(-\frac{d}{T}\right)\right)\right) \Big/ \left(\exp\left(act_{N1}\left(\frac{d}{T}\right)\right) + \exp\left(act_{N1}\left(-\frac{d}{T}\right)\right)\right),$$

where T is a hyperparameter, called temperature, controlled by the ILMS.

Similarly, if detector nodes 1302-1 and 1302-2 have unbounded activation functions, such as the ReLU function $f(x)=0$ if $x<0$, $x$ if $x \geq 0$, then computer system 3600 may use a soft-difference activation function for node 1301.

In some embodiments, computer system 3600 may use other forms of soft-difference activation function. For example, computer system 3600 may include a hyperparameter or a learned parameter to compensate for the ratio of a priori probability of the set detected by detector node 1302-1 to a priori probability of the set detected by node 1302-2 being different from 1. However, in some embodiments, computer system 3600 may use the default bias of 0, using back propagation to train detector nodes 1301-1 and 1302-2 to learn to incorporate their respective a priori probabilities or an equivalent ad hoc correction term or factor.

Figure 14:
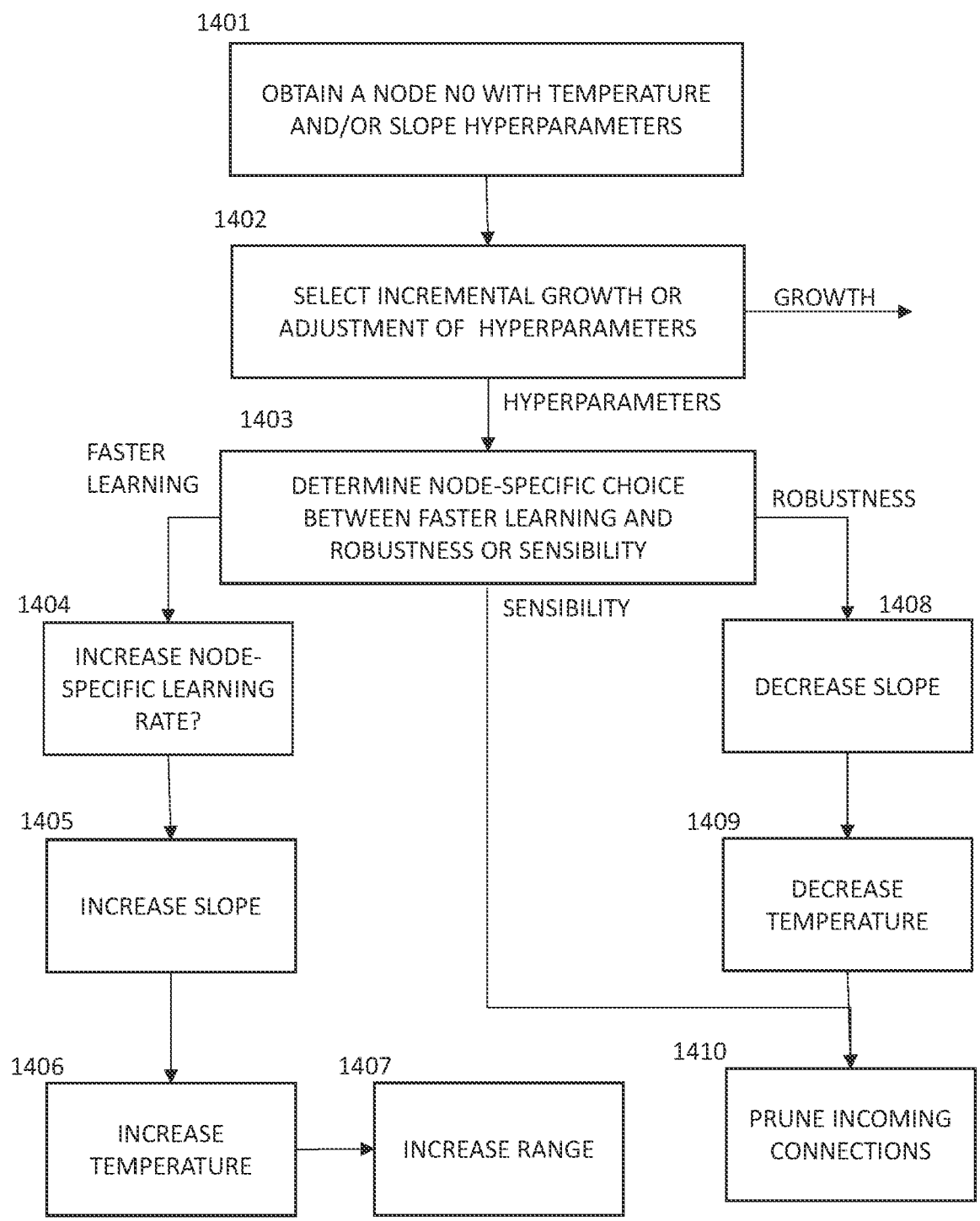
FIG. 14 is an illustrative embodiment of an aspect of the invention in which a computer system adjusts a temperature hyperparameter.

FIG. 14 is an illustrative embodiment of an aspect of the invention in which computer system 3600 may adjust the temperature hyperparameter used in some embodiments of soft-difference nodes and of some types of nodes with bounded, monotonic activation functions. Computer system 3600 may also adjust a slope hyperparameter of an activation function f(x) that is bounded on at least one side of x=0, such as the ReLU function $$ReU(x) = \begin{cases} 0, & \text{if } x \leq 0 \\ x, & \text{if } x > 0 \end{cases}.$$

In block 1401, computer system 3600 obtains a node NO with a temperature hyperparameter T and/or a slope hyperparameter S. The slope hyperparameter is generally a positive number significantly less than 1, S<<1. Some examples of activation functions with a temperature hyperparameter T include:

$$\sigma(x;T)=1/(1+\exp(-x/T))$$

$$\tanh(x; T) = (\exp(x/T) - \exp(-x/T))/(\exp(x/T) - \exp(-x/T))$$

$$f_3(x) = \begin{cases} 0, & fx < -T \\ +, & \text{if } -T \leq x < T \\ T, & \text{if } x \geq T \end{cases}$$

$$EL(x) = \begin{cases} x, & \text{if } x > 0 \\ \alpha(\exp(x/T) - 1), & \text{if } x \leq 0 \end{cases}$$

Computer system 3600 may, for example, give any activation function a slope hyperparameter S by adding the term S*x to the function as in $$\sigma(x; T, S) = 1/(1 + \exp(-x/T)) + S*x$$

$$\text{Leake } LU(x; S) = \begin{cases} S*x, & \text{if } x < 0 \\ x, & \text{if } x \geq 0 \end{cases}$$

In block 1402, computer system 3600 selects whether to try to improve the performance by incremental growth targeted at node NO or by adjusting the hyperparameters of the activation function of node NO. For example, if training is nearly complete and the performance on development data is satisfactory, computer system 3600 may try to improve robustness by adjusting the hyperparameters rather than doing incremental growth. In some embodiments, computer system 3600 may decide to adjust hyperparameters if the signs of the partial derivatives of the error loss function for many data are in the right direction, but small in magnitude (e.g., less than a threshold), which may happen even early in the training process. If the choice is to adjust the hyperparameters, then computer system 3600 proceeds to block 1403, otherwise computer system 3600 exits the process of FIG. 14 but may return to improving the performance of node NO again later.

In block 1403, computer system 3600 determines whether, for node NO, to choose to faster learning, to choose increasing robustness or to choose lowering dimensionality to potentially improve sensibility. In some embodiments, computer system 3600 may, for example, make the determination to give faster learning higher priority early in the training process and to give robustness higher priority as the training process nears convergence. In some embodiments, subsequent incremental growth may reset these priorities.

If computer system 3600 determines in block 1403 to choose faster learning, then computer system 3600 proceeds to block 1404. If computer system 3600 determines to choose robustness, then computer system 3600 proceeds to block 1408. If computer system 3600 chooses sensibility, then computer system 3600 proceeds to block 1410.

In a preferred embodiment of the invention, rather than a single learning rate applied to the whole network, the ILMS may control a customized node-specific learning rate for each node NO in the network and may monitor the effect of the learning rate on each node, controlling the learning rate for the node bias and for each of the weights of incoming connections to node NO. In block 1404, computer system 3600 determines, under guidance from the ILMS, whether the learning rate for node NO and its associated learned parameters should be increased.

In stochastic gradient descent training, the step size in each iterative update of each learned parameters is proportional to the learning rate times the estimate of the negative derivative of the error loss function with respect to the learned parameter. If the step size is small enough, the update results in a decrease in the error loss function. If there is an increase in the error loss function, the learning rate is too high and should be decreased. To test and adjust the node-specific learning rate for node NO, the ILMS may have computer system 3600 make an experimental update in which only the learned parameters associated with node NO are updated.

To tune the learning rate for node NO, the ILMS may have computer system 3600 gradually experimentally increase the learning rate for node NO until an update causes the performance to degrade. Then, computer system 3600 may back off to a safe learning rate and resume training. It is a common practice, well-known to those skilled in the art of training neural networks, to decrease the learning rate during the final stages of training, based on a predetermined schedule. That scheduled final stage decrease may also be done for node-specific learning rates but is not shown in FIG. 14 because it is not related to faster learning or to increased robustness. However, the need to decrease the learning rate based on a schedule in later stages of training is one of the limitations imposed on computer system 3600 increasing the learning rate in block 1404.

In block 1405, computer system 3600 may decide to experimentally increase the slope hyperparameter, based on the relative quantity of the data for which the derivative of error loss function with respect to the output activation of node NO is relatively high in magnitude in some measure but the activation value is such that the derivative of the activation function itself is relatively small in magnitude (e.g., less than a threshold). The effective updates of the connection weights and node bias for node NO on such data may be significantly accelerated by an increase in the slope hyperparameter. On the other hand, the system designer or the ILMS may impose a limit on the maximum value for the slope hyperparameter.

In block 1406, computer system 3600 may decide to increase the temperature hyperparameter. As with the examples given above, the maximum of the derivative f'(x) for many bounded, monotonic activation functions occurs for x=0. Define the following quantities for any bounded, monotonic activation function f(x):

LimMin=$\lim_{x \to -\infty} f(x)$

LimMax=$\lim_{x \to \infty} f(x)$

Range=LimMax−LimMin

TransitionMin(delta)=$suh$ that $f(x)$=LimMin+ delta*Range

TransitionMax(delta)=$x$ $suh$ that $f(x)$=LimMax− delta*Range

For many bounded, monotonic activation functions with a temperature hyperparameter, the length of the transition interval from TransitionMin(delta) to TransitionMax(delta) is proportional to the temperature T. For any given temperature T, the derivative '(x) is generally greater for x inside the transition interval than for x outside the transition interval. However, the maximum value '(0; T), may be smaller for larger values of T, as in the function σ(x; T). Thus, when increasing the temperature T in order to accelerate learning, there may be a trade-off. Data with x near the boundaries of the transition region will have a higher value for $f'(x; T)$ with increasing T but data with magnitude of |x| close to 0 will have a lower value for $f'(x; T)$ with increasing T. In block 1406, computer system 3600 may base the decision on whether to increase the temperature in part on the relative amounts of data in the intervals for which there is an increase in the derivative versus those for which there is a decrease in the derivative.

In block 1407, computer system 3600 may increase the range of the activation function of node NO. For example, computer system 3600 may set the activation function of node NO to be σ(x; T, S, R)=R/(1+exp(−x/T))+S*x, with a range hyperparameter in addition to the temperature and slope hyperparameters. Increasing the range of the activation function increases the maximum value of the derivative of the activation function $f'(x; T, S, R)$, which may increase the efficiency of the updates for data with values x(d) close to 0. In block 1407, computer system 3600 may take account of other effects of changing the range in deciding whether to make such change.

In some embodiments, computer system 3600 may change the range proportional to the temperature: σ(x; T,)=σ(x; T, T)=T/(1+exp(−x/T)), which maintains the maximum value of the derivative $f'(0)$ but changes the range.

Although no condition is shown in FIG. 14 for decreasing a range, a change made by computer system 3600 in block 1407 is not necessarily permanent. In preferred embodiments, the ILMS may directly monitor the effects of changing the range of the activation function of a node and may cause computer system 3600 increase or decrease the range the activation function of a node at any time during training, to reverse a change made by computer system 3600 in block 1407 or possibly for reasons unrelated to FIG. 14.

In block 1408, computer system 3600 may decrease the slope hyperparameter. Decreasing the slope hyperparameter slows the learning process, so computer system 3600 may attempt to postpone this decrease until node NO and its subnetwork have been trained such that most of the assigned data have satisfactory activation levels. The purpose of decreasing the slope is to converge to a slope of zero, with horizontal asymptotes for the activation function. With horizontal asymptotes, most data outside the transition region will have stable activations under perturbations of the input or deliberate adversarial attacks.

In block 1409, computer system 3600 may decrease the temperature. Decreasing the temperature shrinks the transition interval, so computer system 3600 may attempt to postpone this decrease until node NO and its subnetwork have been trained such that most of the assigned data have activations outside the transition region. The purpose of decreasing the transition interval is to have more of the data have activations in the relatively stable region outside the transition region.

Computer system 3600 may proceed to block 1410 from block 1409, or directly from block 1403, if, in block 1403, computer system 3600 chooses to reduce dimensionality to help improve sensibility.

In block 1410, computer system 3600 may prune the incoming connections. For example, computer system 3600 may set the connection weight to zero for all weights that have magnitude less than a specified minimum and freezing those weights, that is, no longer updating them during stochastic gradient descent steps. Freezing a connection weight at a value of zero is numerically equivalent to pruning the connection.

Computer system 3600 may increase the efficiency of this pruning action by combining it with weight decay, which is well-known to those skilled in the art of training neural networks. Various forms of weight decay apply regularization decreasing the magnitude of each weight during updates.

Computer system 3600 and the ILMS may reduce any performance degradation potentially caused by freezing these weights by monitoring the derivative of the error loss function with respect to each of these weights and potentially unfreezing a weight during semi-targeted learning as in block 203 of FIG. 2.

FIG. 15 shows an illustrative embodiment of an aspect of the invention as a diagram of a network or subnetwork. In a preferred embodiment, the two discriminators 1507 and 1508 are trained separately, at least initially.

In some embodiments, computer system 3600 may then further train the network illustrated in FIG. 15 as a complete stand-alone network. In some embodiments, the network illustrated in FIG. 15 may be a subnetwork of a larger network. If the illustrated network is a subnetwork, computer system 3600 may train the subnetwork as a stand-alone network or as a part of training the larger network.

The illustrated subnetwork in FIG. 15 comprises two discriminator subnetworks 1507 and 1508 and some associated logic nodes as well as input and output nodes to and from the subnetwork to the rest of the network. As is the convention in this disclosure, the subnetwork is drawn as a directed graph with the input or lowest numbered layers at the bottom and the activation proceeding from bottom to top.

Block 1509 comprises the input nodes to the subnetwork, which may comprise the activation values of lower inner nodes in the larger network as well as input nodes to the larger network.

Block 1507 is a node or subnetwork comprising a node N1 or a pair of nodes N1 and N2 that computer system 3600 trains to discriminate between two specified sets D1 and D2. Computer system 3600 may obtain the sets D1 and D2, for example, by the process discussed in association with FIGS. 10, 13 and other figures. The discrimination node or output node associated with the subnetwork 1507 may be a standard node with a monotonic activation function or may be a node or set of nodes trained as discussed in association with FIGS. 13, 32, 29, 34 and other figures.

Block 1508 is a node or subnetwork N3 that computer system 3600 trains to discriminate D3, the union of the sets D1 and D2, from other data. In some embodiments, computer system 3600 trains the node or subnetwork N3 to discriminate the classification categories associated with D3 from data with other classification categories. In some embodiments, computer system 3600 may ignore data that is in the categories associated with D3 but not in D3 when training the discrimination between D3 and "OTHER" (e.g., data that is not in D3).

Figure 27:
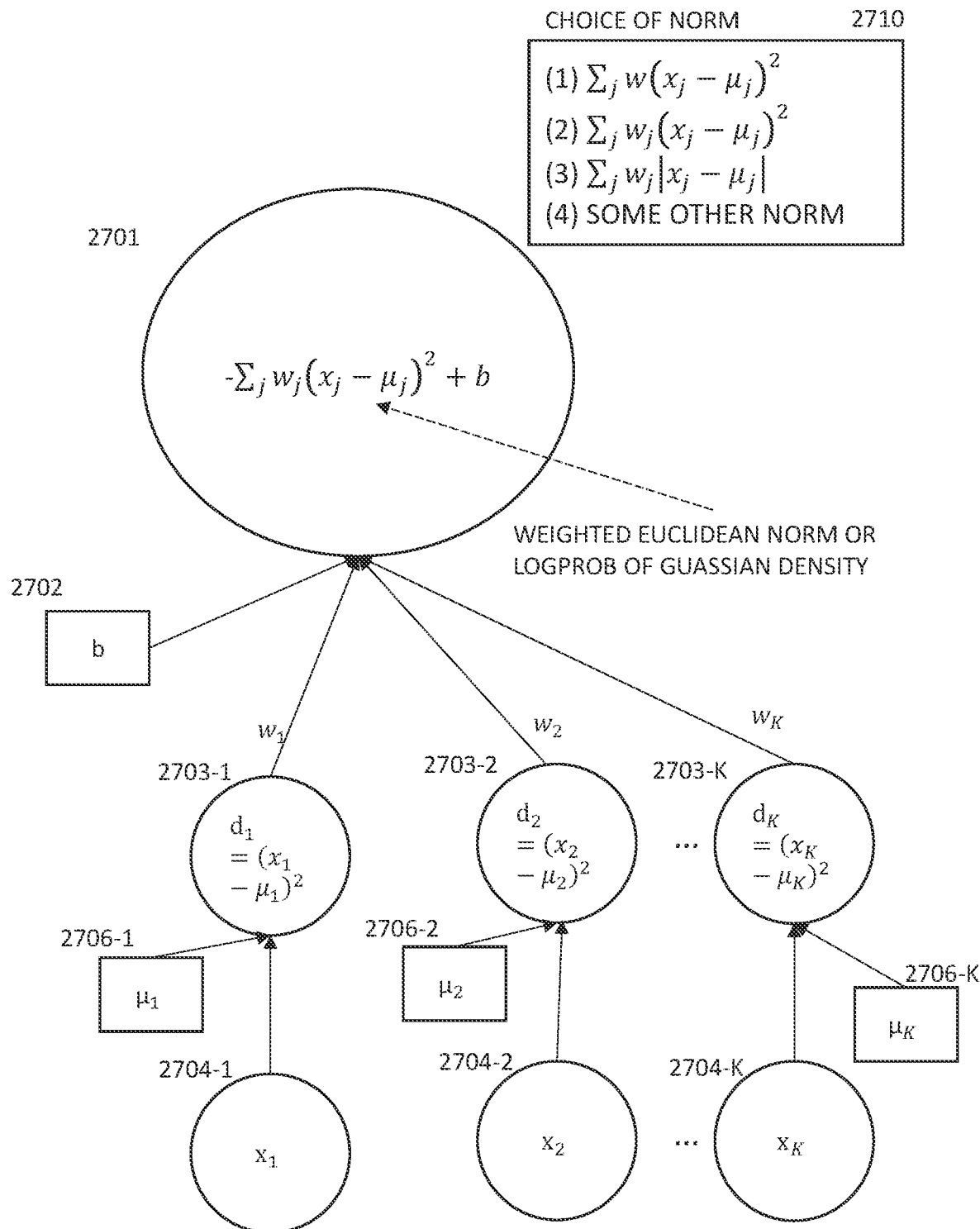
FIG. 27 and FIG. 28 are two versions of a diagram of an illustrative embodiment of an aspect of the invention in which a computer system may train any of a variety of special purpose models.

When computer system 3600 trains the discrimination network 1507 based on one-shot learning as discussed in association with FIG. 29 and FIGS. 27, 13 and other figures, data may be added to the sets D1 and D2 as the discrimination network 1507 is being trained. In some embodiments, computer system 3600 trains the discrimination network 1507 before specifying the set D3 for discrimination network N3 to discriminate from other data. In such embodiments, network 1507 is trained before training network 1508. In some embodiments, computer system 3600 does additional training of the combined network represented in FIG. 15 and/or of a larger network containing the network illustrated in FIG. 15.

For block 1505, computer system 3600 determines whether the activation of the output of network N3 for a datum d indicates that datum d is not in set OTHER and the activation of the output of the network associated with block 1507 indicates that the datum d is in set D1. Computer system 3600 may do this computation with a single standard two-input node that is basically a continuous-valued extension of the Boolean AND function.

Similarly, for block 1506, computer system 3600 determines whether the activations of networks 1507 and 1508 indicate that datum d is in D2 and is not in OTHER.

For block 1501, computer system 3600 normalizes the activations D1, D2 and OTHER to a set of numbers that sum to 1 using a softmax computation $z_k = \exp(x_k)/\Sigma_j \exp(x_j)$. The softmax computation is well known to those skilled in the art of training neural networks. It produces a set of scores for the three alternatives that are positive and that sum to 1. Thus, the network illustrated in FIG. 15 is a three-way, two-level discriminator comprising two two-way discriminators. It may combine a discriminator that may be trained on a small amount of data, 1507, with a discriminator in which one of the sets discriminated, OTHER, may have a larger amount of data.

FIG. 16 is an illustrative embodiment of an aspect of the invention which is a form of selective back propagation herein called "implicit delegation." In the embodiment illustrated in FIG. 16, computer system 3600 implicitly delegates responsibility for fixing an error on a datum D1 away from node N1 to the rest of the network to improve the performance of node N1 on other data.

In block 1601, computer system 3600 obtains the selection of a target node N1 and a target datum D1 or a set of target data D1.

In block 1602, computer system 3600 checks that node N1 makes a classification error on D1 or that N1 makes no classification choice on D1. This check may be done, for example, by the illustrative embodiment illustrated by FIGS. 6 and 7. If a set of target data D1 obtained in the selection in block 1601 contains more than one element, computer system 3600 performs this check on each element in the set D1 and removes from the set any datum that does not satisfy this criterion. In some embodiments, the procedure illustrated in FIG. 16 is repeated separately for each member of a target set, selecting one member at a time.

In block 1603, computer system 3600 checks that the magnitude of the average of the derivative of the network error loss function with respect to the activation of node N1 averaged over the full training set or a selected set of representative data is smaller than the magnitude of the average when the average is taken with D1 excluded.

In block 1604, computer system 3600 creates a selective back propagation control that blocks back propagation to node N1. This control may, for example, be a list for each node of the data for which back propagation is blocked for that node. Alternately, the control may, for example, be a list for each datum of the nodes for which back propagation is blocked for that datum. Another example of the control would be a hash table that contains the set of pairs of nodes and data for which back propagation is blocked.

In block 1605, computer system 3600 sets the control to block back propagation to node N1 for datum D1 in subsequent training.

In block 1606, computer system 3600 resumes training of the network, with responsibility for datum D1 implicitly delegated from node N1 to the rest of the network or to new nodes created in later rounds of incremental growth FIG. 17 is a flowchart for an illustrative embodiment of an aspect of the invention for creating a set of nodes that implement what is herein called an "activation split," which was referenced in block 309 of FIG. 3. In block 309 of FIG. 3, computer system 3600 has already selected a target node N1 and a target datum D1.

In some embodiments, the process of an activation split illustrated in FIG. 17 may also be used in a context other than as referenced in FIG. 3. Depending on the context, a target node N1 may have already been selected, as in FIG. 3. A target datum D1 may also have been selected, but, in some embodiments, it may be ignored in the process illustrated in FIG. 17.

In block 1701, computer system 3600 obtains a specified selection that has been made for a target node N1 or makes a selection if none has been made. In some embodiments, computer system 3600 may make a new selection of a target node N1 even if one has already been made. In block 1701, in making a selection of a target node N1, computer system 3600 selects a node with a small magnitude (e.g., less than a threshold) for the derivative of the network error loss function with respect to the output activation of the node.

In block 1702, computer system 3600 checks whether the specified improvement method is to be targeted or semi-targeted. If the improvement method is to be semi-targeted, computer system 3600 proceeds to block 1712 and uses the semi-targeted data procedure described in association with FIG. 11. If the specified improvement procedure is to be targeted, computer system 3600 proceeds from block 1702 to block 1703. In block 1703, computer system 3600 checks whether node N1 makes a classification error on the target datum D1 obtained or selected in block 1701 based on the process illustrated in FIG. 6.

If node N1 makes a classification error on datum D1, computer system 3600 proceeds to block 1704 in some embodiments. In some embodiments, computer system 3600 may skip block 1704 and proceed directly to block 1705 even if N1 makes a classification error on datum D1. In some embodiments, computer system 3600 may use the procedure in block 1704 instead of the process in blocks 1705-1710. In some embodiments, computer system 3600 may use the process in block 1704 in addition to the process of blocks 1705-1710.

In block 1704, computer system 3600 uses the process illustrated by blocks 302-305 in FIG. 3 to select an improvement method targeted at the error.

In an embodiment that uses the procedure in block 1704 in addition to the process of blocks 1705-1710, computer system 3600 proceeds from block 1704 to block 1705. In an embodiment that does not proceed from block 1703 to block 1704, computer system 3600 proceeds directly from block 1703 to block 1705.

For the purpose of block 1705 node, N1 is said to be a "standard node" if N1 has a monotonic activation function f(x) of the form of a weighted summation of incoming connections: $act_{N1}(d)=f(\Sigma_j w_{j,N1} act_j(d))$.

In block 1705, if node N1 is not a standard node, computer system 3600 exits, otherwise computer system 3600 checks the range over a selected set of data of the value of the summation of incoming connections to see if the range is greater than zero or greater than a specified minimum. In some embodiments, the selected set of data may be the entire set of training data. In some embodiments, the selected set of data may be some other set, such as a set comprising the target datum and one or more candidates for datum D2 to be discriminated from D1.

If all the values of the incoming weighted sum for the selected data are the same or the difference between the maximum value and the minimum value is less than some specified value, then computer system 3600 exits the procedure illustrated in FIG. 17. In some embodiments in which a specified target datum D1 has been selected, the range is measured as maximum of the absolute value of the difference between the activation value for datum D1 and the maximum or minimum value over rest of the set of data, which in some embodiments may be a single specified datum D2. In some embodiments, datum D2 may be selected as the datum that maximizes the absolute value of the difference from the incoming activation for target datum D1. In some embodiments, the selection of datum D2 is restricted to choices for which datum D1 and D2 have different classification categories, but in some embodiments there is no such restriction because even discriminating two data from the same category may accelerate the training by increasing the magnitude of the derivative of the network error loss function with respect to the activation of node N1.

If the range of values is sufficient, computer system 3600 proceeds from block 1705 to block 1707. In block 1707, computer system 3600 uses the weighted sum $\Sigma_j w_{,1} act_j(d)$ for what is herein called an "activation split" of the data, such as illustrated in blocks 1708-1710. In some embodiments, computer system 3600 may create only a single new node discriminating datum D1 from datum D2 as illustrated in blocks 1708-1710. In some embodiments, multiple new nodes may be created by a similar process, with different choices for D2 or, in some embodiments, different choices for D1 or for both D1 and D2. From block 1707, computer system 3600 proceeds to block 1708 to create a node to discriminate the target data D1 from the selected data D2 or, in some embodiments some other selected pair of data D1, D2. In block 1708, computer system 3600 creates a new node N2. In block 1709, computer system 3600 creates incoming connections for node N2 and initializes by copying the incoming connections and weights of node N1 and initializes the node bias for node N2 to discriminate D1 from D2. In block 1710, computer system 3600 adds connections from the new node N2 to node N1 and, in some embodiments, to the output nodes for the category C1 of datum D1 and the category C2 of datum D2. In an embodiment in which multiple new nodes are to be created, computer system 3600 proceeds from block 1710 to block 1711. In block 1711, computer system 3600 selects a new pair of data D1 and D2 if any new choices are available with an adequate absolute value for the difference in their incoming activation values unless a specified limit on the number of new nodes has been reached.

FIG. 18 is a flow chart of an illustrative embodiment of an aspect of the invention, in which a new node or node set is created by incremental growth and merged into an expanded network which is trained to implement an improvement without forgetting what the base network has already learned. This process is herein called "all-node regularization" which has been referenced in the discussions associated with other figures and which will be discussed further in association with FIGS. 19 and 20.

In block 1801, computer system 3600 saves a copy of the base network. This copy will be used for the preliminary training of the selected new node or node set and the weights of the incoming connections to the new node or node set without back propagating the estimates of the partial derivatives to lower nodes in the network. In block 1802, computer system 3600 obtains preliminary information that computer system 3600 may have prepared in block 204 of FIG. 2. In block 1803, computer system 3600 trains the stand-alone network. In some embodiments, the stand-alone network may be a single layer neural network, with no hidden layer. In some embodiments, the task is merely to discriminate one datum from another, which can be achieved without any training.

In some embodiments, whatever position in the base network is selected for the new node or node set, the new node or node set may receive connections from any node in a lower position, including directly from the input. This property allows the new node or node set to represent in a single layer network detections and discriminations that may be more difficult to learn in a layered neural network with many layers.

Similarly, when computer system 3600 merges the new node or node set into the base network in block 1804, the new nodes may be connected directly to any higher rank node, including output nodes so in subsequent in-place training the new nodes may receive very efficient back propagation of any error conditions.

Although the initial stand-alone network may be a single layer network, it also may be as complex as necessary. For example, the stand-alone network training may itself use incremental growth, so the stand-alone network can grow, adding as many additional nodes and layers as needed. In many embodiments, the initial one-layer network may suffice.

In block 1804, computer system 3600 merges the trained stand-alone network back into the base network to form an expanded network. In a preferred embodiment, computer system 3600 initializes the weights of all outgoing connections from the new node or node set to zero. Thus, initially the expanded network will perform exactly the same computation as the base network and thus will have the same performance. In some embodiments, the training targets selected by computer system 3600 in block 204 of FIG. 2 and obtained in block 1802 may be designed to ensure that one or more of the derivatives of some of the new connections from the new nodes to nodes in the base network are non-zero. In some embodiments, the selection of D1 and D2 may be made to maximize the magnitude of some of one or more of these derivatives.

Thus, when computer system 3600 trains the merged, expanded network in block 1805, using an iterative training algorithm such as stochastic gradient descent, the performance of the expanded network will be trained to be better than the performance of the base network.

In block 1805, computer system 3600 trains the merged network with node-to-node relationship regularization from the saved copy of the base network, as illustrated in FIG. 20. In a preferred embodiment, every node in the base network is linked to the corresponding node in the expanded network. The activation values of the nodes of the base network can be saved in memory for this purpose. In this embodiment, the regularization adds a regularization cost if the activation of the regulated node disagrees with the activation of the regulating node on any datum in a specified set of data. Under the control of the humans or AI systems in the ILMS, computer system 3600 may adjust the strength of each link and the specified set of data to relax the regularization when that helps the expanded network learn new things or to tighten the regularization when that is necessary to prevent the training of the expanded network to cause the expanded network to fail on a task that can be done correctly by the base network.

This regulation can be used by computer system 3600 in training the expanded network to learn new things while not forgetting things that have already been learned by the base network. In addition, this node-to-node regularization may be used in some embodiments to improve the ability of the network to generalize to new data.

FIG. 19 is a diagram of a node-to-node relationship regularization link, an aspect of the invention that helps achieve several goals: (1) The ability to learn new tasks without forgetting how to perform useful previously-learned tasks, (2) Ease of interpretation, and (3) Improving the ability to generalize to new unseen data.

Although a node-to-node relationship link is a link 1904 from the regulating node 1901 to the regulated node 1902, it is not a connection. Rather than participating in the feed forward activation of the network, it operates during the back-propagation phase of the computation. However, it does not compute or propagate a derivative of the network error loss function. It imposes a loss function on the regulated node 1902 for a datum based on the amount of deviation from the desired relationship. In an illustrative embodiment, the desired relationship 1903 is that the activation value of the regulated node for datum d be the same as the activation value of the regulating node for datum d. In other embodiments, other relationships, such as inequalities, may be specified. In some embodiments, a measurement other than the activation value may be the subject of a relationship. For the illustrated equality relationship, an example cost function may be the absolute value of the difference between the activation value of the regulating node and the activation value of the regulated node times a hyperparameter S, herein called the "regulation strength." That is, Loss=$S^*|act_N(d)-act_M(d)|$. Another example would be S times the square of the difference in the activation values.

FIG. 20 is an illustrative embodiment of an aspect of the invention herein called "all-node regularization." In the illustrative example, computer system 3600 applies incremental growth to original network 2001 to produce the expanded network 2002. In the illustrative example, there is a node-to-node relationship from every node in network 2001 to the corresponding node in 2002 with the desired relationship 2003 being equality of the activations of each pair of linked nodes.

Dashed arrows, such as those from node 2005 to node 2007 and node 2006 to node 2008 represent node-to-node relationship regularization links for an is-equal-to relationship. Node 2009 represents a node that has been added by incremental growth to create the expanded network 2002 from the original network 2001.

In the illustrative embodiment, computer system 3600 may control, at block 2004, the strength S of the regularization loss on a customized, node-specific basis. In block 111 of FIG. 1, for example, based on tests performed by computer system 3600 in block 110 and control from the ILMS, computer system 3600 may increase the strength of the regularization for some nodes to prevent forgetting of previously learned patterns while decreasing the regularization strength for nodes whose activations need to be different from those in the original network in order to learn the new knowledge.

FIG. 21 is an illustrative embodiment of another aspect of node-to-node relationship regularization, in which the specified relation 2104 is that the activations of the linked nodes not be equal. In this illustrative embodiment, there is a directional link 2105 from node 2102 to node 2103 and a directional link 2106 from node 2103 to node 2102 for nodes 2102, 2103 that are part of a single network or set of networks 2101. In some embodiments, only one of the two is present. As with any node-to-node relationship regularization, nodes 2102 and 2103 may both be in the same network or they may be in different networks. If node 2102 and node 2103 have bounded activation functions $f_2(x)$ and $f_3(x)$, respectively, then let $$\text{LimMin}_2 = \lim_{x \to -\infty} f_2(x)$$

$$\text{LimMax}_2 = \lim_{x \to \infty} f_2(x)$$

$$\text{LimMin}_3 = \lim_{x \to -\infty} f_3(x)$$

$$\text{LimMax}_3 = \lim_{x \to \infty} f_3(x)$$

$$R = \text{Max}\{\text{LimMax}_2, \text{LimMax}_3\} - \text{Min}\{\text{LimMin}_2, \text{LimMin}_3\}$$

Then the loss function for an is-not-equal-to regularization link in each direction between node 2102 and node 2103 could be, for example, Loss=$S^*(R-|act_N(d)-act_M(d)|)$, with Loss being maximized when the two activations are equal.

For the purpose of an illustrative example, let node 2102 and node 2103 each be a node in separate members of an ensemble. As in any node-to-node relationship, computer system 3600 may enforce the regularization selectively. That is, the strength S of the regulation may depend on the datum and may be zero for any subset of the data.

In the scenario of an illustrative example, computer system 3600 may specify a non-zero strength for the regularization only for a datum for which the ensemble member containing node 2102 and the ensemble member containing node 2103 both make the same classification mistake. Using this regularization, computer system 3600 would enhance a special conditional diversity. Computer system 3600 would be enforcing a rule that might be stated "Don't both make the same mistake." General diversity is often difficult to train, especially if each ensemble member individually has a low percentage of errors, which means that the activations of corresponding nodes are likely to be highly correlated over the full set of data. The more focused conditional diversity in this illustrative example may be easier to train than general diversity.

This type of conditional diversity may also be used in targeted incremental growth for continual learning, selectively enforcing some inequality links while enforcing many equality links between nodes in the original network and corresponding nodes in the expanded network. In this incremental learning example, the directional node-to-node link would only go from a node in the original network to a node in the expanded network, not the other direction.

Computer system 3600 may also implement node-to-node is-not-equal-to links selectively among some ensemble members when incrementally growing an ensemble. By controlling the relative proportions of is-equal-to links and is-not-equal-to links and the strengths of the regularization, computer system 3600 may be able to continue growing the ensemble indefinitely while maintaining diversity as incremental growth continues.

FIG. 22 illustrates an aspect of the invention, herein called "doubling," in which computer system 3600 makes a large untargeted incremental growth to an original network and uses node-to-node relationship regularization to help prevent the expanded network from forgetting knowledge that is represented in the original network.

In the illustrative example, computer system 3600 doubles the size of the original network by creating a new second node N2 for every node N1 in the original network. Thus, for example, node 2205A in the original network 2201 becomes two nodes, 2205B and 2205C in the expanded network 2202. Similarly, nodes 2204A and 2206A in the original network become nodes 2204B-2204C and 2206B-2206C, respectively, in the expanded network.

In the illustrative embodiment, computer system 3600 creates a node-to-node relationship regularization link with an is-equal-to relation 2203 from each node in the original network to each of the two corresponding nodes in the expanded network.

In some embodiments, some, or all, of the nodes in the original network, such as 2205A, may be linked by computer system 3600 to both or to only one of the corresponding nodes, 2205B and 2205C, in the expanded network, or to neither of the corresponding nodes.

In some embodiments, some or all of the pairs of nodes corresponding to the same node in the original network may be linked to each other with a directional (e.g., unidirectional or bidirectional) relationship regularization link with an is-not-equal-to relationship, enforced on a specified set of data to create selective diversity between the pair of nodes copied from the same node in the original network.

In the illustrative embodiment, computer system 3600 and the ILMS may monitor the training to detect when the strength of one of the two links from a node in the original network should be decreased to enable the regulated node to learn something new while the other node corresponding to the same node in the original network continues to have a strong link to help prevent forgetting of previously learned tasks.

In some embodiments, the number of nodes in the expanded network for each node in the original network may be greater than two. In some embodiments the number of corresponding nodes may vary, being greater for some original nodes than for others.

FIG. 23 is a flowchart of an illustrative embodiment of the invention in which a detector node N2 is created and trained to be merged as an incremental addition to a network. The embodiment illustrated in FIG. 23 is an illustrative embodiment of "one-shot learning," meaning that the initial model or weights for the new node may be created from a single example or from a small number of examples.

In block 2301, computer system 3600 obtains a set of data D. Typically, each datum in D is a vector of activation values of selected nodes in the network, including input nodes and inner nodes with rank lower than the selected position in the network at which N2 is to be merged. When the process illustrated in FIG. 23 is implemented by computer system 3600 for a target datum, the set D may have only a single element D1. Preferably, all the data in the set D are representatives of the same category C, but in some embodiments the data may come from multiple categories. In the process illustrated in FIG. 23, computer system 3600 trains a node N2 with a parametric model to detect D and other data similar to D, preferably also of category C. In some embodiments, during the training, computer system 3600 may group such other data into a cluster represented by a larger set D (e.g., data within a threshold distance of D1) and possibly modeled by a more complex example-based model.

With the limited data available, in some embodiments, the parametric model may be ad hoc. However, in an illustrative embodiment, in the model there may be two parameters for each element in the vector of activation values. One parameter may represent central tendency, such as the mean. The other parameter may represent the degree of spread, such as the variance. For purpose of discussion, the operation of the following blocks are described in terms of estimating a mean and a variance for each random variable although in some embodiments the parameters may represent some other form of probability model or a pure ad hoc model.

In block 2302, computer system 3600 computes the vector mean, or some similar statistic, of the data in the set D, which is D1 if D1 is the only element of set D.

In block 2303, computer system 3600 uses whatever prior information may be available to help set the initial values for the parameters in the model. In one-shot learning, in particular when computer system 3600 implements the process illustrated in FIG. 23 to build a detector node for a single target datum D1, there may be no prior information for estimating the means of the random variables, but there may be useful information about the variances, from prior experience with other data. This prior information will be essential in the case in which the set D contains only the single element D1. It will be valuable in any case because there are at most a small number of examples in D.

In block 2304, computer system 3600 uses the sample mean as an estimate of the mean of each random variable and makes a Bayesian estimate of each variance. In block 2305, computer system 3600 creates the initial model for the detector node, modeling each random variable as an independent random variable with the parameters of a parametric model estimated as described in blocks 2302-2304. In block 2306, computer system 3600 merges node N2 into the base network, as described in association with block 106 of FIG. 1 and in association with FIGS. 12 and 18. In block 2307, computer system 3600 trains the merged network. During this training additional data may be assigned to set D, for example, by a clustering algorithm. Clustering algorithms are well known to those skilled in the art of machine learning. In block 2308, computer system 3600 trains the model based on any additional data that has been accumulated during the training. In block 2309, computer system 3600, with guidance from the ILMS, determines whether a more complex model should be estimated. Examples of a hierarchy of more complex models are discussed in association with FIG. 27 and the process of progressing through a sequence of models of increasing complexity is described in association with FIG. 29. If a more complex model is not to be built, computer system 3600 returns to block 2307 until some stopping criterion is met.

In block 2310, computer system 3600 builds a more complex model, for example, as described in association with FIGS. 27 and 29. In some embodiments, for example, a more complex model such as a multivariate Gaussian model with a non-diagonal covariance matrix may be estimated based on the amount of data available and evidence that the random variables are not independent. After building a more complex model, computer system 3600 tests a stopping criterion and either returns to block 2307 or terminates the process of building and training more complex models for detector node N2.

Figure 24:
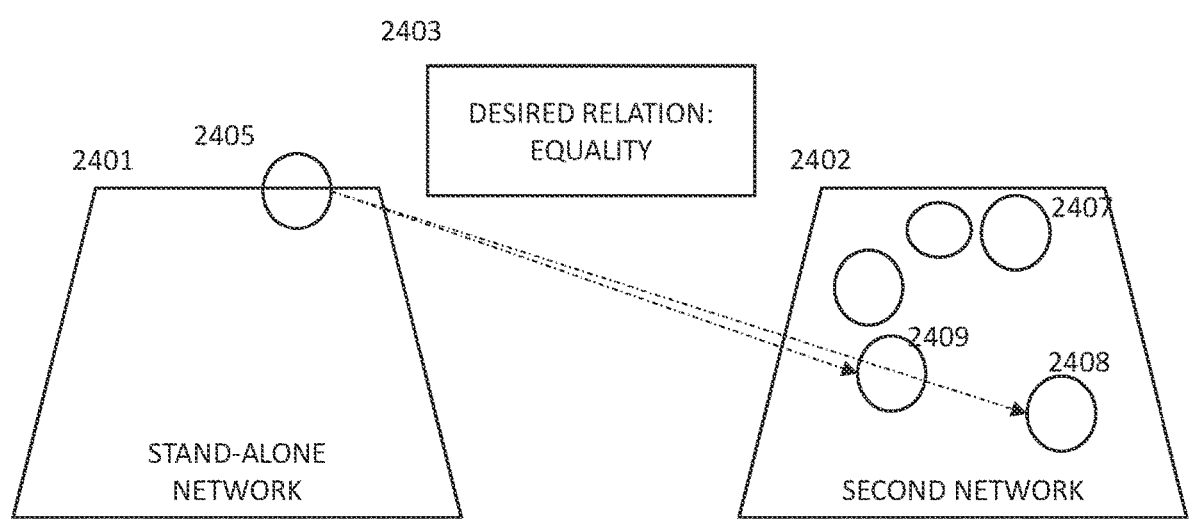
FIG. 24 is a diagram of an illustrative embodiment of an aspect of the invention.

FIG. 24 is a diagram of an illustrative embodiment of an aspect of the invention in which a stand-alone network 2401 helps to propagate interpretability to some of the nodes in a second network 2402. For example, network 2401 may be a stand-alone network that has been created to learn a specified detection or discrimination during targeted incremental growth. As an output node of the stand-alone network 2401, node 2405 would have an interpretation characterized by the detection or discrimination to which stand-alone network 2401 has been trained. FIG. 24 illustrates how computer system 3600 may propagate the interpretation of node 2405 to nodes in the second network 2402. Network 2402 may or the expanded network into which computer system 3600 has merged stand-alone network 2401, or network 2402 may be a network not related to the incremental growth for which computer system 3600 has built stand-alone network 2401.

In the illustrative embodiment illustrated in FIG. 24, the stand-alone network 2401 may be any network that has a node 2405 that is an output node associated with a known category C or is a hybrid inner node that also has an output target of category C during training. In such a case, node 2405 has a known interpretation, namely that it has been trained to be activated for category C, and its performance on its training data is also known.

In the illustrative embodiment illustrated in FIG. 24, there is a node-to-node relationship regularization link from node 2405 to one or more nodes in network 2402, as illustrated by nodes 2408 and 2409. As such, node 2405 does not have a node-to-node relationship regularization link to other nodes 2407 in network 2402.

Computer system 3600 helps propagate the interpretation of node 2405 to nodes 2408 and 2409 by imposing a regularization cost function if node 2408 or node 2409 does not satisfy the specified relationship 2403 for a datum d. In the illustrative embodiment of FIG. 24, the specified relationship is for activation of the regulated node for datum d to be equal to the activation of the regulating node 2405 on datum d.

Figure 25:
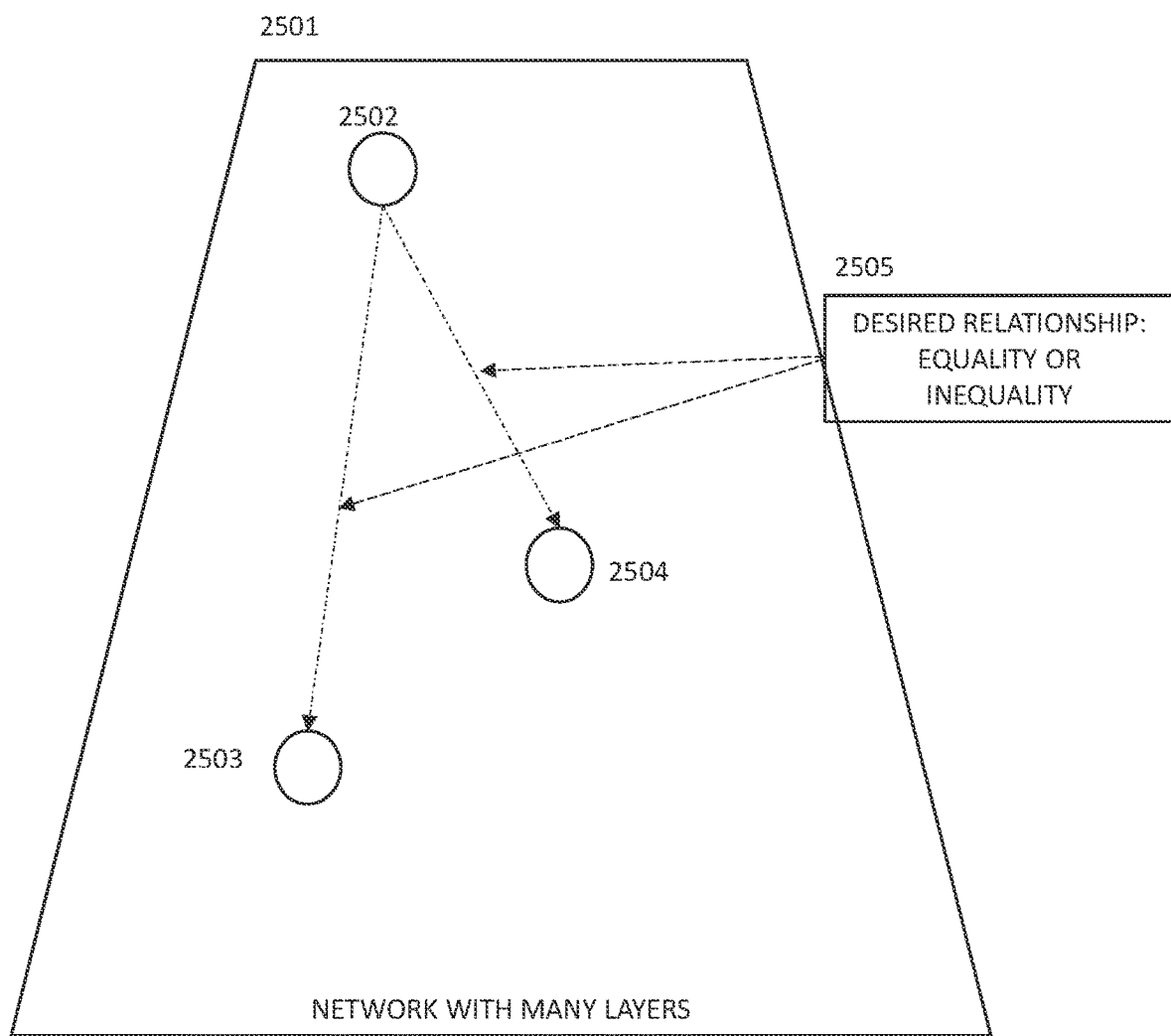
FIG. 25 is a diagram of an illustrative embodiment of an aspect of the invention.

FIG. 25 is a diagram of an illustrative embodiment of an aspect of the invention in which a higher ranked node 2502 in multi-layer network 2501 has a node-to-node relationship regularization link to one or more lower ranked nodes, such as nodes 2503 and 2504. Note that, unlike a network connection, a node-to-node relationship regularization may go from a higher ranked node to a lower ranked node. In some embodiments node-to-node relationship regularization links two nodes within a single network only from a regulating node to a regulated node that is incomparable to the regulating node or that is less than the regulating node in the partial order corresponding to the layered neural network or directed acyclic graph. In some embodiments, there is no such restriction. Some embodiments have links that go from a regulating node to a regulated node that is greater than the regulating node in the partial order corresponding to the layered neural network or directed acyclic graph. One way in which cyclic computations may be avoided is for computer system 3600 to implement the regularization associated with a lower node regularizing a higher node before the back propagation computation and to implement downward going links during or after the back propagation computation.

One reason for links going from a higher ranked node such as node 2502 in FIG. 25 is to have the regularization be, in effect, a soft training target for the lower ranked node, helping guide the lower ranked node to learn an approximation to the activation of the higher ranked node, which in turn will provide back propagation to other lower ranked nodes that otherwise have only remote indirect connections to high ranked nodes or to the output target. The relationship 2505 may be any computable relationship. Three useful examples are the equality relation X=Y and the two inequality relationships X≤Y and X≥Y. The equality relationship regularizes the regulated node to match the activation of the regularizing node as well as it can. The use of the equality relationship is discussed further in association with FIGS. 18, 19, 20 and other figures.

For nodes that make classification choices, the inequality relationships may be interpreted in terms of the set of data that a node detects or the pair of sets that it discriminates. For example, the relationship X≤Y may help node Y learn a set that is broader than the regularizing node X in an ontology, such as the case when Y is an animal and X is a tiger.

FIG. 26 is an illustrative embodiment an aspect of the invention, herein called "node splitting," in which computer system 3600 performs targeted incremental growth by cloning a target node N1 and replacing the target node with two new nodes, N1 and N2, that are trained for diversity.

In block 2601, computer system 3600 receives a specified selection of a target node N1. In block 2602, computer system 3600 receives a specified selection of a target datum D1 and a set D2 that is to be discriminated from D1. Preferably, the data in set D2 are of a category C2 that is different from the category of datum D1, category C1. The set D2 may contain a single element. In some embodiments, D1 may be a set with more than one element. In block 2603, computer system 3600 creates a new node N2 as a copy of node N1. In block 2604, computer system 3600 copies the incoming and outgoing connections and the weight values of node N1 to node N2.

In block 2605, computer system 3600 creates bidirectional relationship regularization link, or equivalently two directional links, between node N1 and node N2. In a preferred embodiment, the link enforces an is-not-equal-to relationship between the activation of node N1 and the activation of node N2 that is enforced on a selected set of data that comprises the union of D1 and D2.

In block 2606, computer system 3600 optionally connects node N1 to the output node for category C1, the category of datum D1, and optionally connects node N2 to the output node for category C2, the category corresponding to the set D2. In some embodiments, the set D2 may comprise nodes corresponding to a plurality of categories. In such a case, computer system 3600 may optionally connect node N2 to output nodes for any of those categories. In block 2607, computer system 3600 trains the expanded network.

Figure 28:
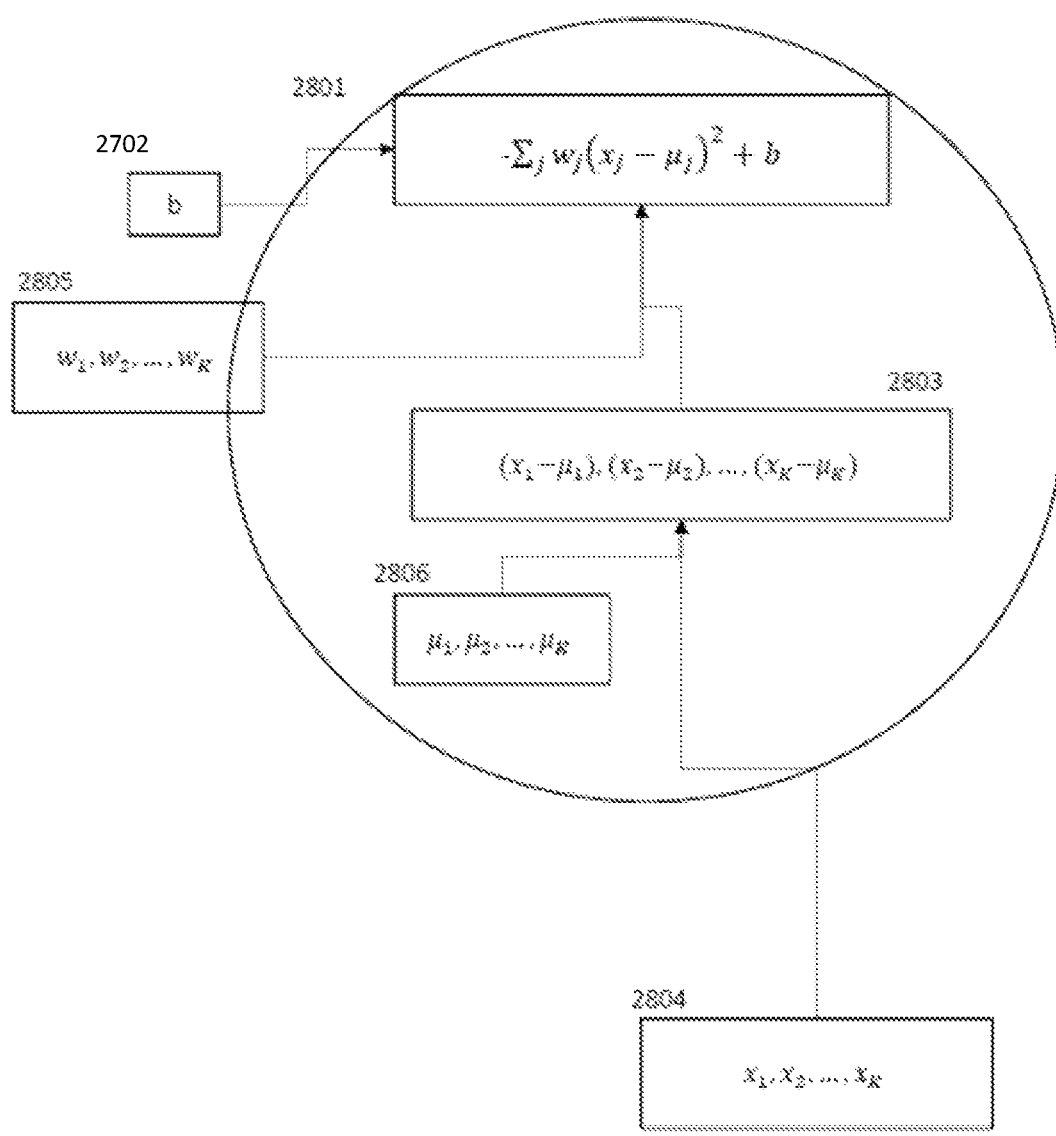

FIG. 27 and FIG. 28 are two versions of a diagram of an illustrative embodiment of an aspect of the invention in which computer system 3600 may train any of a variety of special purpose models that attempt to detect any instance of data in a specified target set D and reject instances of any other data. The model may be represented as a single complex detector node with a vector of node-specific learned parameters $<\mu_1, \mu_2, \ldots, \mu_K>$, as illustrated in FIG. 28, or as a coordinated complex of nodes operating as a detector, as illustrated in FIG. 27. In using node 2701 as a detector, computer system 3600 seeks data for which the expression shown in node 2701 is maximized, which is to say the summation, which has the form of a vector norm is to be minimized. In some embodiments, computer system 3600 may indicate as a detection any datum D2 for which the activation of node 2701 is greater than a specified value. In some embodiments, computer system 3600 may indicate as a detection any datum D2 for which the activation of node 2701 is the greatest activation among a set of detector nodes.

For each of the K nodes 2703-1, 2703-2, . . . , 2703-K (see also node 2803 in FIG. 28), or the corresponding subunits in a single complex node, computer system 3600 computes the difference between one of the learned parameters $\mu_j$ (at blocks 2706-1, 2706-2, . . . , 2706-K in FIG. 27; block 2806 in FIG. 28) and the unweighted incoming connection (at blocks 2704-1, 2704-2, . . . , 2704-K in FIG. 27; block 2804 in FIG. 28) from the activation of a lower-level node.

For node 2701, computer system 3600 computes a biased negative of a norm or distance measure between the vector $<\mu_1, \mu_2, \ldots, \mu_K>$ and $<x_1, x_2, \ldots, x_K>$, the vector of output values for the K nodes connected to the detector node complex. For node 2701, computer system 3600 may select from any of a variety of norms. The norm illustrated in FIG. 27, number (2) in the list of example norms, may be viewed simply as a weighted Euclidean distance that can be used, for example, in a clustering algorithm to determine the "distance" from the cluster detected by the detector model and a datum $<x_1, x_2, \ldots, x_K>$. Alternately, the computation done by computer system 3600 may be viewed as computing the logarithm of the density of a multivariate Gaussian probability density function with a diagonal covariance matrix. For either viewpoint, computer system 3600 may train the model either using gradient descent or by estimating the learned parameters from sufficient statistics for the probability model, using formulas well known to those skilled in the art of statistical estimation. Computer system 3600 may compute the bias b 2702 as the logarithm of the normalizing scaling factor that normalizes the integral of the probability density function to the value 1 plus the logarithm of the estimated a priori probability of the event to be detected by the detector node complex. Alternately, computer system 3600 may train the bias b by gradient descent.

In some embodiments, computer system 3600 may compute a different norm or estimate the log probability ("logprob") of a different probability density function. Viewing the computation as a norm, computer system 3600 may use any vector norm or distance metric. Viewed as estimating the logprob of a probability distribution, computer system 3600 may use any exponential family of parametric probability distributions. Any of these models may also be herein called a "template," or a "template-like model."

Example (1) in the choice list 2710 corresponds to the standard Euclidean distance or to the logprob of a multivariate Gaussian distribution with a covariance matrix that is a multiple of the identity matrix. This choice also corresponds to a "radial basis function" because the unweighted Euclidean distance detects a region bounded by a hypersurface of equal radius, that is, a hypersphere. This type of model may also be herein called a "simple template."

Example (2) is the example shown in the illustrated node 2701 and corresponds to a weighted Euclidean distance or to the logprob of a multivariate Gaussian distribution with a diagonal covariance matrix.

Example (3) corresponds to a weighted version of an L1 norm or to the logprob of an independent bilateral exponential probability distribution for each random variable $x_j$.

Example (4) corresponds to some other vector norm or to the logprob of some other probability model, such as a multivariate Gaussian distribution with a non-diagonal covariance matrix.

In various aspects of various embodiments of the invention, a different choice of norm and different choices of training method may be preferred. For example, in targeted incremental growth with a target datum D1, initially D1 may be the only element in the set D to be detected. More generally, one-shot learning, by definition, begins training with at most a small number of examples. With few examples, computer system 3600 may choose simpler models with fewer parameters. With more data, computer system 3600 may choose a more complex model.

For example, computer system 3600 may use a simple one-shot model as the initial model for a new detector for incremental learning of a target datum, as discussed in association with FIGS. 23 and 29. Then, through a clustering algorithm or other training, computer system 3600 may add other data examples to the set D to be detected. Then, as discussed in association with FIG. 29, successively more complex models may be used, starting with an unweighted Euclidean norm, proceeding to a weighted Euclidean norm, then to a center-surround model, discussed in association with FIG. 31, and then, perhaps, to a discriminator model, as discussed in association with FIGS. 13 and 34.

FIG. 28 is an alternate illustrative form of the embodiment illustrated in FIG. 27, in which the weights 2805, incoming activations 2804 and differences 2803 relative to the vector 2806 of learned parameters $\mu_i$ have been organized into representations as vectors. The vector form shown in FIG. 28 is a more convenient form for following figures, such as FIGS. 30, 31, 33 and 32.

FIG. 29 shows an illustrative embodiment of an aspect of the invention in which increasingly complex example-based models for detectors and discriminators are built as additional data is acquired. Additional data may be acquired for a model, for example, using the procedure described in association with FIG. 10.

Figure 30:
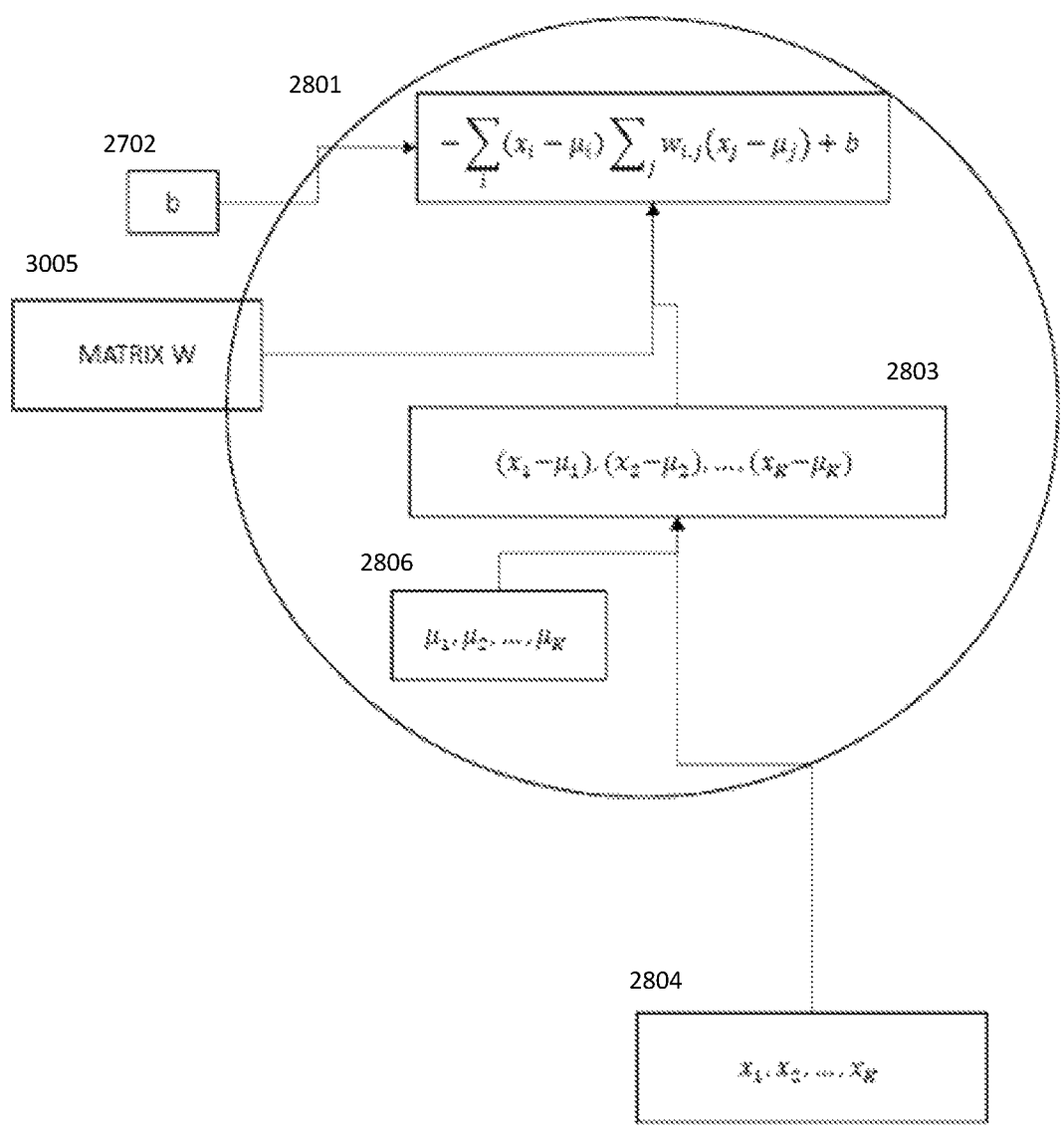
FIG. 30 is a diagram of an illustrative embodiment of an aspect of the invention in which a computer system trains a detector model.

An example of a sequence of increasingly complex models sharing a generic form is shown in FIGS. 27, 28 and 30.

In block 2901, computer system 3600 obtains the initial data, that is, examples of a set D to be detected. In some aspects of some embodiments, the initial data may comprise a single datum D1.

In block 2902, computer system 3600 builds a simple template model, also called a radial basis function model, which corresponds to a model of type (1) in the choice list of block 2710 of FIG. 27. Computer system 3600 may build a simple template model from a single datum D1.

In block 2903, computer system 3600 trains the model and may add additional data. For example, computer system 3600 may compute the activation of node 2701 in FIG. 27 for a datum D2 and add D2 to the set D if specified criteria are met, such as some or all of the criteria discussed in association with FIG. 10. In some embodiments, a criterion may be that the activation of node 2701 of FIG. 27 is greater than a specified value. In some embodiments, a criterion may be that the activation of node 2701 is greater than or equal to the activation of any other detector node in a specified set of detector nodes. In some embodiments, computer system 3600 may add and/or delete data from the set D based on a clustering algorithm. Various clustering algorithms are well known to those skilled in the art of machine learning.

After adding additional data to the set D, computer system 3600 may perform a test to decide whether to continue training the current model or to proceed to block 2904 to build a more complex model.

In some embodiments, in block 2904, computer system 3600 may build a model in which each of the input variables $x_j$ is an independent random variable with a mean $\mu_j$ and a variance $V_j$. In some embodiments, computer system 3600 may simply build a model based on a weighted Euclidean distance as illustrated in FIGS. 27 and 28 and train the model by gradient descent without interpreting the model in terms of an associated probability distribution.

In block 2905, computer system 3600 may add or delete data to the training data for the model, for example by the procedure discussed in association with FIG. 10.

In block 2905, computer system 3600 trains the model with a weighted Euclidean distance or a Gaussian model with a diagonal covariance. In various embodiments, computer system 3600 may use any of various criteria to decide whether to proceed to a more complex model and, if so, what type of model to use. In some embodiments, if there is evidence of correlation among the input variables, computer system 3600 may proceed to block 2906. In some embodiments, computer system 3600 may decide to proceed to block 2908 to build a more complex model, herein called a "center-surround" model that models some of the data that is not to be detected as well as the data to be detected.

In block 2906, computer system 3600 builds a model using a matrix of weights, as illustrated in FIG. 30. In terms of Gaussian models, FIG. 30 corresponds to a multivariate Gaussian model with a non-diagonal inverse covariance matrix.

In blocks 2906 and 2907, computer system 3600 may build and train matrices of varying complexity. For example, in block 2906, computer system 3600 may at first just model first degree correlation based on an inverse covariance matrix with only the main diagonal and the adjacent diagonals having non-zero values. In other embodiments, other restricted forms, such as a block diagonal matrix, may be used for either the covariance matrix or the model of the inverse of the covariance matrix.

In block 2907, computer system 3600 may train on additional data, providing enough data for a more complex model. Based in part on the activation of node 2701 or node 2801, computer system 3600 may decide to add or delete a datum D2 to the detection set D. In block 2907, computer system 3600 may also test to decide whether to use a more complex matrix model of the types discussed in the previous paragraph. If so, computer system 3600 returns to block 2906 to build the more complex matrix model. In block 2907, computer system 3600 may decide to terminate the training of the detector model for set D, or may decide to proceed to block 2908 to model some of the data that is not to be detected as well as the data that is to be detected.

In block 2908, computer system 3600 builds a center-surround model, as illustrated in FIG. 31.

In block 2909, computer system 3600 trains the pair of related models shown in FIG. 31. The two models 3101-1 and 3101-2 share a common vector of means $\langle \mu_1, \mu_2, \ldots, \mu_K \rangle$. In a preferred embodiment, the values of the weights 3105-1 are smaller than the values of the weights 3105-2. The combined model 3101-0 is intended to detect any datum d that is close to the mean vector in the specified norm but reject any datum that is not quite as close.

In block 2909, computer system 3600 may add data either to node 3101-1 or to 3101-2, creating, respectively a cluster of detected data, the "center," and a cluster of nearby rejected data the "surround." Computer system 3600 may train the respective models 3101-1 and 3101-2 as discussed in association with FIGS. 27, 28 and 10. In block 2909 computer system 3600 may add or delete data to the training data for the model, for example by the procedure discussed in association with FIG. 10.

In block 2909, computer system 3600 checks a stopping criterion to determine whether to terminate the process of building the detector for set D. In block 2909, computer system 3600 also checks the quantity of data and the sample mean of the data assigned to model 3101-2 to determine whether to proceed to block 2910 to build a two-model discriminator.

Figure 34:
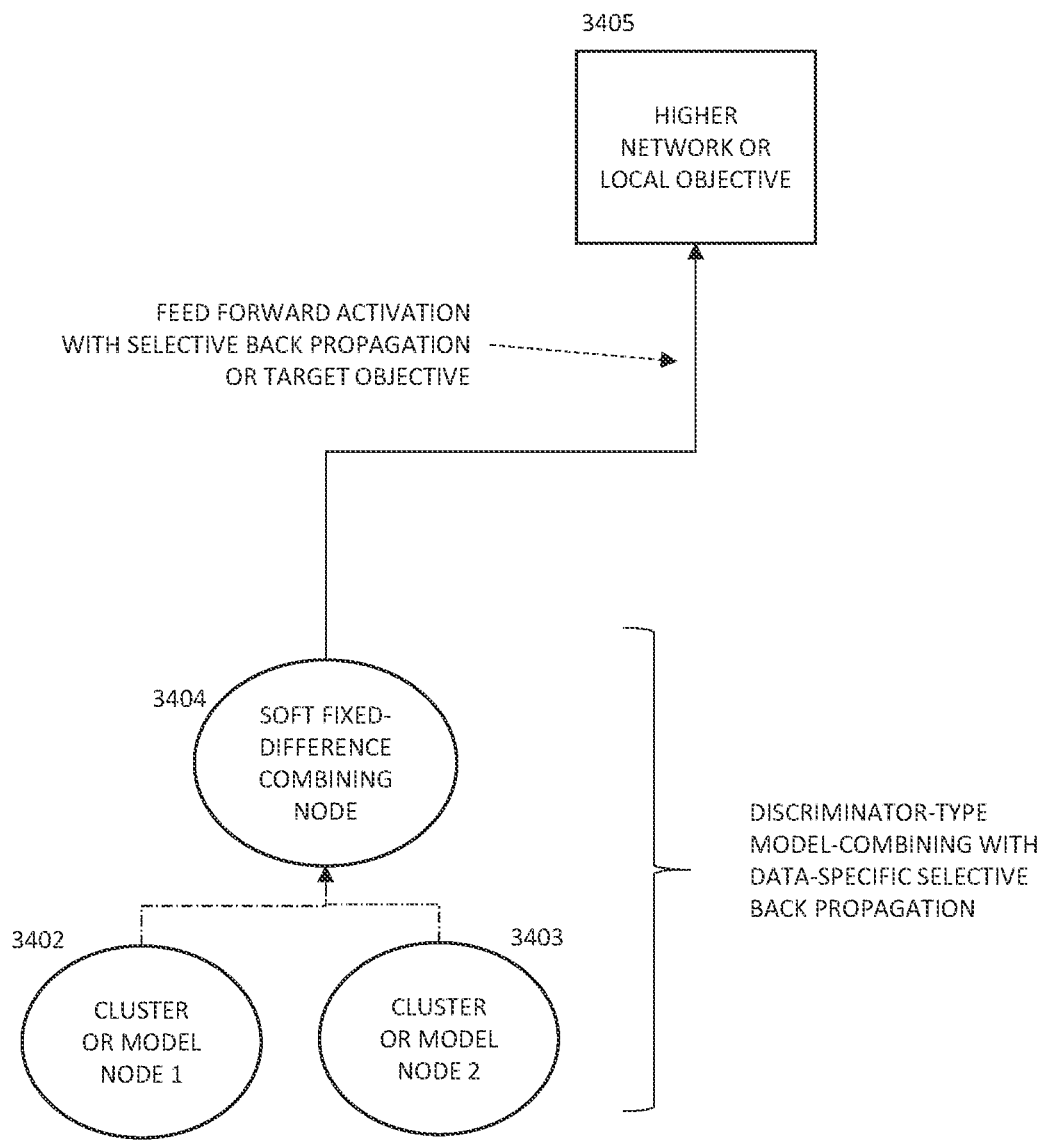
FIG. 34 is an illustrative embodiment of an aspect of the invention in which a computer system trains a discriminator node.

In block 2910, computer system 3600 builds a two-model discriminator as discussed in association with FIGS. 13, 15 and 34.

FIG. 30 is a diagram of an illustrative embodiment of an aspect of the invention in which computer system 3600 trains a detector model modeling the incoming variables as dependent probability distributions or, equivalently, clusters the data based on a norm defined by a positive definite matrix W 3005. In probability models, matrix W is the inverse of the covariance matrix. The model in FIG. 30 is a generalization of the models in FIGS. 27 and 28. The models in FIGS. 27 (1), (2) and (3) and in FIG. 28 correspond to a diagonal matrix W in FIG. 30. Viewed as a vector norm, the model in FIG. 30 corresponds to choice (4) in the choice list 2710 in FIG. 27, where the norm is defined by the matrix W. Computer system 3600 may use more data to estimate the matrix W, as discussed in association with blocks 2905, 2906 and 2907 of FIG. 29.

The use of the computation shown in FIG. 31 has been discussed in association with block 2908 of FIG. 29.

FIG. 31 is a diagram of an illustrative embodiment of an aspect of the invention in which a detector model that also discriminates between a target detection set D and a rejection set R. The combined model, represented by the activation value of node 3101-0, is herein called a "center-surround" model, as is explained below.

In an illustrative embodiment, the activation of node 3101-0 in FIG. 31 is a soft difference of the activation of node 3101-1 and the activation of node 3101-2, defined as $act_0(d)=(\exp(act_1(d/T))-\exp(act_2(d/T)))/(\exp(act_1(d/T))+\exp(act_2(d/T)))$, where T is a hyperparameter called temperature, controlled by the ILMS. The default value for T is 1.0. As described herein, the activations for nodes 3101-1 and 3101-2 are computed based on the weights 3105-1, 3105-2, 3106, applied to activations from nodes in lower layers of the network 3104-1, 3104-2, and the biases 3102-1, 3102-2.

In this embodiment, node 3101-0 has an activation value in the range $[-1, 1]$, with $act_0(d)>minDetect$ indicating a detection of datum d and $act_0(d)<maxRject$, where $maxRject \leq minDetect$, indicating a rejection of datum d and intermediate values indicating no decision. In some embodiments, the activation of node 3101-1 is an estimate of logprob1(d), the logarithm of the probability density function for the detection target evaluated for datum d, and the activation of node 3101-2 is an estimate of logprob2(d), the logarithm of the probability density function for the detection target evaluated for datum d. In these embodiments, the activation of node 3101-0 may be interpreted as an estimate of the numerical difference between the estimated probability of a correct detection and the estimated probability of a correct rejection of datum d.

In FIG. 31, the computer system 3600 uses a network that is similar to a discriminator network such as the two-model discriminator illustrated in FIG. 13, with an important difference: the two detector models 3101-1 and 3101-2 share the same vector of means or other measure of central tendency 3106. In a preferred embodiment, the values of the weights 3105-1 are greater than the values of the weights 3105-2, representing smaller variances and less spread in the distribution, so 3101-1 represents the "center" of the distribution around 3106 and 3101-2 represents the "surround."

Computer system 3600 may use node 3101-1 to detect data from a cluster close to the specified means or central tendency 3106 in the distance metric defined by the weight vector or other norm 3105-1. In some preferred embodiments, the target data intended to be detected may all be from a single classification category C or a specified set of categories disjoint from the categories to be detected by node 3101-2.

In some embodiments, the norms 3105-1 and 3105-2 may be proportional, differing only a scaling factor s. That is, the norm 3105-2 may be equal to the norm 3105-1 multiplied by s<1. In some preferred embodiments, computer system 3600 trains the biases 3102-1 and 3102-2 so that 3101-1 has a higher activation for datum $d0=<\mu_1, \mu_2, \ldots, \mu_K>$ and for data that is close to d0 in the norm 3101-1 while for data that is further away 3101-2 may have a higher activation.

In some embodiments, computer system 3600 may use node 3101-2 to detect any datum d2 that is close to the specified shared measure of central tendency d0 in the norm 3105-1 but that that represents a classification category that is not in the set of classification categories to be detected by node 3101-1. In some embodiments, computer system 3600 may use node 3101-2 to detect any datum d2 that is close to the specified shared measure of central tendency d0 in the norm 3105-1 but that is in a specified second set of categories that are to be discriminated from the categories to be detected by node 3101-1.

The combined model 3101-0 is intended to detect any datum d that is close to the mean vector in the specified norm but reject any datum that is not quite as close.

Figure 32:
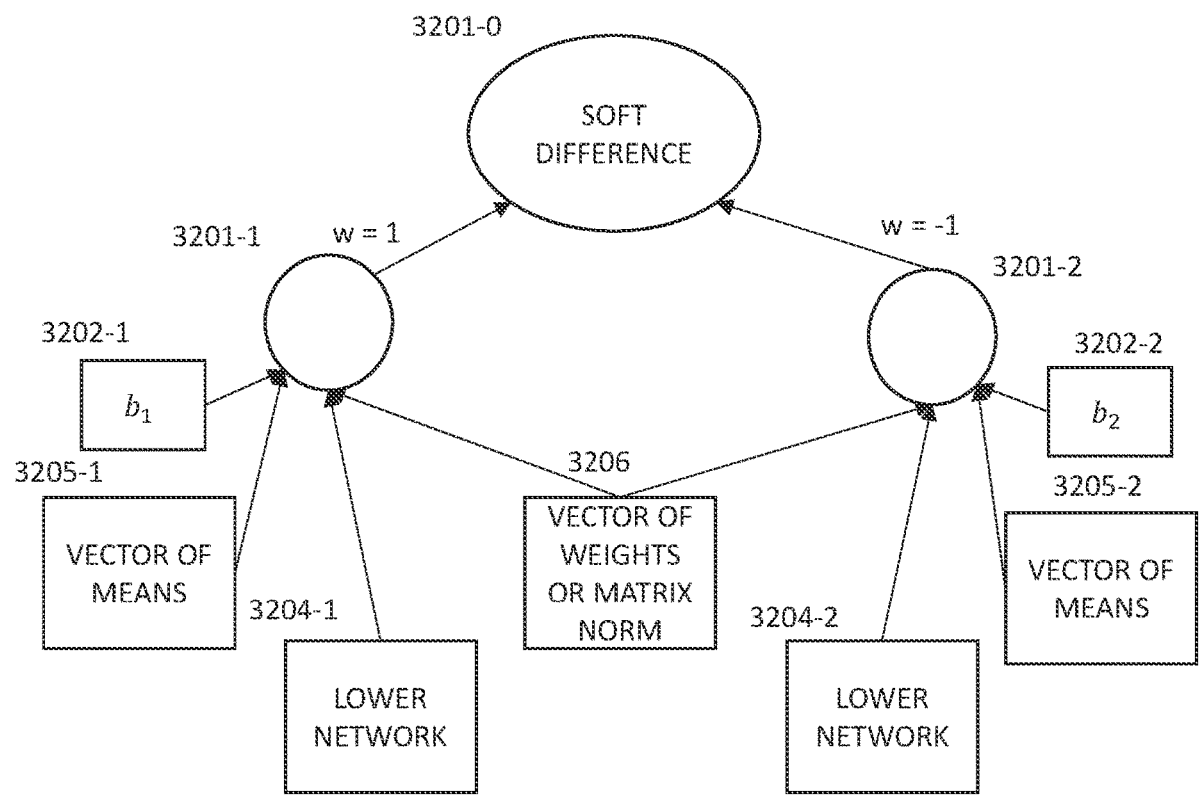
FIG. 32 is an illustrative embodiment of an aspect of the invention in which a computer system performs a computation similar to the computation performed in FIG. 31.

FIG. 32 is an illustrative embodiment of an aspect of the invention in which computer system 3600 performs a computation similar to the computation performed in FIG. 31, except, in FIG. 32, the vector of weights or matrix norm, 3206 is shared but the vectors of means, 3205-1 and 3205-2 are separate. Elements 3201-1, 3201-2, 3202-1, 3202-2, 3204-1 and 3204-2 are all similar to the corresponding elements in FIG. 31. With separate means 3202-1 and 3202-2, the embodiment illustrated in FIG. 32 does not represent discrimination of a center region of a detection from a surround region. Instead, node 3201-0 is a discrimination node, discriminating between model 3201-1 and model 3201-2. The purpose of sharing the matrix norm or vector of weights 3206 is that, when justified, this sharing tends to produce simpler, more sensible decision boundaries. For example, for Gaussian distributions with the same covariance matrix, the optimum decision boundary is linear. On the other hand, in preferred embodiments, computer system 3600 and the ILMS monitor the validity of the assumption of a shared norm and may convert the model illustrated in FIG. 32 into a model such as the one illustrated in FIG. 33.

FIG. 33 is an illustrative embodiment of an aspect of the invention in which computer system 3600 trains discrimination node 3301-0 to discriminate between model 3301-1 and 3301-2, each of which is a complete detection model such as illustrated in FIG. 30.

FIG. 33 is similar to FIG. 31, except that FIG. 33 has separate vectors of means, 3306-1 and 3306-2 and is similar to FIG. 32, except that FIG. 33 has separate norms 3305-1 and 3305-2. The elements 3301-0, 3301-1, 3301-2, 3302-1, 3302-2, 3304-1, and 3304-2 are all similar to the corresponding elements in FIG. 32. However, there are separate weight vectors of norms, 3301-1 and 3301-2, similar to 3101-1 and 3101-2 in FIG. 31. Computer system 3600 may switch to the form of discriminator 3301-0 in FIG. 33 when there is sufficient data to estimate separate means and weights or norms and there is evidence that the assumption of shared means in FIG. 31 or of shared norm in FIG. 32 is not valid.

FIG. 34 is an illustrative embodiment of an aspect of the invention in which computer system 3600 trains discriminator node 3404 with incoming connections from two detector nodes 3402 and 3403. However, in the illustrative embodiment, computer system 3600 uses selective back propagation from node 3404 and, for a datum d, may select to back propagate to only one of the two nodes 3402 or 3403.

Computer system 3600 may apply the illustrative embodiment shown in FIG. 34 to any discriminator node with incoming connections from two or more detector nodes. For example, the selective back propagation from node 3404 may be applied to node 1301 in FIG. 13, to either of the nodes 1507 or 1508 in FIG. 15, to node 3101-0 in FIG. 31, to node 3201-0 in FIG. 32, or to node 3301-0 in FIG. 33.

Each of the detector nodes 3402 and 3403 may have a monotonic activation function, a template or probability model such as node 2701 in FIG. 27 or node 2801 in FIG. 28, or a center-surround model such as the node 3101-0 in FIG. 31.

Computer system 3600 obtains a back propagated derivative or a target objective from block 3405 and transmits it to node 3404. The target objective may be a network classification target or may be a local target for an inner layer node derived as discussed in association with FIG. 6. The inner layer node may be a target node in a targeted incremental growth or may be node 3404 itself. In some embodiments, node 3405 may be an error-correction node and node 3404 may be an error-prediction node such as node 802 in FIG. 8 or node 902P or 902N in FIG. 9.

Computer system 3600 may implement selective back propagation from node 3405, back propagating to node 3404 only data that satisfies a criterion set by the system designer or by the ILMS. For example, if node 3404 is a new node created by targeted incremental growth, computer system 3600 may select to back propagate only data in the union of the sets D1 and D2, selected as discussed in association with FIGS. 3, 4, and 10.

As another example if node 3404 is a center-surround node such as node 3101-0 in FIG. 31, then, in some embodiments, computer system 3600 may select to back propagate to node 3404 only data that satisfies a criterion for being in either the center or the surround region of node 3404. More generally, for any discriminator 3404, in some embodiments, computer system 3600 may select to back propagate only data with activation values that are sufficiently close to the decision boundary based on a hyperparameter set by the system designer or by the ILMS.

Computer system 3600 also selectively controls the back propagation from node 3404. In some embodiments, computer system 3600 may back propagate a datum d only to either node 3402 or to node 3403 but not to both. For example, if computer system 3600 obtains a categorical target from block 3405, either a network classification target or a node-specific target, computer system 3600 may restrict back propagation of all data from a specified category C1 or C2 to only one of the nodes 3402 or 3403, depending on the category.

In some embodiments, node 3404 may be a new node created by targeted incremental growth. In such embodiments, computer system 3600 may have maintained an explicit list of the elements of the sets D1 and D2 as data is added to them as discussed in association with FIG. 10. In such embodiments, computer system 3600 may selectively back propagate a datum d to node 3402 or node 3403 depending on whether datum d is in set D1 or in set D2.

In some embodiments, computer system 3600 may train the detector model of node 3402 or the detector model of node 3403 by a method other than stochastic gradient descent. For example, computer system 3600 may train either model or the two models together by a clustering algorithm. If either model is a template or probabilistic model, computer system 3600 may train the model based on sufficient statistics estimated from the set of data that is back propagated by computer system 3600 to the model from node 3404. In some embodiments, either model 3402 or model 3403 may be a mixture distribution model, such as a mixture of Gaussian distributions and computer system 3600 may train the model using the expectation-maximization (EM) algorithm, which is well-known to those skilled in the art of statistical estimation. In some embodiments, computer system 3600 may use an unsupervised clustering algorithm.

Figure 35:
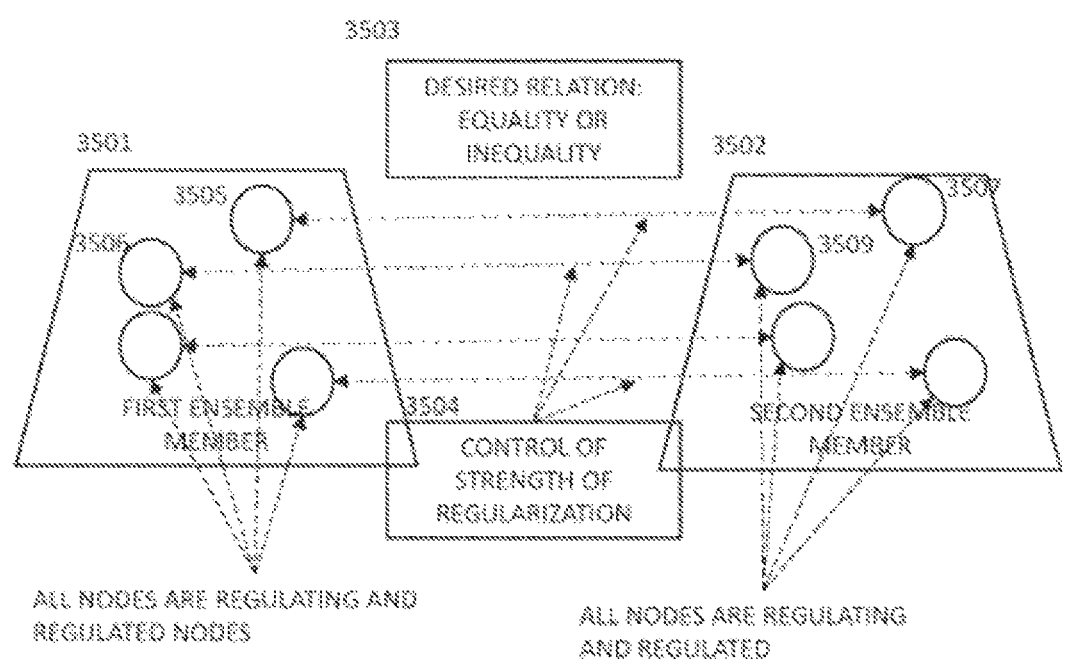
FIG. 35 is a diagram of an illustrative embodiment of an aspect of the invention in which a computer system uses node-to-node relationship regularization.

FIG. 35 is a diagram of an illustrative embodiment of an aspect of the invention in which computer system 3600 uses node-to-node relationship regularization to assist in growing large, diverse ensembles or other collections of related networks.

As discussed in association with FIG. 21, a node-to-node relationship regularization with an is-not-equal-to relation may be used to create diversity within a network or between members of an ensemble. As discussed in association with FIGS. 19, 20 and 18, an all-node regularization helps incremental learning to learn something new without forgetting what has already been learned. In such all-node regularization as discussed in association with FIG. 20, incremental learning, whether untargeted, semi-targeted or targeted, may be used to create a new network that differs from the original network only in the new nodes that computer system 3600 has added as the incremental growth. If both the original network and the new network are retained, a collection of networks may be created among which computer system 3600 may apply all-node regularization to every pair of networks, such as the pair of networks 3501 and 3502 in FIG. 35.

In some embodiments each link between a pair of nodes (such as between node 3505 and node 3507, and between node 3506 and node 3509) is a bidirectional link. In some embodiments, some links may be unidirectional. As indicated in block 3503, computer system 3600 may select some node pairs to have an is-not-equal-to relationship to create diversity in training and other links, perhaps most of the links, to have an equality relationship to help each member of the ensemble or collection of networks to learn the things that other members of the collection of networks have learned.

Computer system 3600 may control the strength of the regularization of each directional node-to-node relationship, as indicated by the dashed arrows from block 3504, to balance learning new things with remember things that have already been learned and to control the number of degrees of freedom as the ensemble grows so that what is learned better generalizes to new data.

Figure 36:
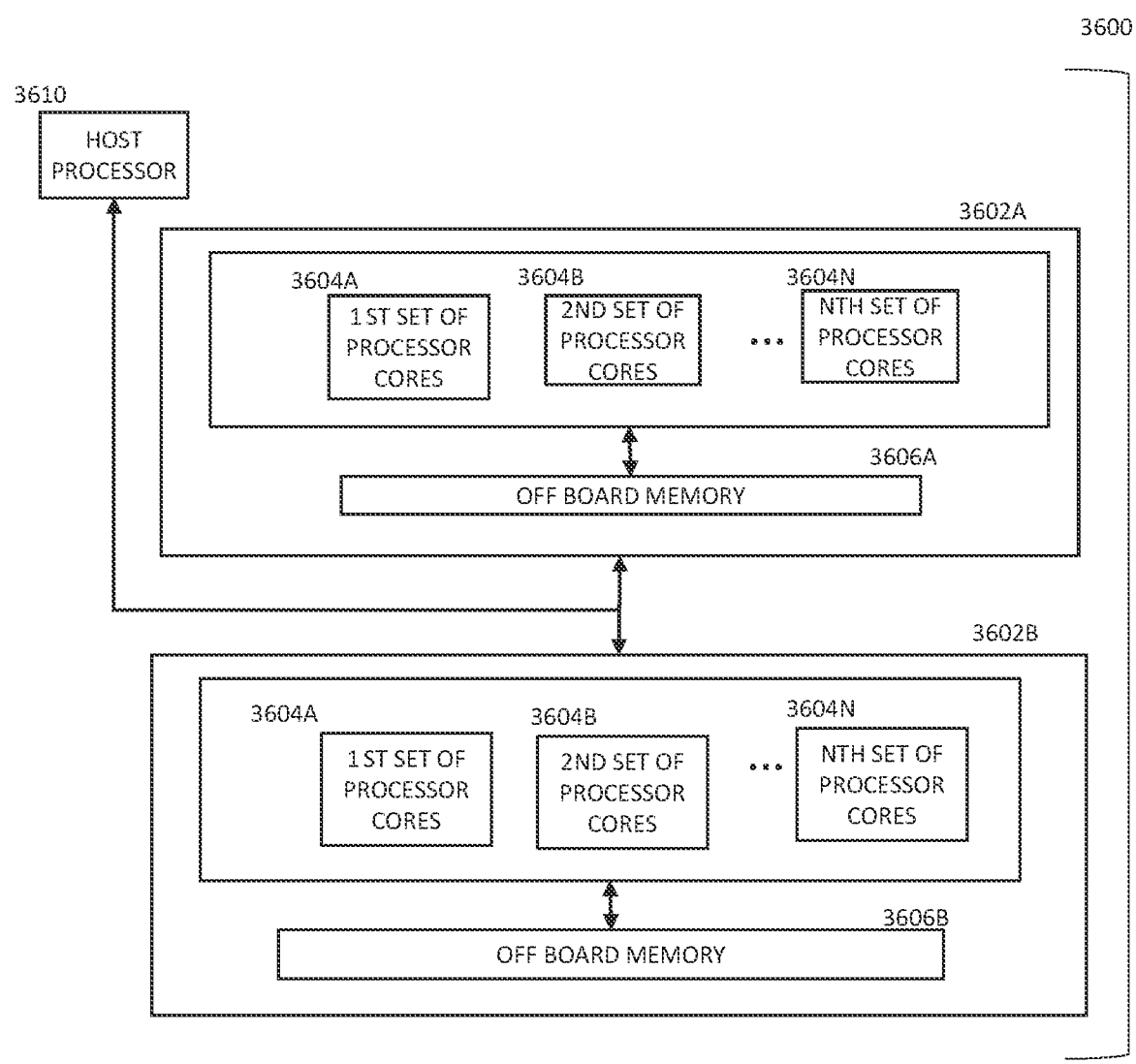
FIG. 36 is a diagram of a computer system that could be used to implement various embodiments of the invention.

FIG. 36 is a diagram of a computer system 3600 that could be used to implement the embodiments described above, such as the processes described above in connections with various figures. The illustrated computer system 1500 comprises multiple processor units 3602A-B that each comprises, in the illustrated embodiment, multiple (N) sets of processor cores 3604A-N. Each processor unit 3602A-B may comprise on-board memory (ROM or RAM) (not shown) and off-board memory 3606A. The on-board memory may comprise primary, volatile and/or non-volatile, storage (e.g., storage directly accessible by the processor cores 3604A-N). The off-board memory 3606A-B may comprise secondary, non-volatile storage (e.g., storage that is not directly accessible by the processor cores 3604A-N), such as ROM, HDDs, SSD, flash, etc. The processor cores 3604A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 3610 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 3604 may implement different steps various processes and procedures. For example, in one embodiment, the cores of the first processor unit 3602A may implement the development testing of block 110 of FIG. 1 and the second processor unit 3602B may implement the selection of a target node and/or a target datum in block 104 for the next targeted incremental growth. Further, different sets of cores in the first and/or second processor unit 3602A, 3602B may be responsible for stand-alone training of different new nodes or nodes sets as in block 1104 of FIG. 11. As another example, another multiple processor unit 3602C may implement an error prediction-correction node set such as 802 and 803 in FIG. 8. Further, different sets of cores in the first and/or second processor unit 3602A, 3602B may be responsible for different error prediction-correction node sets. As a further example, another multiple processor unit 3602D may implement node-to-node relationship regularization as in FIG. 24.

One or more host processors 3610 may coordinate and control the processor units 3602A-B. The process depicted in various figures can be embodied as a set of instructions stored within a memory (e.g., an integral memory of the processing units 3602A, 3602B or an off board memory 3606A couple to the processing units 3602A, 3602B or other processing units) coupled to one or more processors (e.g., at least one of the sets of processor cores 3604A-N of the processing units 3602A,3602B or another processor(s) communicatively coupled to the processing units 3602A, 3602B), such that, when executed by the one or more processors, the instructions cause the processors to perform the aforementioned process by, for example, controlling the machine learning systems 701, 711 stored in the processing units 3602A,3602B.

In other embodiments, the computer system 3600 could be implemented with one processor unit. In embodiments where there are multiple processor units, the processor units could be co-located or distributed. For example, the processor units may be interconnected by data networks, such as a LAN, WAN, the Internet, etc., using suitable wired and/or wireless data communication links. Data may be shared between the various processing units using suitable data links, such as data buses (preferably high-speed data buses) or network links (e.g., Ethernet).

The software for the various computer systems described herein and other computer functions described herein may be implemented in computer software using any suitable computer programming language such as .NET, C, C++, Python®, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, CUDA, Fortran, Java®, Lisp, Pascal, Object Pascal, Haskell, ML; and examples of scripting languages include Bourne script, JavaScript®, Python®, Ruby, Lua®, PHP, and Perl®.

FIG. 37 is a diagram of an example layered feed forward neural network comprising an input layer, an output layer and five hidden layers. In the illustrated example, there are five nodes in each hidden layer, but, in various embodiments there may be any number of hidden layers and any number of nodes in each layer, including the input layer and the output layer. FIG. 37 only shows connections from nodes in each layer to nodes in the next higher layer, but a connection may be made from any first node to any second node that is in a higher layer. A new connection may be added from a first node in a layer L to a second node in layer L, but in the new network, layer L would be split into two layers.

Various embodiments of the invention also apply to other forms of neural networks such as to convolutional neural networks or to neural networks that represent unrolled implementation of recurrent neural networks.

FIG. 38 is a diagram of a neural network represented as a directed acyclic graph (DAG). A directed acyclic graph is a set of nodes and a set of directed arcs connecting pairs of nodes in the set of nodes. Any feed forward neural network may be represented as a director acyclic graph in which each connection in the feed forward neural network is represented by a directed arc, and the numbering of layers is ignored. The directed acyclic graph representation is convenient in various embodiments of the invention because the repeated addition of nodes and arcs in semi-targeted and targeted incremental continually changes the layering of the network and there is no need to keep track of the changing layering in a directed acyclic graph representation.

In various embodiments, therefore, the present invention is directed to computer-implemented systems and methods for training a neural network. The method can comprise the step of (a) training, at least partially, by a programmed computer system, a base neural network on a first set of training data. The training of the base neural network can comprise computing for each datum in the first set of training data, activation values for nodes in the base neural network and estimates of partial derivatives of an objective function for the base neural network for the nodes in the base neural network. The base neural network can comprise an input layer, an output layer, and one or more inner layers between the input and output layers. The method can also comprise the step of (b) after step (a) and based on the training, selecting, by the programmed computer system, based on specified criteria, a target node of the base neural network for targeted improvement. The method can also comprise the step of (c) after step (b), adding, by the programmed computer system, a target-specific improvement network sub-component to the base network to form an expanded network. The target-specific improvement network sub-component comprises one or more nodes and the target-specific improvement network sub-component, when added to the base neural network, improves performance of the base network. The programmed computer system for performing these step may comprise one or more processor units and memory that stores software instructions, that when executed by the one or more processor units, cause the processor units to perform the method steps as described herein.

In another general aspect, the present invention is directed to a computer system for training a neural network. The computer system can comprise one or more processor units; and memory in communication with the one or more processor units. The memory stores computer instructions that, when executed by the one or more processor units, cause the one or more processor units, to: (a) train, at least partially, a base neural network on a first set of training data, wherein training the base neural network comprises computing for each datum in the first set of training data, activation values for nodes in the base neural network and estimates of partial derivatives of an objective function for the base neural network for the nodes in the base neural network, wherein the base neural network comprises an input layer, an output layer, and one or more inner layers between the input and output layers; (b) after step (a) and based on the training, select, based on specified criteria, a target datum in the set of training data; and (c) after step (b), adding a target-specific improvement network sub-component to the base network to form an expanded network, wherein the target-specific improvement network sub-component comprises one or more nodes and wherein the target-specific improvement network sub-component, when added to the base neural network, improves performance of the base network for the target datum.

In various implementations, adding the target-specific improvement network sub-component comprises, by the programmed computer system: (c1) selecting the target-specific improvement network sub-component; (c2) after step (c1), training the target-specific improvement network sub-component; and (c3) after step (c2), merging the target-specific improvement network sub-component with the base neural network to form the expanded neural network. Step (c2) may comprise training the target-specific improvement network sub-component separately from the base network. The method may also comprise the step of, by the programmed computer system, after step (c3), training the expanded neural network.

In various implementations, the specified criteria for selecting the target node comprises selecting the target node upon a determination that the target node made a classification error for a first datum in the first set of training data. The target node may be an output node of the base neural network. Alternatively, the target node is on a first inner layer of the base neural network, in which case the specified criteria for selecting the target node can comprise a comparison the activation value for the target node to a threshold value.

In various implementations, the target-specific improvement network sub-component comprises a detector node that detects instances of the first datum and data that is within a threshold distance of the first datum. The target-specific improvement network sub-component may also comprises a discriminator node that discriminates between the first datum and a second datum in the first set of training data.

In various embodiments, the target-specific improvement network sub-component comprises: an error-prediction node that is trained to detect training data on which the target node makes classification errors; and an error-correction node that passes through an activation value from the target node unless certain conditions apply. The conditions comprise (i) the target node made a classification choice and (ii) the error prediction node predict that the classification choice by the target node is erroneous. The error-correction node may reverse an output of the target node relative to a threshold value when conditions (i) and (ii) apply.

In various implementations, the target-specific improvement network sub-component comprises a second node that is a copy of the target node, such that incoming and outgoing connections, and corresponding weight values, for the target node are initially copied to the second node. There is a directional relationship regularization link between the target node and the second node. The directional relationship regularization link may comprise a bidirectional relationship regularization link. The directional relationship regularization link may enforce an "is-not-equal-to" relationship between activation values of the target node and the second node on a second set of training data, such that the second node is trained to produce different activation values than the target node on data in the second set of training data.

In various implementations, criteria for selecting the target node comprises selecting the target node upon a determination that an average, over the first set of training data, of the estimate of the partial derivative of the objective function for the base network with respect to an activation function for the target node is less than a threshold value.

In various implementations, the method further comprises, by the programmed computer system: prior to step (c), selecting a target datum; and selecting the target-specific improvement network sub-component based on a combination of the selected target node and the selected target datum. Selecting the target datum can comprises selecting an arbitrary datum in the first set of training data for which a magnitude of a partial derivative for the target node is non-zero and greater than a magnitude of the partial derivative averaged over a set of data. Selecting the target datum could also comprise selecting a datum in the first set of training data for which a value of an absolute value of the derivative for the target node is greater than a threshold value.

In various implementations, the step of wherein merging the target-specific improvement network sub-component with the base neural network comprises establishing an incoming connection from a first node in the base network to a first node of the target-specific improvement network sub-component, wherein a weight for the incoming connection is initialized to zero prior to training of the expanded network. The step of merging the target-specific improvement network sub-component with the base neural network can further comprise establishing an outgoing connection from the first node of the target-specific improvement network sub-component to a second node of the base network, where a weight for the outgoing connection is initialized to zero prior to training of the expanded network. In various implementations, wherein the target node is the second node of the base network, such that there is an outgoing connection from the first node of the target-specific improvement network sub-component to the target node.

In various implementations, the step of training the target-specific improvement network sub-component comprises training the target-specific improvement network sub-component with one-shot learning.

In various implementations, the target-specific improvement network sub-component, when added to the base neural network, changes a layer structure of the base neural network.

In various implementations, the target-specific improvement network sub-component comprises a second node; there is a node-to-node relationship regularization link between the second node and the target node; and the node-to-node relationship regularization link imposes a node-specific regularization cost on the second node for a training datum if the activation value computed for the target node during a prior feed forward computation for the training datum violates a specified relation for the node-to-node relationship regularization link.

In various implementations, there is a node-to-node relationship regularization link between every node of the base network and a corresponding node of the expanded network; and the node-to-node relationship regularization links impose a node-specific regularization costs for the training datum on each node in the expanded network if the activation value computed for corresponding node in the base network for the training datum during a prior feed forward computation violates a specified relation for the node-to-node relationship regularization link. The specified relation can be that an activation value for the second node for the training datum equals the activation value for the target node for the training datum. The node-specific regularization cost can comprise an absolute value of a difference between the activation value for the second node for the training datum and the activation value for the target node for the training datum. A strength of the node-to-node relationship regularization link can be controlled by a node-to-node relationship regularization link hyperparameter. A value of the node-to-node relationship regularization link hyperparameter can be controlled by an intelligent learning management system.

In various implementations, the step of adding the target-specific improvement network sub-component comprises, by the programmed computer system: determining a range, over a selected set of data, of a value of a summation of incoming connections to the target node; and upon a determination that the range is greater than a threshold value, creating a second node, wherein incoming connections for the second node are initialized by copying the incoming connections and weights from the target node, and wherein a bias for the second node is initialized to discriminate a first datum in the selected set of data from a second datum in the selected set of data. The second datum can be selected as datum in the selected set of data that maximizes an absolute value of a difference between the value of the summation of the incoming connections to the target node for the target node and the value of the summation of the incoming connections to the target node for the second datum. Adding the target-specific improvement network sub-component can further comprise adding a connection from the second node to the target node.

In various implementations, the step of adding the target-specific improvement network sub-component comprises, by the programmed computer system: creating an expanded network that doubles the base network by having two nodes for each node in the base network, such that each node in the base network has first and second corresponding nodes in the expanded network; and creating a node-to-node relationship regularization link from one or more nodes in the base network to each of the one or more node's first and second corresponding nodes. Creating the node-to-node relationship regularization link from the one or more nodes in the base network to the one or more nodes first and second corresponding nodes in the expanded network can comprise creating an is-equal-to regularization link from the one or more nodes in the base network to the one or more nodes first and second corresponding nodes in the expanded network. Creating the node-to-node relationship regularization link from the one or more nodes in the base network to the one or more nodes first and second corresponding nodes in the expanded network can comprise creating a directional is-not-equal-to regularization link from the one or more nodes in the base network to the one or more nodes first and second corresponding nodes in the expanded network. The one or more directional is-not-equal-to regularization links can comprise one or more bidirectional is-not-equal-to regularization links.

In another general aspect, the a computer-implemented method of training a neural network comprises: (a) training, at least partially, a base neural network on a first set of training data, where training the base neural network comprises computing for each datum in the first set of training data, activation values for nodes in the base neural network and estimates of partial derivatives of an objective function for the base neural network for the nodes in the base neural network, and where the base neural network comprises an input layer, an output layer, and one or more inner layers between the input and output layers; (b) after step (a), selecting a target training datum; and (c) after step (b), adding a target-specific improvement network sub-component to the base neural network to form an expanded neural network, where the target-specific improvement network sub-component comprises one or more nodes and where the target-specific improvement network sub-component, when added to the neural network, improves performance of the neural network for the target training datum.

In various implementations, the step of adding the target-specific improvement network sub-component comprises: (c1) selecting the target-specific improvement network sub-component; (c2) after step (c1), training the target-specific improvement network sub-component; and (c3) after step (c2), merging the target-specific improvement network sub-component with the neural network to form an expanded neural network. The method may further comprise training the expanded neural network.

In various implementations, the target training datum is or is not a member of the set of training data.

In various implementations, a specified criteria for selecting the target training datum comprises selecting a data item in the set of training data on which a target node of the base network made a classification error. The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A method of training a neural network, the method comprising, by a programmed computer system:
    (a) training, at least partially, a base neural network on a first set of training data, wherein training the base neural network comprises computing for each datum in the first set of training data, activation values for nodes in the base neural network and estimates of partial derivatives of an objective function for the base neural network for the nodes in the base neural network, wherein the base neural network comprises an input layer, an output layer, and one or more inner layers between the input and output layers;
    (b) after step (a) and based on the training, selecting, based on specified criteria, a target node of the base neural network for targeted improvement; and
    (c) after step (b), adding a target-specific improvement network sub-component to the base neural network to form an expanded neural network, wherein the target-specific improvement network sub-component comprises one or more nodes and wherein the target-specific improvement network sub-component, when added to the base neural network, improves performance of the target node,
    wherein adding the target-specific improvement network sub-component comprises, by the programmed computer system:
        (c1) selecting the target-specific improvement network sub-component;
        (c2) after step (c1), training the target-specific improvement network sub-component separately from the base neural network; and
        (c3) after step (c2), merging the target-specific improvement network sub-component with the base neural network to form the expanded neural network.

2. The method of claim 1, further comprising, by the programmed computer system, after step (c3), training the expanded neural network.

3. The method of claim 1, further comprising, by the programmed computer system, after step (c), training the expanded neural network.

4. The method of claim 1, wherein the specified criteria for selecting the target node comprises selecting the target node upon a determination that the target node made a classification error for a first datum in the first set of training data.

5. The method of claim 4, wherein the target node is an output node of the base neural network.

6. The method of claim 4, wherein the target node is on a first inner layer of the base neural network.

7. The method of claim 6, wherein the specified criteria for selecting the target node comprises a comparison of an activation value for the target node to a threshold value.

8. The method of claim 4, wherein the target-specific improvement network sub-component comprises a detector node that detects instances of the first datum and data that is within a threshold distance of the first datum.

9. The method of claim 4, wherein the target-specific improvement network sub-component comprises a discriminator node that discriminates between the first datum and a second datum in the first set of training data.

10. The method of claim 1 wherein the target-specific improvement network sub-component comprises:
    an error-prediction node that is trained to detect training data on which the target node makes classification errors; and
    an error-correction node that passes through an activation value from the target node unless certain conditions apply, wherein the conditions comprise (i) the target node made a classification choice and (ii) the error-prediction node predicts that the classification choice by the target node is erroneous.

11. The method of claim 10, wherein the error-correction node reverses an output of the target node relative to a threshold value when conditions (i) and (ii) apply.

12. The method of claim 1, wherein the target-specific improvement network sub-component comprises a second node that is a copy of the target node, such that incoming and outgoing connections, and corresponding weight values, for the target node are initially copied to the second node, and wherein there is a directional relationship regularization link between the target node and the second node.

13. The method of claim 12, wherein the directional relationship regularization link comprises a bidirectional relationship regularization link.

14. The method of claim 12, wherein the directional relationship regularization link enforces an "is-not-equal-to" relationship between activation values of the target node and the second node on a second set of training data, such that the second node is trained to produce different activation values than the target node on data in the second set of training data.

15. The method of claim 1, wherein criteria for selecting the target node comprises selecting the target node upon a determination that an average, over the first set of training data, of the estimate of the partial derivative of the objective function for the base neural network with respect to an activation function for the target node is less than a threshold value.

16. The method of claim 15, further comprising, by the programmed computer system:
prior to step (c), selecting a target datum; and
selecting the target-specific improvement network sub-component based on a combination of the selected target node and the selected target datum.

17. The method of claim 16, wherein selecting the target datum comprises selecting an arbitrary datum in the first set of training data for which a magnitude of a partial derivative for the target node is non-zero and greater than a magnitude of the partial derivative averaged over a set of data.

18. The method of claim 16, wherein selecting the target datum comprises selecting a datum in the first set of training data for which a value of an absolute value of the derivative for the target node is greater than a threshold value.

19. The method of claim 1, wherein merging the target-specific improvement network sub-component with the base neural network comprises establishing an incoming connection from a first node in the base neural network to a first node of the target-specific improvement network sub-component, wherein a weight for the incoming connection is initialized to zero prior to training of the expanded neural network.

20. The method of claim 19, wherein merging the target-specific improvement network sub-component with the base neural network further comprises establishing an outgoing connection from the first node of the target-specific improvement network sub-component to a second node of the base neural network, wherein a weight for the outgoing connection is initialized to zero prior to training of the expanded neural network.

21. The method of claim 20, wherein the target node is the second node of the base neural network, such that there is an outgoing connection from the first node of the target-specific improvement network sub-component to the target node.

22. The method of claim 1, wherein training the target-specific improvement network sub-component comprises training the target-specific improvement network sub-component with one-shot learning.

23. The method of claim 1, wherein the target-specific improvement network sub-component, when added to the base neural network, changes a layer structure of the base neural network.

24. The method of claim 1, wherein:
the target-specific improvement network sub-component comprises a second node;
there is a node-to-node relationship regularization link between the second node and the target node; and
the node-to-node relationship regularization link imposes a node-specific regularization cost on the second node for a training datum if an activation value computed for the target node during a prior feed forward computation for the training datum violates a specified relation for the node-to-node relationship regularization link.

25. The method of claim 24, wherein:
there is a node-to-node relationship regularization link between every node of the base neural network and a corresponding node of the expanded neural network; and
the node-to-node relationship regularization links impose node-specific regularization costs for the training datum on each node in the expanded neural network if the activation value computed for the corresponding node in the base neural network for the training datum during the prior feed forward computation violates the specified relation for the node-to-node relationship regularization link.

26. The method of claim 24, wherein the specified relation is that an activation value for the second node for the training datum equals the activation value for the target node for the training datum.

27. The method of claim 26, wherein the node-specific regularization cost comprises an absolute value of a difference between the activation value for the second node for the training datum and the activation value for the target node for the training datum.

28. The method of claim 24, wherein a strength of the node-to-node relationship regularization link is controlled by a node-to-node relationship regularization link hyperparameter.

29. The method of claim 28, wherein a value of the node-to-node relationship regularization link hyperparameter is controlled by an intelligent learning management system.

30. The method of claim 1, wherein adding the target-specific improvement network sub-component comprises, by the programmed computer system:
determining a range, over a selected set of data, of a value of a summation of incoming connections to the target node; and
upon a determination that the range is greater than a threshold value, creating a second node, wherein incoming connections for the second node are initialized by copying the incoming connections and weights from the target node, and wherein a bias for the second node is initialized to discriminate a first datum in the selected set of data from a second datum in the selected set of data.

31. The method of claim 30, wherein the second datum is selected as datum in the selected set of data that maximizes an absolute value of a difference between the value of the summation of the incoming connections to the target node for the target node and the value of the summation of the incoming connections to the target node for the second datum.

32. The method of claim 31, wherein adding the target-specific improvement network sub-component further comprises adding a connection from the second node to the target node.

33. The method of claim 1, wherein adding the target-specific improvement network sub-component comprises, by the programmed computer system:
creating an expanded neural network that doubles the base neural network by having two nodes for each node in the base neural network, such that each node in the base neural network has first and second corresponding nodes in the expanded neural network; and
creating a node-to-node relationship regularization link from one or more nodes in the base neural network to each of the one or more node's first and second corresponding nodes.

34. The method of claim 33, wherein creating the node-to-node relationship regularization link from the one or more nodes in the base neural network to the first and second corresponding nodes in the expanded neural network comprises creating an is-equal-to regularization link from the one or more nodes in the base neural network to the first and second corresponding nodes in the expanded neural network.

35. The method of claim 33, wherein creating the node-to-node relationship regularization link from the one or more nodes in the base neural network to the first and second corresponding nodes in the expanded neural network comprises creating a one or more directional is-not-equal-to regularization link from the one or more nodes in the base neural network to the first and second corresponding nodes in the expanded neural network.

36. The method of claim 35, wherein the one or more directional is-not-equal-to regularization links comprise one or more bidirectional is-not-equal-to regularization links.

37. A computer system for training a neural network, the computer system comprising:
one or more processor units; and
memory in communication with the one or more processor units, where the memory stores computer instructions that, when executed by the one or more processor units, cause the one or more processor units, to:
(a) train, at least partially, a base neural network on a first set of training data, wherein training the base neural network comprises computing for each datum in the first set of training data, activation values for nodes in the base neural network and estimates of partial derivatives of an objective function for the base neural network for the nodes in the base neural network, wherein the base neural network comprises an input layer, an output layer, and one or more inner layers between the input and output layers;
(b) after step (a) and based on the training, select, based on specified criteria, a target node of the base neural network for targeted improvement; and
(c) after step (b), adding a target-specific improvement network sub-component to the base neural network to form an expanded neural network, wherein the target-specific improvement network sub-component comprises one or more nodes and wherein the target-specific improvement network sub-component, when added to the base neural network, improves performance of the target node, wherein the memory stores computer instructions that, when executed by the one or more processor units, causes the one or more processor units to add the target-specific improvement network sub-component by:
(c1) selecting the target-specific improvement network sub-component;
(c2) after step (el), training the target-specific improvement network sub-component separately from the base neural network; and
(c3) after step (c2), merging the target-specific improvement network sub-component with the base neural network to form the expanded neural network.

38. The computer system of claim 37, wherein the specified criteria for selecting the target node comprises a determination that the target node made a classification error for a first datum in the first set of training data.

39. The computer system of claim 38, wherein the target-specific improvement network sub-component comprises a detector node that detects instances of the first datum and data that is within a threshold distance of the first datum.

40. The computer system of claim 38, wherein the target-specific improvement network sub-component comprises a discriminator node that discriminates between the first datum and a second datum in the first set of training data.

41. The computer system of claim 37, wherein the target-specific improvement network sub-component comprises:
an error-prediction node that is trained to detect training data on which the target node makes classification errors; and
an error-correction node that passes through an activation value from the target node unless certain conditions apply, wherein the conditions comprise (i) the target node made a classification choice and (ii) the error-prediction node predicts that the classification choice by the target node is erroneous.

42. The computer system of claim 37, wherein the target-specific improvement network sub-component comprises a second node that is a copy of the target node, such that incoming and outgoing connections, and corresponding weight values, for the target node are initially copied to the second node, and wherein there is a directional relationship regularization link between the target node and the second node.

43. The computer system of claim 42, wherein the directional relationship regularization link comprises a bidirectional relationship regularization link.

44. The computer system of claim 42, wherein the directional relationship regularization link enforces an "is-not-equal-to" relationship between activation values of the target node and the second node on a second set of training data, such that the second node is trained to produce different activation values than the target node on data in the second set of training data.

45. The computer system of claim 37, wherein criteria for selecting the target node comprises a determination that an average, over the first set of training data, of the estimate of the partial derivative of the objective function for the base neural network with respect to an activation function for the target node is less than a threshold value.

46. The computer system of claim 37, wherein:
the target-specific improvement network sub-component comprises a second node;
there is a node-to-node relationship regularization link between the second node and the target node; and
the node-to-node relationship regularization link imposes a node-specific regularization cost on the second node for a training datum if an activation value computed for the target node during a prior feed forward computation for the training datum violates a specified relation for the node-to-node relationship regularization link.

47. The computer system of claim 46, wherein:
there is a node-to-node relationship regularization link between every node of the base neural network and a corresponding node of the expanded neural network; and the node-to-node relationship regularization links impose a node-specific regularization costs for the training datum on each node in the expanded neural network if the activation value computed for corresponding node in the base neural network for the training datum during the prior feed forward computation violates the specified relation for the node-to-node relationship regularization link.

48. The computer system of claim 37, wherein the memory stores computer instructions that, when executed by the one or more processor units, causes the one or more processor units to add the target-specific improvement network sub-component by:
determining a range, over a selected set of data, of a value of a summation of incoming connections to the target node; and
upon a determination that the range is greater than a threshold value, creating a second node, wherein incoming connections for the second node are initialized by copying the incoming connections and weights from the target node, and wherein a bias for the second node is initialized to discriminate a first datum in the selected set of data from a second datum in the selected set of data.

49. The computer system of claim 37, wherein the memory stores computer instructions that, when executed by the one or more processor units, causes the one or more processor units to add the target-specific improvement network sub-component by:
creating an expanded neural network that doubles the base neural network by having two nodes for each node in the base neural network, such that each node in the base neural network has first and second corresponding nodes in the expanded neural network; and
creating a node-to-node relationship regularization link from one or more nodes in the base neural network to each of the one or more node's first and second corresponding nodes.

50. A method of training a neural network, the method comprising, by a programmed computer system:
(a) training, at least partially, a base neural network on a first set of training data, wherein training the base neural network comprises computing for each datum in the first set of training data, activation values for nodes in the base neural network and estimates of partial derivatives of an objective function for the base neural network for the nodes in the base neural network, wherein the base neural network comprises an input layer, an output layer, and one or more inner layers between the input and output layers;
(b) after step (a), selecting a target training datum and a target node of the base neural network; and
(c) after step (b), adding a target-specific improvement network sub-component to the base neural network to form an expanded neural network, wherein the target-specific improvement network sub-component comprises one or more nodes and wherein the target-specific improvement network sub-component, when added to the base neural network, improves performance of the target node for the target training datum.

51. The method of claim 50, wherein the step of adding the target-specific improvement network sub-component comprises:
(c1) selecting the target-specific improvement network sub-component;
(c2) after step (c1), training the target-specific improvement network sub-component separately from the base neural network; and
(c3) after step (c2), merging the target-specific improvement network sub-component with the base neural network to form the expanded neural network.

52. The method of claim 51, further comprising training the expanded neural network.

53. The method of claim 50, wherein the target training datum is not a member of the first set of training data.

54. The method of claim 50, wherein the target training datum is a member of the first set of training data.

55. The method of claim 54, wherein a specified criteria for selecting the target training datum comprises selecting a data item in the first set of training data on which the target node of the base neural network made a classification error.

56. A computer system for training a neural network, the computer system comprising:
one or more processor units; and
memory in communication with the one or more processor units, where the memory stores computer instructions that, when executed by the one or more processor units, cause the one or more processor units, to:
(a) train, at least partially, a base neural network on a first set of training data, wherein training the base neural network comprises computing for each datum in the first set of training data, activation values for nodes in the base neural network and estimates of partial derivatives of an objective function for the base neural network for the nodes in the base neural network, wherein the base neural network comprises an input layer, an output layer, and one or more inner layers between the input and output layers;
(b) after step (a), select a target training datum and a target node of the base neural network; and
(c) after step (b), add a target-specific improvement network sub-component to the base neural network to form an expanded neural network, wherein the target-specific improvement network sub-component comprises one or more nodes, and, when added to the base neural network, improves performance of the target node for the target training datum.

57. The computer system of claim 56, wherein the memory stores computer instructions that, when executed by the one or more processor units, causes the one or more processor units to add the target-specific improvement network sub-component by:
(c1) select the target-specific improvement network sub-component;
(c2) after step (c1), train the target-specific improvement network sub-component separately from the base network; and
(c3) after step (c2), merge the target-specific improvement network sub-component with the base neural network to form the expanded neural network.

* * * * *